US012607793B2

(12) United States Patent
Yamada et al.

(10) Patent No.: US 12,607,793 B2
(45) Date of Patent: Apr. 21, 2026

(54) OPTICAL LAMINATE, OPTICAL LENS, VIRTUAL REALITY DISPLAY APPARATUS, OPTICALLY ANISOTROPIC FILM, MOLDED BODY, REFLECTIVE CIRCULAR POLARIZER, NON-PLANAR REFLECTIVE CIRCULAR POLARIZER, LAMINATED OPTICAL BODY, AND COMPOSITE LENS

(71) Applicant: FUJIFILM Corporation, Tokyo (JP)

(72) Inventors: Naoyoshi Yamada, Minamiashigara (JP); Ryuji Saneto, Minamiashigara (JP); Katsumi Sasata, Minamiashigara (JP); Takehiro Kasahara, Minamiashigara (JP); Yohei Hamachi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 18/807,047

(22) Filed: Aug. 16, 2024

(65) Prior Publication Data

US 2024/0411075 A1 Dec. 12, 2024

Related U.S. Application Data

(63) Continuation of application No. PCT/JP2023/005734, filed on Feb. 17, 2023.

(30) Foreign Application Priority Data

Feb. 18, 2022 (JP) ................................ 2022-023912
Mar. 17, 2022 (JP) ................................ 2022-042758
(Continued)

(51) Int. Cl.
*G02B 27/01* (2006.01)
*G02B 1/08* (2006.01)
*G02B 5/30* (2006.01)

(52) U.S. Cl.
CPC ............ *G02B 5/3016* (2013.01); *G02B 1/08* (2013.01); *G02B 27/0172* (2013.01)

(58) Field of Classification Search
CPC .... G02B 5/3016; G02B 1/08; G02B 27/0172; G02B 3/00; G02B 5/30; G02B 5/305;
(Continued)

(56) References Cited

U.S. PATENT DOCUMENTS 10,394,040 B2 8/2019 Gollier et al.
2016/0342003 A1* 11/2016 Takeda ............... C09K 19/2007
(Continued)

FOREIGN PATENT DOCUMENTS

JP 2008-151834 A 7/2008
JP 2020-519964 A 7/2020
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2023/005734, dated Aug. 29, 2024, with an English translation.
(Continued)

*Primary Examiner* — Donald L Raleigh
(74) *Attorney, Agent, or Firm* — Birch, Stewart, Kolasch & Birch, LLP

(57) ABSTRACT

Provided are an optical laminate in which, for example, in a case of being applied to a pancake lens-type virtual reality display apparatus, light leakage can be reduced by canceling out expression of phase difference, change in phase difference, and the like caused by molding into a curved surface; an optical lens including the optical laminate; and a virtual reality display apparatus using the optical lens.
The optical laminate includes a first optically anisotropic layer containing a negative birefringent resin, and a specific
(Continued)

layer selected from the group consisting of a third optically anisotropic layer which is formed by immobilizing a uniformly aligned liquid crystal compound and a cholesteric liquid crystal layer which is formed by immobilizing a helically aligned liquid crystal compound, in which the first optically anisotropic layer and the specific layer have a curved surface portion.

19 Claims, 5 Drawing Sheets

(30) Foreign Application Priority Data

Mar. 17, 2022 (JP) ................................ 2022-042869
Apr. 14, 2022 (JP) ................................ 2022-066967

(58) Field of Classification Search
CPC ...... G02B 5/3083; G02B 13/00; G02B 27/02; G02F 1/13; G02F 1/13363; G09F 9/00
See application file for complete search history.

(56) References Cited

U.S. PATENT DOCUMENTS

| | | | | |
|---|---|---|---|---|
| 2017/0351134 | A1* | 12/2017 | Shimatani ............ | G02B 5/3083 |
| 2021/0033764 | A1* | 2/2021 | Sato ..................... | G02B 5/3016 |
| 2022/0146803 | A1 | 5/2022 | Etter et al. | |
| 2024/0134187 | A1 | 4/2024 | Yamada | |
| 2024/0288616 | A1 | 8/2024 | Ambur et al. | |

FOREIGN PATENT DOCUMENTS

| | | | |
|---|---|---|---|
| JP | 2020-537194 | A | 12/2020 |
| WO | WO 2021/102148 | A1 | 5/2021 |
| WO | WO 2021/246286 | A1 | 12/2021 |

OTHER PUBLICATIONS

International Search Report (Form PCT/ISA/210) for International Application No. PCT/JP2023/005734, dated May 16, 2023, with English translation.

* cited by examiner

OPTICAL LAMINATE, OPTICAL LENS, VIRTUAL REALITY DISPLAY APPARATUS, OPTICALLY ANISOTROPIC FILM, MOLDED BODY, REFLECTIVE CIRCULAR POLARIZER, NON-PLANAR REFLECTIVE CIRCULAR POLARIZER, LAMINATED OPTICAL BODY, AND COMPOSITE LENS

CROSS-REFERENCE TO RELATED APPLICATIONS

This application is a Continuation of PCT International Application No. PCT/JP2023/005734 filed on Feb. 17, 2023, which claims priority under 35 U.S.C. § 119 (a) to Japanese Patent Application No. 2022-023912 filed on Feb. 18, 2022, Japanese Patent Application No. 2022-042758 filed on Mar. 17, 2022, Japanese Patent Application No. 2022-042869 filed on Mar. 17, 2022, and Japanese Patent Application No. 2022-066967 filed on Apr. 14, 2022. The above applications are hereby expressly incorporated by reference, in their entirety, into the present application.

BACKGROUND OF THE INVENTION

1. Field of the Invention

The present invention relates to an optical laminate, an optical lens including the optical laminate, a virtual reality display apparatus including the optical lens, an optically anisotropic film, a molded body, a reflective circular polarizer, a non-planar reflective circular polarizer, a laminated optical body, and a composite lens.

2. Description of the Related Art

A virtual reality display apparatus is a display device which can obtain a realistic effect as if entering a virtual world by wearing a dedicated headset on a head and visually recognizing a video displayed through a lens.

The virtual reality display apparatus generally includes an image display device and a Fresnel lens, but a distance from the image display device to the Fresnel lens is large, and thus a headset is thick and has poor wearability, which are problems.

Therefore, as disclosed in JP2020-519964A, a lens configuration called a pancake lens has been proposed, the lens configuration including an image display device, a reflective type polarizer, a half mirror, a retardation layer, and the like, in which the entire thickness of a headset is reduced by reciprocating rays emitted from the image display device between the reflective type polarizer and the half mirror.

The reflective type polarizer herein is a polarizer having a function of reflecting one polarized light in incidence ray and transmitting the other polarized light. Reflected light and transmitted light due to the reflective type polarizer are in a polarization state of being orthogonal to each other. Here, the polarization state of being orthogonal to each other denotes a polarization state in which both lights are positioned at antipodal points on the Poincare sphere, and for example, linearly polarized lights orthogonal to each other or clockwise circularly polarized light and counterclockwise circularly polarized light are in the corresponding state.

As the reflective linear polarizer in which the transmitted light and the reflected light are linearly polarized, for example, a film in which a dielectric multi-layer film is stretched or a wire grid polarizer has been known. In addition, as a reflective circular polarizer in which the transmitted light and the reflected light are converted into circularly polarized light, for example, a film having a light reflecting layer obtained by immobilizing a cholesteric liquid crystalline phase has been known.

JP2020-519964A discloses a composite lens having a configuration of a pancake lens, including an image display panel, a reflective type linear polarizer, and a half mirror in this order, in which the reflective type linear polarizer is used as the reflective type polarizer. In a case of including the image display panel, the reflective type polarizer, and the half mirror in this order, it is necessary for the reflective type polarizer to have an action of a concave mirror with respect to a ray incident from the half mirror side. In order to impart the action of the concave mirror to the reflective type linear polarizer, a configuration in which the reflective type linear polarizer is formed into a curved surface shape is proposed.

In addition, U.S. Pat. No. 10,394,040B discloses a composite lens having a configuration of a pancake lens, including an image display panel, a half mirror, and a reflective type linear polarizer in this order, in which the reflective type linear polarizer is used as the reflective type polarizer. U.S. Pat. No. 10,394,040B proposes a configuration in which both the half mirror and the reflective type polarizer are curved to improve field curvature. In this case, it is necessary for the reflective type polarizer to have an action of a convex mirror.

SUMMARY OF THE INVENTION

JP2020-519964A discloses that, in order to obtain a wide visual field, low chromatic aberration, low distortion, and excellent modulation transfer function (MTF), an optical laminate including an optically anisotropic layer such as a retardation layer and a half mirror is bonded on a curved surface of a spherical surface or an aspherical surface in an optical lens.

However, in order to bond the optical laminate including the optically anisotropic layer to the curved surface, it is necessary to mold the optical laminate into the curved surface. In a case where the optically anisotropic layer is stretched during the molding of the curved surface, there is a problem that phase difference is exhibited in the optically anisotropic layer or phase difference inherent in the optically anisotropic layer is changed. In addition, in the molding of the curved surface, the optical laminate is stretched at different stretching ratios depending on the location, and the amount of expression, the amount of change, and the like of the phase difference may be different depending on the location, which is also a problem.

In a case where the optically anisotropic layer is a retardation layer such as a λ/4 retardation layer, the phase difference of the optically anisotropic layer may be unintentionally expressed due to the expression of the undesirable phase difference. Furthermore, an optical axis of the retardation layer may be changed to an unintended orientation.

In addition, even in a case where the optically anisotropic layer is a layer which usually does not have phase difference, such as a cholesteric liquid crystal layer, the optically anisotropic layer may exhibit unnecessary phase difference by stretching the optically anisotropic layer. In a case where the cholesteric liquid crystal layer exhibits the phase difference, there may be a problem that the reflected polarized light is not intended circularly polarized light but elliptically polarized light.

According to studies of the present inventors, it has been found that such expression of the undesirable phase difference and the change in phase difference disturb the polarization of the rays emitted from the image display device in the pancake lens, and thus a part of the rays does not travel back and forth between the reflective type polarizer and the half mirror, but leaks, which leads to double images, a decrease in contrast, and the like.

A first embodiment of the present invention has been made in view of the above-described problems, and an object to be achieved by the first embodiment of the present invention is to provide an optical laminate in which, for example, in a case of being applied to a pancake lens-type virtual reality display apparatus, light leakage can be reduced by canceling out expression of phase difference, change in phase difference, and the like caused by molding into a curved surface; an optical lens including the optical laminate; and a virtual reality display apparatus using the optical lens.

In addition, JP2020-519964A discloses a method of bonding an optically anisotropic film on a curved surface of a spherical surface or an aspherical surface in an optical lens in order to obtain a wide visual field, low chromatic aberration, low distortion, excellent modulation transfer function (MTF), and the like.

According to studies of the present inventors, in order to bond the optically anisotropic film including an optically anisotropic layer to the curved surface, it is necessary to mold the optically anisotropic film into a three-dimensional shape, and in this case, an orientation of an optical axis of the optically anisotropic layer is changed by stretching the optically anisotropic layer. As a result, in a case where the optical axis is changed to an undesirable orientation, polarization of rays emitted from the image display device is disturbed in the pancake lens, and as a result, it has been found that some of the rays do not reciprocate between the reflective type polarizer and the half mirror, or some of the rays, which are to be absorbed by the polarizer, are not absorbed by the polarizer, and light leakage occurs, which leads to double images, a decrease in contrast, and the like.

In addition, in a case where the optically anisotropic film is molded on the curved surface, the optically anisotropic layer is stretched at different stretching ratios depending on the location, and the orientation of the optical axis is different depending on the location, so that the optical axis is changed to the undesirable orientation in at least a part of an in-plane region. Therefore, it has been found that the light leakage occurs in the pancake lens, which leads to double images, a decrease in contrast, and the like.

A second embodiment of the present invention has been made in view of the above-described problems, and an object to be achieved by the second embodiment of the present invention is to provide an optically anisotropic film in which, in a case of being molded into a three-dimensional shape including a curved surface and applied to a pancake lens-type virtual reality display apparatus, light leakage can be reduced; and a molded body using the optically anisotropic film.

In addition, in a case where the reflective type linear polarizer as the reflective type polarizer is molded into a non-planar shape and applied to a composite lens of the virtual reality display apparatus, it has been found that, due to the stretching of the optically anisotropic layer, an orientation of an optical axis such as a reflection axis and a transmission axis changes depending on a position of the optically anisotropic layer, and as a result, some of rays emitted from the image display device is leaked light, and a main image and a ghost image which is to be originally displayed are displayed in a double manner.

On the other hand, in a case where a reflective type circular polarizer (hereinafter, also referred to as "reflective circular polarizer") is applied to the composite lens of the virtual reality display apparatus, it is considered that, since the reflective circular polarizer does not have the reflection axis and the transmission axis, occurrence of distortion of a polarization axis is small even in a case where the stretching or the molding is performed, and a decrease in polarization degree is unlikely to occur. However, as a result of studies by the present inventors, it has been found that, in a case where the reflective circular polarizer is molded into a curved surface shape, tint of the main image is changed depending on the position in a visual field of the virtual reality display apparatus.

In addition, in a case where the reflective circular polarizer is molded into a curved surface shape, it has been found that, as a result of deviation of a reflection band due to the difference in the stretching rate for each orientation depending on the in-plane position of the reflective circular polarizer, some of incidence rays is not appropriately reflected or transmitted, and the light leakage occurs.

A third embodiment of the present invention has been made in view of the above-described problems, and an object to be achieved by the third embodiment of the present invention is to provide a reflective circular polarizer in which, in a case of being molded into a non-planar shape and applied to a virtual reality display apparatus, a change in tint of a main image in a visual field can be suppressed and light leakage can be reduced.

Another object to be achieved by the third embodiment of the present invention is to provide a non-planar reflective circular polarizer, a laminated optical body, a composite lens, and a virtual reality display apparatus.

As a result of intensive studies repeatedly conducted by the present inventors on the above-described object, it has been found that the above-described object can be achieved by the following configurations.

[1] A reflective circular polarizer comprising:

a light reflecting layer formed by immobilizing a cholesteric liquid crystalline phase, wherein a helical pitch of the cholesteric liquid crystalline phase has an in-plane distribution.

[2] The reflective circular polarizer according to [1], wherein the light reflecting layer includes a light reflecting layer formed by immobilizing a cholesteric liquid crystalline phase containing a rod-like liquid crystal compound and a light reflecting layer formed by immobilizing a cholesteric liquid crystalline phase containing a disk-like liquid crystal compound.

[3] The reflective circular polarizer according to [1], wherein the light reflecting layer has a laminated structure in which a light reflecting layer formed by immobilizing a cholesteric liquid crystalline phase containing a rod-like liquid crystal compound and a light reflecting layer formed by immobilizing a cholesteric liquid crystalline phase containing a disk-like liquid crystal compound are alternately arranged.

[4] A non-planar reflective circular polarizer obtained by molding a reflective circular polarizer which includes a light reflecting layer formed by immobilizing a cholesteric liquid crystalline phase, wherein an in-plane distribution of a helical pitch of the cholesteric liquid crystalline phase is 1% or less.

[5] The non-planar reflective circular polarizer according to [4], wherein the reflective circular polarizer is the reflective circular polarizer according to [1].

[6] A laminated optical body obtained by laminating the reflective circular polarizer according to [1], a retardation layer, and an absorption type linear polarizer in this order.

[7] A composite lens comprising:

the non-planar reflective circular polarizer according to [4]; and a lens.

[8] A composite lens comprising:

a non-planar laminated optical body obtained by molding the laminated optical body according to [6]; and a lens.

[9] A virtual reality display apparatus comprising:

the composite lens according to [7].

[10] A virtual reality display apparatus comprising:

the composite lens according to [8].

[11] An optical laminate comprising:

a first optically anisotropic layer containing a negative birefringent resin; and a specific layer selected from the group consisting of a third optically anisotropic layer which is formed by immobilizing a uniformly aligned liquid crystal compound and a cholesteric liquid crystal layer which is formed by immobilizing a helically aligned liquid crystal compound, wherein the first optically anisotropic layer and the specific layer have a curved surface portion.

[12] The optical laminate according to [11], wherein a tan δ peak temperature of the negative birefringent resin is 170° C. or lower.

[13] An optical lens comprising:

a lens base material having a curved surface part; and the optical laminate according to [11], which is bonded to the curved surface part of the lens base material.

[14] A virtual reality display apparatus comprising:

an image display device emitting polarized light; and the optical lens according to [13].

[15] An optically anisotropic film comprising:

a first optically anisotropic layer having an optical axis, wherein the first optically anisotropic layer has a non-linearly aligned region in which at least an orientation of the optical axis continuously changes in a plane.

[16] The optically anisotropic film according to [15], wherein the orientation of the optical axis in the non-linearly aligned region is distributed in a point-symmetrical manner with at least one point as a center.

[17] The optically anisotropic film according to [15], wherein an optical thickness of the first optically anisotropic layer in the non-linearly aligned region continuously changes in the plane.

[18] The optically anisotropic film according to [15], wherein the first optically anisotropic layer is a retardation layer.

[19] The optically anisotropic film according to [15], wherein the first optically anisotropic layer is a polarizer layer.

[20] The optically anisotropic film according to [18], wherein the first optically anisotropic layer is formed by immobilizing at least a liquid crystal compound.

[21] The optically anisotropic film according to [15], further comprising:

a second optically anisotropic layer having an optical axis, wherein an orientation of the optical axis of the second optically anisotropic layer is uniform in a plane.

[22] A molded body obtained by molding the optically anisotropic film according to [21] into a three-dimensional shape including a curved surface, wherein the optical axis of the first optically anisotropic layer and the optical axis of the second optically anisotropic layer form an angle of 45° in the non-linearly aligned region.

According to the first embodiment of the present invention, it is possible to provide an optical laminate in which, for example, in a case of being applied to a pancake lens-type virtual reality display apparatus, light leakage can be reduced by canceling out expression of phase difference, change in phase difference, and the like caused by molding into a curved surface; an optical lens including the optical laminate; and a virtual reality display apparatus using the optical lens.

According to the second embodiment of the present invention, it is possible to provide an optically anisotropic film in which, in a case of being molded into a three-dimensional shape including a curved surface and applied to a pancake lens-type virtual reality display apparatus, light leakage can be reduced; and a molded body using the optically anisotropic film.

According to the third embodiment of the present invention, it is possible to provide a reflective circular polarizer in which, in a case of being molded into a non-planar shape and applied to a virtual reality display apparatus, a change in tint of a main image in a visual field can be suppressed and light leakage can be reduced.

In addition, according to the third embodiment of the present invention, it is possible to provide a non-planar reflective circular polarizer, a laminated optical body, a composite lens, and a virtual reality display apparatus.

DESCRIPTION OF THE PREFERRED EMBODIMENTS

Hereinafter, the present invention will be described in detail.

The description of the configuration requirements described below may be made based on representative embodiments and specific examples, but the present invention is not limited to such embodiments.

Any numerical range expressed using "to" in the present specification refers to a range including the numerical values before and after the "to" as a lower limit value and an upper limit value, respectively.

In the present specification, a term "orthogonal" does not denote that an angle formed by two axes or the like is exactly 90°, but denotes 90°±10°, preferably 90°±5°. In addition, a term "parallel" does not denote that the angle formed by two axes or the like is exactly 0°, but denotes 0°±10°, preferably 0°±5°. Furthermore, "45°" does not denote that the angle formed by two axes or the like is exactly 45°, but denotes 45°±10°, preferably 45°±5°.

Here, in the expression related to polarized light, "state of polarized light orthogonal to each other" denotes a state of polarized light both positioned at antipodal points on the Poincare sphere, and for example, linearly polarized light orthogonal to each other, and clockwise circularly polarized light (dextrorotatory circularly polarized light) and counterclockwise circularly polarized light (levorotatory circularly polarized light) are in the corresponding state as described above.

In the present specification, a term "absorption axis" denotes a polarization direction in which absorbance is maximized in a plane in a case where linearly polarized light is incident. In addition, a term "reflection axis" denotes a polarization direction in which reflectivity is maximized in a plane in a case where linearly polarized light is incident. In addition, a term "transmission axis" denotes a direction orthogonal to the absorption axis or the reflection axis in a plane. Furthermore, a term "slow axis" denotes a direction in which refractive index is maximized in a plane.

In the present specification, a phase difference denotes an in-plane retardation unless otherwise specified, and is referred to as Re(λ). Here, Re(λ) represents an in-plane retardation at a wavelength λ, and the wavelength λ is 550 nm unless otherwise specified.

In addition, a retardation at the wavelength λ in a thickness direction is referred to as Rth (λ) in the present specification.

As Re (λ) and Rth (λ), values measured at the wavelength λ with AxoScan OPMF-1 (manufactured by Opto Science, Inc.) can be used. By inputting an average refractive index ((nx+ny+nz)/3) and a film thickness (d (μm)) in AxoScan, a slow axis direction) (°, $$Re\,(\lambda) = R0\,(\lambda), \text{ and}$$

$$\text{"}Rth\,(\lambda) = ((nx + ny)/2 - nz) \times d\text{"}$$

are calculated.

Hereinafter, the first embodiment will be described in detail.

Figure 1:
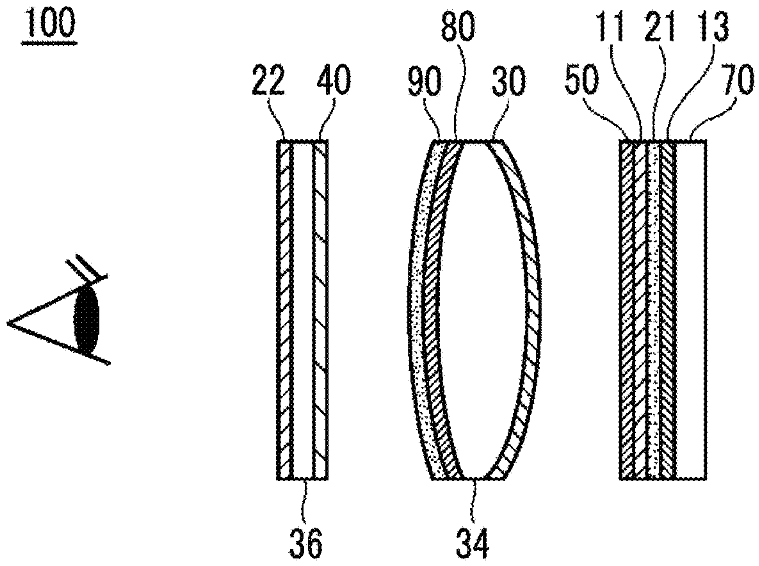
FIG. 1 is one example of a virtual reality display apparatus according to a first embodiment of the present invention.

FIG. 1 conceptually shows an example of a virtual reality display apparatus according to the first embodiment.

A virtual reality display apparatus 100 shown in FIG. 1 includes, from the right side in the drawing, an image display panel 70, a λ/4 retardation layer 13, an absorption type linear polarizer 21, a λ/4 retardation layer 11, and an antireflection layer 50; a half mirror 30, a lens base material 34, a first optically anisotropic layer 80, and a third optically anisotropic layer 90; and a reflective type polarizer 40, a substrate 36, and an absorption type linear polarizer 22.

In the virtual reality display apparatus 100 shown in FIG. 1, the first optically anisotropic layer 80 is a layer consisting of a negative birefringent resin. In addition, the third optically anisotropic layer 90 is a λ/4 retardation layer. Furthermore, the reflective type polarizer 40 is a reflective type linear polarizer.

The lens base material 34 is a biconvex lens, the half mirror 30 is molded into a curved surface (curved surface shape) and bonded to one surface thereof, and the first optically anisotropic layer 80 and the third optically anisotropic layer 90 are molded into a curved surface (curved surface shape) and bonded to the other surface thereof. The bonding in this case may be performed by a known method such as a method using an optical clear adhesive (OCA) or the like. The same applies to the bonding in the following.

In addition, in the virtual reality display apparatus 100 shown in FIG. 1, the reflective type polarizer 40 is bonded to one surface of the flat plate-shaped substrate 36, and the absorption type linear polarizer 22 is bonded to the other surface.

The substrate 36 is used for supporting the reflective type polarizer 40 and the absorption type linear polarizer 22, and is formed of a material which is transparent to visible light, such as glass and an acrylic plate, preferably a material having no phase difference.

In the virtual reality display apparatus 100 shown in FIG. 1, the third optically anisotropic layer 90 (λ/4 retardation layer) is the specific layer in the first embodiment, and the optical laminate includes the first optically anisotropic layer 80 (negative birefringent resin layer) and the third optically anisotropic layer 90. As described above, the optical laminate including the first optically anisotropic layer 80 and the third optically anisotropic layer 90 is molded into a curved surface and is bonded to the lens base material 34 which is a biconvex lens.

In addition, the half mirror 30, the lens base material 34, the first optically anisotropic layer 80, and the third optically anisotropic layer 90 constitute the optical lens according to the first embodiment.

The image display panel 70 is, for example, a known image display panel (display panel) such as an organic electroluminescence display panel.

In the illustrated example, the image display panel 70 emits an image (image light) of unpolarized light. The image of unpolarized light emitted from the image display panel 70 passes through the λ/4 retardation layer 13, is transmitted through the absorption type linear polarizer 21 to be linearly polarized light, is converted into circularly polarized light by the λ/4 retardation layer 11, and is transmitted through the antireflection layer 50.

In the present example, as an example, the absorption type linear polarizer 21 is an absorption type linear polarizer which transmits linearly polarized light in a direction perpendicular to the paper surface. In addition, as an example, the λ/4 retardation layer 11 is provided with its slow axis aligned so that the linearly polarized light in the direction perpendicular to the paper surface is converted into levorotatory circularly polarized light.

The antireflection layer 50 is a known antireflection layer (AR coat) such as a magnesium fluoride layer and a silicon oxide layer. In addition, an antireflection film known in the related art may be bonded.

Next, the levorotatory circularly polarized light transmitted through the antireflection layer 50 is incident on the half mirror 30 and half of the levorotatory circularly polarized light is transmitted. The levorotatory circularly polarized light transmitted through the half mirror 30 is transmitted through the lens base material 34 and the first optically anisotropic layer 80 (negative birefringent resin layer), and is converted into linearly polarized light by the third optically anisotropic layer 90 which is a λ/4 retardation layer.

In the present example, as an example, the third optically anisotropic layer 90 which is a λ/4 retardation layer is provided with its slow axis aligned so that the levorotatory circularly polarized light is converted into linearly polarized light in the direction perpendicular to the paper surface.

The levorotatory circularly polarized light reflected by the half mirror 30 is converted into dextrorotatory circularly polarized light by reflection, and is transmitted through the antireflection layer 50 and is incident on the λ/4 retardation layer 11.

As described above, the λ/4 retardation layer 11 converts linearly polarized light in a direction perpendicular to the paper surface into levorotatory circularly polarized light. Therefore, the dextrorotatory circularly polarized light incident on the λ/4 retardation layer 11 is converted into linearly polarized light in an up-down direction of the paper surface, and is incident on the absorption type linear polarizer 21.

As described above, the absorption type linear polarizer 21 is an absorption type linear polarizer which transmits linearly polarized light in a direction perpendicular to the paper surface. Therefore, the linearly polarized light in the up-down direction of the paper surface is absorbed by the absorption type linear polarizer 21.

The same applies to a virtual reality display apparatus 104 shown in FIG. 3, which will be described later.

Next, the linearly polarized light in the direction perpendicular to the paper surface, which has been converted from the levorotatory circularly polarized light by the third optically anisotropic layer 90, is incident on the reflective type polarizer 40.

As described above, the reflective type polarizer 40 is a reflective type linear polarizer, and as an example, it reflects linearly polarized light in a direction perpendicular to the paper surface and transmits the linearly polarized light in an up-down direction of the paper surface. Therefore, the linearly polarized light in the direction perpendicular to the paper surface, which has been incident on the reflective type polarizer 40, is reflected by the reflective type polarizer 40 and is incident on the third optically anisotropic layer 90 again.

As described above, the third optically anisotropic layer 90 is a λ/4 retardation layer which converts levorotatory circularly polarized light into linearly polarized light in a direction perpendicular to the paper surface. Therefore, the linearly polarized light in the direction perpendicular to the paper surface, which has been incident on the third optically anisotropic layer 90, is converted into levorotatory circularly polarized light by the third optically anisotropic layer 90.

The levorotatory circularly polarized light converted by the third optically anisotropic layer 90 is incident on the half mirror 30 by transmitting through the lens base material 34, and half of the levorotatory circularly polarized light is reflected by the half mirror 30. By the reflection, the levorotatory circularly polarized light is converted into dextrorotatory circularly polarized light.

The dextrorotatory circularly polarized light reflected by the half mirror 30 is transmitted through the lens base material 34 and the first optically anisotropic layer 80, and is incident on the third optically anisotropic layer 90. As described above, the third optically anisotropic layer 90 is a λ/4 retardation layer which converts levorotatory circularly polarized light into linearly polarized light in a direction perpendicular to the paper surface. Therefore, the dextrorotatory circularly polarized light is converted into linearly polarized light in the up-down direction of the paper surface by the third optically anisotropic layer 90, and is incident on the reflective type polarizer 40.

At this time, the remaining half of the levorotatory circularly polarized light, which has been transmitted through the half mirror 30, is transmitted through the antireflection layer 50 and is incident on the λ/4 retardation layer 11. As described above, the λ/4 retardation layer 11 converts linearly polarized light in a direction perpendicular to the paper surface into levorotatory circularly polarized light. Therefore, the levorotatory circularly polarized light incident on the λ/4 retardation layer 11 is converted into linearly polarized light in the direction perpendicular to the paper surface.

Next, the linearly polarized light in the direction perpendicular to the paper surface is incident on the absorption type linear polarizer 21. As described above, the absorption type linear polarizer 21 is an absorption type linear polarizer which transmits linearly polarized light in a direction perpendicular to the paper surface. Therefore, the linearly polarized light in the direction perpendicular to the paper surface is transmitted through the absorption type linear polarizer 21 and is incident on the λ/4 retardation layer 13.

Here, as an example, the λ/4 retardation layer 13 is provided with its slow axis aligned so that the linearly polarized light in the direction perpendicular to the paper surface is converted into levorotatory circularly polarized light. Therefore, the linearly polarized light in the vertical direction, which has been incident on the λ/4 retardation layer 13, is converted into levorotatory circularly polarized light by the λ/4 retardation layer 13.

The levorotatory circularly polarized light converted by the λ/4 retardation layer 13 is reflected on a surface of the image display panel 70, is converted into dextrorotatory circularly polarized light, and is incident on the λ/4 retardation layer 13 again.

As described above, it converts linearly polarized light in a direction perpendicular to the paper surface into levorotatory circularly polarized light. Therefore, the dextrorotatory circularly polarized light incident on the λ/4 retardation layer 13 is converted into linearly polarized light in an up-down direction of the paper surface, and is incident on the absorption type linear polarizer 21.

As described above, the absorption type linear polarizer 21 is an absorption type linear polarizer which transmits linearly polarized light in a direction perpendicular to the paper surface. Therefore, the linearly polarized light in the up-down direction of the paper surface is absorbed by the absorption type linear polarizer 21.

The same applies to a virtual reality display apparatus 104 shown in FIG. 3, which will be described later.

On the other hand, the linearly polarized light in the up-down direction of the paper surface, which has been reflected by the half mirror 30 and converted by the third optically anisotropic layer 90, is then incident on the reflective type polarizer 40.

As described above, the reflective type polarizer 40 is a reflective type linear polarizer, and it reflects linearly polarized light in a direction perpendicular to the paper surface and transmits the linearly polarized light in an up-down direction of the paper surface. Therefore, the linearly polarized light in the up-down direction of the paper surface, which has been incident on the reflective type polarizer 40, is transmitted through the reflective type polarizer 40.

Next, the linearly polarized light in the up-down direction of the paper surface, which has been transmitted through the reflective type polarizer 40, is transmitted through the absorption type linear polarizer 22 in the up-down direction of the paper surface, and is observed by the user of the virtual reality display apparatus 100 as a virtual reality image.

The absorption type linear polarizer 22 is used for preventing light which is unnecessarily transmitted through the reflective type polarizer 40 from being leaked (ghost) and observed by the user of the virtual reality display apparatus 100 by shielding the light.

That is, in a case where the linearly polarized light in the direction perpendicular to the paper surface is first incident on the reflective type polarizer 40, there is also linearly polarized light in the direction perpendicular to the paper surface, which is not reflected by the reflective type polarizer 40 and is unnecessarily transmitted through the reflective type polarizer 40.

However, since the absorption type linear polarizer 22 which transmits the linearly polarized light in the up-down direction of the paper surface absorbs the linearly polarized light in the direction perpendicular to the paper surface, the linearly polarized light in the direction perpendicular to the paper surface is absorbed and does not leak, and thus the linearly polarized light in the direction perpendicular to the paper surface is not observed by the user.

Figure 2:
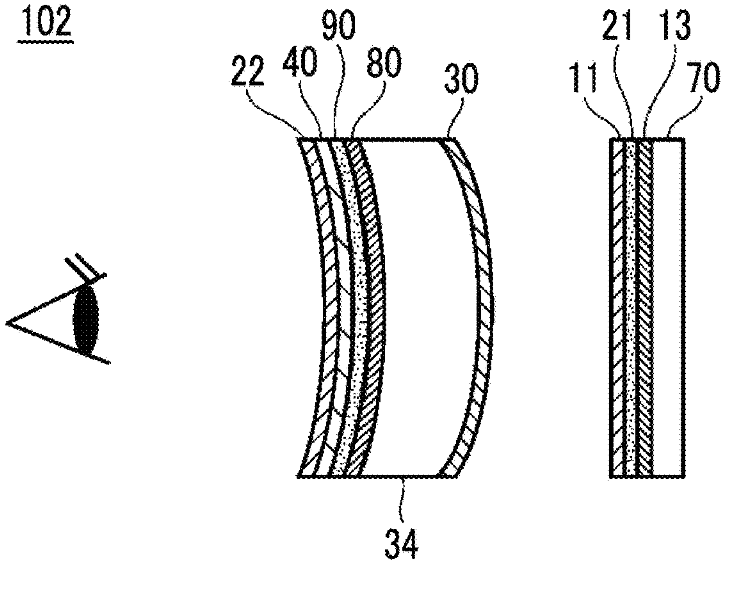
FIG. 2 is another example of the virtual reality display apparatus according to the first embodiment of the present invention.

FIG. 2 conceptually shows another example of the virtual reality display apparatus according to the first embodiment.

A virtual reality display apparatus 102 shown in FIG. 2 and a virtual reality display apparatus 104 shown in FIG. 3 described later use the same members as the virtual reality display apparatus 100 shown in FIG. 1 described above. Therefore, in the following description, the same reference numeral is given to the same member, and the following description will be made mainly on different points.

The virtual reality display apparatus 102 shown in FIG. 1 includes, from the right side in the drawing, an image display panel 70, a λ/4 retardation layer 13, an absorption type linear polarizer 21, and a λ/4 retardation layer 11; and a half mirror 30, a lens base material 34, a first optically anisotropic layer 80, a third optically anisotropic layer 90, a reflective type polarizer 40, and an absorption type linear polarizer 22.

In the virtual reality display apparatus 102 shown in FIG. 2 as well, the first optically anisotropic layer 80 is a layer consisting of a negative birefringent resin. In addition, the third optically anisotropic layer 90 is a λ/4 retardation layer. Furthermore, the reflective type polarizer 40 is a reflective type linear polarizer.

In the present example, the antireflection layer 50 is not provided on the surface of the λ/4 retardation layer 11. However, in the present example as well, the antireflection layer 50 may be provided on the surface of the λ/4 retardation layer 11. The same applies to a virtual reality display apparatus 104 shown in FIG. 3, which will be described later.

Here, the lens base material 34 is a plate-shaped member having one surface which is convex and the other surface which is concave, the half mirror 30 is molded into a curved surface and bonded to the convex surface side, and the first optically anisotropic layer 80, the third optically anisotropic layer 90, the reflective type polarizer 40, and the absorption type linear polarizer 22 are laminated, molded into a curved surface, bonded to the concave surface side.

Same as the substrate 36 described above, the lens base material 34 is formed of a material which is transparent to visible light, such as glass and an acrylic plate, preferably a material having no phase difference.

That is, the virtual reality display apparatus 102 shown in FIG. 2 is the same as the virtual reality display apparatus 100 shown FIG. 1 described above, except that the lens base material 34 has the convex surface and the concave surface, and the reflective type polarizer 40 and the absorption type linear polarizer 22 also laminated, molded into a curved surface, and bonded in addition to the first optically anisotropic layer 80 and the third optically anisotropic layer 90.

Therefore, the action of the virtual reality display apparatus 102 shown in FIG. 2 is the same as the action of the virtual reality display apparatus 100 shown in FIG. 1.

In the virtual reality display apparatus 102 shown in FIG. 2, the third optically anisotropic layer 90 (λ/4 retardation layer) is the specific layer in the first embodiment, and the optical laminate includes the first optically anisotropic layer 80 (layer consisting of a negative birefringent resin) and the third optically anisotropic layer 90.

In addition, the half mirror 30, the lens base material 34, the first optically anisotropic layer 80, the third optically anisotropic layer 90, the reflective type polarizer 40, and the absorption type linear polarizer 22 constitute the optical lens according to the first embodiment.

Figure 3:
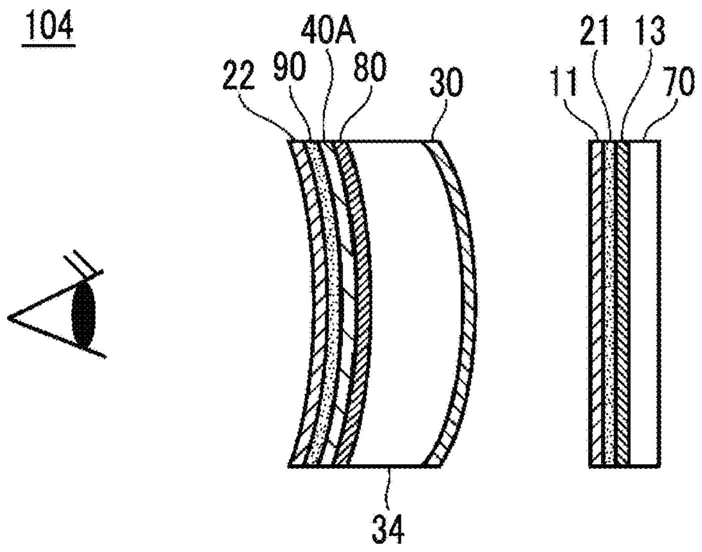
FIG. 3 is still another example of the virtual reality display apparatus according to the first embodiment of the present invention.

FIG. 3 conceptually shows still another example of the virtual reality display apparatus according to the first embodiment.

The virtual reality display apparatus 104 shown in FIG. 3 includes, from the right side in the drawing, an image display panel 70, a λ/4 retardation layer 13, an absorption type linear polarizer 21, and a λ/4 retardation layer 11; and a half mirror 30, a lens base material 34, a first optically anisotropic layer 80, a reflective type polarizer 40*a* (fourth optically anisotropic layer), a third optically anisotropic layer 90, and an absorption type linear polarizer 22.

In the virtual reality display apparatus 104 shown in FIG. 3 as well, the first optically anisotropic layer 80 is a layer consisting of a negative birefringent resin. In addition, the third optically anisotropic layer 90 is a λ4 retardation layer. On the other hand, in the present example, the reflective type polarizer 40A is a reflective type circular polarizer having a cholesteric liquid crystal layer.

Here, the lens base material 34 is the same as the lens base material described above, the half mirror 30 is molded into a curved surface and bonded to the convex surface side, and the first optically anisotropic layer 80, the reflective type polarizer 40A, the third optically anisotropic layer 90, and the absorption type linear polarizer 22 are laminated, molded into a curved surface, bonded to the concave surface side.

In the present example, the reflective type polarizer 40A (reflective type circular polarizer) and the third optically anisotropic layer 90 (λ/4 retardation layer) are the specific layer in the first embodiment, and the optical laminate includes the first optically anisotropic layer 80 (negative birefringent resin layer), the reflective type polarizer 40A, and the third optically anisotropic layer 90.

In addition, the half mirror 30, the lens base material 34, the first optically anisotropic layer 80, the reflective type polarizer 40A, the third optically anisotropic layer 90, and the absorption type linear polarizer 22 constitute the optical lens according to the first embodiment.

In the virtual reality display apparatus 104 shown in FIG. 3 as well, the image emitted by the image display panel 70 is converted into levorotatory circularly polarized light by the λ/4 retardation layer 11 and emitted, as in the virtual reality display apparatus 100 shown in FIG. 1.

Next, the levorotatory circularly polarized light converted by the λ/4 retardation layer 11 is incident on the half mirror 30, and half of the levorotatory circularly polarized light is transmitted. The levorotatory circularly polarized light transmitted through the half mirror 30 is transmitted through the lens base material 34 and the first optically anisotropic layer 80 (negative birefringent resin layer), and is incident on the reflective type polarizer 40A which is a reflective type circular polarizer having a cholesteric liquid crystal layer.

In the present example, as an example, the reflective type polarizer 40A is a reflective type circular polarizer which reflects the levorotatory circularly polarized light and transmits the other light.

Therefore, the levorotatory circularly polarized light incident on the reflective type polarizer 40A is reflected by the reflective type polarizer 40A, and is transmitted through the first optically anisotropic layer 80 and the lens base material 34 to be incident on the half mirror 30.

Half of the levorotatory circularly polarized light incident on the half mirror 30 is reflected by the half mirror 30. By the reflection, the levorotatory circularly polarized light is converted into dextrorotatory circularly polarized light.

The dextrorotatory circularly polarized light reflected by the half mirror 30 is transmitted through the lens base material 34 and the first optically anisotropic layer 80, and is incident on the reflective type polarizer 40A. As described above, the reflective type polarizer 40A is a reflective type circular polarizer (cholesteric liquid crystal layer) which reflects the levorotatory circularly polarized light and transmits the other light.

Therefore, the dextrorotatory circularly polarized light incident on the reflective type polarizer 40A is transmitted through the antireflection layer 50 and is incident on the third optically anisotropic layer 90.

The third optically anisotropic layer 90 is a λ/4 retardation layer disposed to align a slow axis direction such that dextrorotatory circularly polarized light is converted into linearly polarized light in the up-down direction of the paper surface. In addition, the absorption type linear polarizer 22 is a linear polarizer disposed with a transmission axis aligned to transmit linearly polarized light in the up-down direction of the paper surface.

Therefore, the dextrorotatory circularly polarized light incident on the third optically anisotropic layer 90 is converted into linearly polarized light in the up-down direction of the paper surface by the third optically anisotropic layer 90, and then is transmitted through the absorption type linear polarizer 22 and is observed by the user of the virtual reality display apparatus 100 as a virtual reality image.

The absorption type linear polarizer 22 prevents light which is unnecessarily transmitted through the reflective type polarizer 40A from being leaked (ghost) and observed by the user of the virtual reality display apparatus 100 by shielding the light.

That is, in a case where the levorotatory circularly polarized light is incident on the reflective type polarizer 40A for the first time, there is also the levorotatory circularly polarized light which is not reflected by the reflective type polarizer 40A and is unnecessarily transmitted through the reflective type polarizer 40A.

However, the levorotatory circularly polarized light is converted into linearly polarized light in the up-down direction of the paper surface by the third optically anisotropic layer 90 which is a λ/4 retardation layer converting the dextrorotatory circularly polarized light into linearly polarized light in the direction perpendicular to the paper surface. Therefore, since the linearly polarized light is absorbed by the absorption type linear polarizer 22 which is a linear polarizer disposed with a transmission axis aligned to transmit linearly polarized light in the up-down direction of the paper surface, the linearly polarized light is absorbed as leaked light, and thus the linearly polarized light can be prevented from being observed by the user.

As described above, in the virtual reality display apparatus 100 shown in FIG. 1, the optical laminate including the first optically anisotropic layer 80 containing a negative birefringent resin and the third optically anisotropic layer 90 which is a λ/4 retardation layer is molded into a curved surface and bonded to a convex surface of the lens base material 34 which is a convex lens.

In addition, in the virtual reality display apparatus 102 shown in FIG. 2, the optical laminate including the first optically anisotropic layer 80 containing a negative birefringent resin and the third optically anisotropic layer 90 which is a λ/4 retardation layer is molded into a curved surface and bonded to a concave surface of the lens base material 34.

Furthermore, in the virtual reality display apparatus 104 shown in FIG. 3, the optical laminate including the first optically anisotropic layer 80 containing a negative birefringent resin and the reflective type polarizer 40A which is a reflective type circular polarizer having a cholesteric liquid crystal layer (fourth optically anisotropic layer) is molded into a curved surface and bonded to a concave surface of the lens base material 34.

As described above, in a case where the optical laminate is molded into a curved surface, the optically anisotropic layer is stretched, so that a phase difference is exhibited in the optically anisotropic layer and the phase difference of the optically anisotropic layer is changed. In addition, in the molding of the curved surface, the optical laminate is stretched at different stretching ratios depending on the location, and the amount of expression, the amount of change, and the like of the phase difference may be different depending on the location.

For example, in a case where the optically anisotropic layer is a retardation layer such as a λ/4 retardation layer, by the stretching, the phase difference of the retardation layer may be unintentionally expressed due to the expression of the undesirable phase difference.

That is, in the virtual reality display apparatus 100 shown in FIG. 1 and the virtual reality display apparatus 102 shown in FIG. 2, in a case where the optical laminate including the third optically anisotropic layer 90 which is a λ/4 retardation layer is molded into a curved surface, the phase difference of the third optically anisotropic layer 90 may be unintentionally changed. In a case where the phase difference of the third optically anisotropic layer 90 is unintentionally expressed, the incident levorotatory circularly polarized light cannot be converted into appropriate the linearly polarized light, and is to be light including, for example, elliptically polarized light. Some of such light is not reflected by the reflective type polarizer 40 which is a reflective type linear polarizer, but is transmitted through the reflective type polarizer 40 and the absorption type linear polarizer 22 and observed by the user of the virtual reality display apparatus as leaked light (ghost).

On the other hand, the cholesteric liquid crystal layer usually does not have a phase difference.

However, the cholesteric liquid crystal layer may be stretched to express the phase difference.

That is, in the virtual reality display apparatus 104 shown in FIG. 3, the optical laminate including the reflective type polarizer 40A having a cholesteric liquid crystal layer is molded into a curved surface, so that the reflected circularly polarized light is converted into light including unintended circularly polarized light, such as elliptically polarized light. Some of these lights are leaked as light leakage without properly reciprocating between the reflective type polarizer 40A and the half mirror 30, and are observed by the user of the virtual reality display apparatus 104.

On the other hand, the optical laminate according to the first embodiment includes the first optically anisotropic layer 80 containing a negative birefringent resin. As is well known, the negative birefringent resin is a resin in which a refractive index is increased in a direction orthogonal to a stretching direction by stretching.

As described above, in the optical laminate according to the first embodiment, which includes at least one of the third optically anisotropic layer 90 as a λ/4 retardation layer or the like, or the cholesteric liquid crystal layer, the optical laminate is molded into a curved surface bonded to the lens base material 34, and so that the optical laminate is stretched in a bending direction, and the phase difference is changed, or a phase difference which is originally not present is exhibited, which causes the light leakage.

Here, the optical laminate according to the first embodiment includes the first optically anisotropic layer 80 containing the negative birefringent resin, in addition to the third optically anisotropic layer 90 (λ/4 retardation layer), the cholesteric liquid crystal layer, or the like. That is, in the optical laminate according to the first embodiment, the first optically anisotropic layer 80 containing the negative birefringent resin is also molded into a curved surface in the same manner as the λ/4 retardation layer, the cholesteric liquid crystal layer, and the like, and is stretched in the same direction.

As a result, in the optical laminate according to the first embodiment, the refractive index (phase difference) of the first optically anisotropic layer 80, that is, the negative birefringent resin is increased in a direction orthogonal to the stretching direction. In the first embodiment, the change in phase difference of the third optically anisotropic layer 90 (λ/4 retardation layer) generated by the stretching and the expression of the phase difference in the cholesteric liquid crystal layer generated by the stretching can be canceled out by the refractive index in the direction orthogonal to the stretching direction.

Therefore, with the optical laminate according to the first embodiment, for example, in a case of being applied to a pancake lens-type virtual reality display apparatus, it is possible to display a virtual reality image having high image quality by reducing the light leakage.

Hereinafter, the first optically anisotropic layer, the third optically anisotropic layer, and the cholesteric liquid crystal layer (fourth optically anisotropic layer), and the reflective type linear polarizer in the optical laminate according to the first embodiment will be described in detail.

<Optical Laminate>

The optical laminate according to the first embodiment includes a first optically anisotropic layer containing a negative birefringent resin, and a specific layer selected from a third optically anisotropic layer which is formed by immobilizing a uniformly aligned liquid crystal compound, such as a λ/4 retardation layer, or a cholesteric liquid crystal layer (fourth optically anisotropic layer) which is formed by immobilizing a helically aligned liquid crystal compound.

In addition, the optical laminate according to the first embodiment may include a second optically anisotropic layer consisting of a positive birefringent resin.

As described above, in the optical laminate according to the first embodiment, by including the first optically anisotropic layer in addition to the third optically anisotropic layer and the fourth optically anisotropic layer, in a case where the optical laminate is stretched, the expression of the phase difference (refractive index) in the first optically anisotropic layer and the change in phase difference or the expression of the phase difference in the other layers are canceled out, and the expression of the phase difference and the change in phase difference as the entire optical laminate can be suppressed.

<First Optically Anisotropic Layer>

The first optically anisotropic layer consists of a negative birefringent resin. The negative birefringent resin is a resin which exhibits negative birefringence in a case of being formed into a film. Such a resin also has negative intrinsic birefringence.

The negative birefringent resin is not particularly limited as long as it satisfies the above-described conditions, but in a case of producing a film by a melt extrusion method, it is preferable to use a material having favorable melt extrusion moldability. From this viewpoint, a cyclic olefin-based resin, a cellulose acylate-based resin, a maleimide-based copolymer resin, a polystyrene-based resin, an acrylic resin, a styrene-based resin such as polystyrenes, a polyacrylonitrile-based resin, or a polyvinyl acetal-based resin can be used. The cyclic olefin-based resin and the cellulose acylate-based resin exclude a positive birefringent resin, that is, a resin in which, in a case where light is incident on a layer formed of molecules aligned in a uniaxial direction, a refractive index of the light in the alignment direction is larger than a refractive index of the light in a direction orthogonal to the alignment direction.

In the first embodiment, among these, an acrylic resin or a polystyrene-based resin is preferably used.

The negative birefringent resin used in the first embodiment may contain one kind of resin, or may contain two or more kinds of resins different from each other. In addition, a resin having negative birefringence may be used alone, or in a case where the negative birefringence is exhibited by blending two or more kinds of resins, two or more kinds thereof may be used in combination.

In a case where the negative birefringent resin is a polymer blend of a resin which is a negative birefringent resin alone and a resin which is a positive birefringent resin alone, a blending proportion of the resin which is a negative birefringent resin alone with respect to the resin which is a positive birefringent resin alone varies depending on the absolute value of the intrinsic birefringence value of each of the resins, the expressiveness of birefringence at a molding temperature, and the like. In addition, the polymer blend may contain other components in addition to the resin which is a negative birefringent resin alone and the resin which is a positive birefringent resin alone. The component is not particularly limited as long as it does not impair the effect of the first embodiment, and can be appropriately selected according to the purpose, and suitable examples thereof include a compatibilizer. The compatibilizer can be suitably used in a case where phase separation occurs during blending, and by using the compatibilizer, a mixing state between the resin which is a negative birefringent resin alone and the resin which is a positive birefringent resin alone can be improved.

The negative birefringent resin used in the first embodiment is more preferably a polystyrene-based resin.

In the first embodiment, the polystyrene-based resin refers to a resin obtained by polymerizing styrene and a derivative of styrene as a main component, and a copolymer resin of styrene and another resin. The polystyrene-based resin which can be used in the first embodiment is not particularly limited as long as the effect of the first embodiment is not impaired, and a known polystyrene-based resin or the like can be used. In particular, it is preferable to use a copolymer resin of styrene and another resin, which can improve birefringence, film strength, and heat resistance.

Examples of the copolymer resin include a styrene-acrylonitrile-based resin, a styrene-acrylic resin, a styrene-maleic acid anhydride-based resin, and a polyelement (binary, ternary, and the like) copolymer of these resins. Among these, from the viewpoint of heat resistance and film strength, a styrene-acrylic resin or a styrene-maleic acid anhydride-based resin is preferable.

In the styrene-maleic acid anhydride-based resin, a mass compositional ratio of styrene and maleic acid anhydride is preferably 95:5 to 50:50 and more preferably 90:10 to 70:30. In addition, in order to adjust intrinsic birefringence, hydrogenation of the styrene-based resin can also be preferably used. Examples of the styrene-maleic acid anhydride-based resin include "Daylark D332" manufactured by NOVA Chemicals Corporate. In addition, as the styrene-acrylic resin, "DELPET 980N" manufactured by Asahi Kasei Corporation, which will be described later, or the like can be used.

The polystyrene-based resin may be an amorphous polystyrene-based resin or a crystalline polystyrene-based resin. Here, from the viewpoint of mechanical strength, it is preferable to contain a crystalline polystyrene-based resin, and from the viewpoint of facilitating curved surface molding, it is preferable to contain an amorphous polystyrene-based resin.

Examples of the crystalline polystyrene-based resin include a polystyrene-based resin having a syndiotactic structure and a polystyrene-based resin having an isotactic structure. Examples of the amorphous polystyrene-based resin include a polystyrene-based resin having an atactic structure.

The polystyrene-based resin may have a syndiotactic structure, an isotactic structure, or an atactic structure, but a syndiotactic structure is preferable. The polystyrene-based resin having a syndiotactic structure has high mechanical strength and small thermal shrinkage rate, which is particularly excellent.

The polystyrene-based resin having a syndiotactic structure used in the first embodiment has a three-dimensional structure in which a phenyl group, a derivative thereof, or the like, which is a side chain, is alternately positioned in opposite directions with respect to a main chain formed of a carbon-carbon bond, and tacticity is quantitatively determined by nuclear magnetic resonance method (13C-NMR method) using isotopic carbon, which is general and excellent in accuracy. The tacticity measured by the 13C-NMR method can be represented by the presence proportion of a plurality of consecutive constitutional units, for example, dyad in a case of two, triad in a case of three, and pentad in a case of five.

The polystyrene-based resin having a syndiotactic structure, which can be preferably used in the first embodiment, has tacticity with a usually 75% to 100%, preferably 85% to 100%, of racemic dyad or 30% to 100%, preferably 50% to 100%, of racemic pentad.

Specific examples thereof include polystyrenes having tacticity, such as poly(alkylstyrene), poly(halogenated styrene), poly(halogenated alkylstyrene), poly(alkoxystyrene), and poly(vinyl benzoic acid ester). Here, the poly(alkylstyrene) include poly(methylstyrene), poly(ethylstyrene), poly(propylstyrene), poly(butylstyrene), poly(phenylstyrene), poly(vinylnaphthalene), poly(vinylstyrene), poly(acenaphthene), and the like. In addition, the poly(halogenated styrene) includes poly(chlorostyrene), poly(bromostyrene), poly(fluorostyrene) and the like. In addition, the poly(alkoxystyrene) include poly(methoxystyrene), poly(ethoxystyrene), and the like. Among these, poly(styrene) or poly(methylstyrene) is more preferable, and poly(styrene) is still more preferable.

These polystyrene-based resins having a syndiotactic structure may be a copolymer other than the above-described homopolymer.

Examples of a comonomer component of the copolymer include an olefin monomer such as ethylene, propylene, butene, hexene, and octene; a diene monomer such as butadiene and isoprene; and a polar vinyl monomer such as a cyclic olefin monomer, a cyclic diene monomer, methyl methacrylate, maleic acid anhydride, and acrylonitrile, in addition to the monomers constituting the styrene-based polymer described above. Among these, a copolymer of styrene as a main component and alkylstyrene, hydrogenated styrene, or halogenated styrene is preferable. Among these, p-methylstyrene, m-methylstyrene, p-tert-butylstyrene, p-chlorostyrene, m-chlorostyrene, p-fluorostyrene, or hydrogenated styrene is preferable, and p-methylstyrene is particularly preferable.

Addition amounts thereof are preferably 0% to 30% by mass, more preferably 1% to 20% by mass, and still more preferably 3% to 10% by mass of the entire polymer. These copolymerizations slow down a crystallization rate and suppress generation of spherulites. As a result, it is possible to obtain a polystyrene-based resin having a syndiotactic structure, which has high transparency and high bending strength.

In addition, the syndiotactic polystyrene-based polymer may be used in a blended form with another polymer.

As a preferred polymer blend component, from the viewpoint of compatibility, a styrene-based polymer having a syndiotactic structure as described above or a styrene-based polymer having an atactic structure is preferable. Among these, it is particularly preferable to blend at least one of a homopolymer having a syndiotactic structure or an atactic structure, which has polystyrene having a syndiotactic structure as a main component and has, as constitutional components, p-methylstyrene, m-methylstyrene, p-tert-butylstyrene, p-chlorostyrene, m-chlorostyrene, p-fluorostyrene, hydrogenated styrene, and the like, or a copolymer having a syndiotactic structure or an atactic structure, which consists of at least one of these monomers and styrene. In particular, it is preferable to blend p-methylstyrene having a syndiotactic structure or a copolymer of p-methylstyrene having a syndiotactic structure or the like and styrene, with polystyrene having a syndiotactic structure. Addition amounts of these polymers to be blended are preferably 0% to 30% by mass, more preferably 1% to 20% by mass, and still more preferably 3% to 10% by mass of the total amount of the polymers.

Examples of a commercially available product of the syndiotactic polystyrene include XAREC S105 (manufactured by Idemitsu Kosan Co., Ltd.).

Examples of a commercially available product of the atactic polystyrene include HF77 (manufactured by PS Japan Corporation).

From the viewpoint of facilitating the molding into a curved surface shape, the negative birefringent resin used in the first optically anisotropic layer preferably has a (tan δ) (loss tangent (loss coefficient)) peak temperature of 170° C. or lower. From the viewpoint that the laminated optical film can be molded at a low temperature, the tan δ peak temperature is preferably 150° C. or lower and more preferably 130° C. or lower.

Here, a method of measuring tan δ will be described.

E" (loss elastic modulus) and E' (storage elastic modulus) of a film sample which has been humidity-adjusted in advance in an atmosphere of a temperature of 25° C. and a humidity of 60% Rh for 2 hours or longer are measured under the following conditions using a dynamic viscoelasticity measuring device (DVA-200, manufactured by IT Measurement & Control Co., Ltd.), and the values are used to acquire the tan δ (=E"/E').

Device: DVA-200 manufactured by IT Measurement & Control Co., Ltd.

Sample: 5 mm, length of 50 mm (gap of 20 mm)

Measurement conditions: tension mode

Measurement temperature: −150° C. to 220° C.

Heating conditions: 5° C./min

Frequency: 1 Hz

Typically in optical applications, a resin base material subjected to a stretching treatment is frequently used, and the tan δ peak temperature is frequently increased due to the stretching treatment. For example, with a triacetyl cellulose (TAC) base material (for example, TG40 manufactured by FUJIFILM Corporation), the tan δ peak temperature is 180° C. or higher.

Such a first optically anisotropic layer may be used as a support in a case of forming the reflective type polarizer, the third optically anisotropic layer, and the like.

<Second Optically Anisotropic Layer>

The optical laminate according to the first embodiment may include a second optically anisotropic layer. The second optically anisotropic layer consists of a positive birefringent resin. The positive birefringent resin is a resin which exhibits positive birefringence in a case of being formed into a film. Such a resin also has positive intrinsic birefringence.

The second optically anisotropic layer acts as, for example, a support in a case of forming the reflective type polarizer, the third optically anisotropic layer, or the like, and may be peeled off after forming these layers.

The positive birefringent resin is not particularly limited, and for example, a material having positive birefringence, such as cellulose acylate, polycarbonate, polysulfone, polyethersulfone, cyclic polyolefin, polyolefin, polyamide, polystyrene, and polyester, can be used. Among these, cellulose acylate, polycarbonate, or cyclic polyolefin is preferable.

<Third Optically Anisotropic Layer>

The third optically anisotropic layer is a layer in which a uniformly aligned liquid crystal compound is immobilized. The third optically anisotropic layer is the specific layer in the first embodiment.

For example, a layer formed by uniformly aligning rod-like liquid crystal compounds horizontally to the in-plane direction, a layer formed by uniformly aligning disk-like liquid crystal compounds vertically to the in-plane direction, or the like can be used. Furthermore, for example, a retardation layer having reverse dispersibility can be prepared by uniformly aligning rod-like liquid crystal compounds having reverse dispersibility and immobilizing the compounds with reference to JP2020-084070A and the like.

As described above, examples of the third optically anisotropic layer include a λ/4 retardation layer (λ/4 plate or λ/4 wavelength plate). The λ/4 retardation layer used in the first embodiment may be a single-layer type in which one layer of the optically anisotropic layer is formed, or may be a laminated type wavelength plate in which two or more layers of the optically anisotropic layers having different slow axes are laminated. Specific examples of the laminated type λ/4 retardation layer are mentioned in WO2013/137464A, WO2016/158300A, JP2014-209219A, JP2014-209220A, WO2014/157079A, JP2019-215416A, WO2016/158300A, WO2019/160044A, and the like.

<Fourth Optically Anisotropic Layer>

The fourth optically anisotropic layer is a cholesteric liquid crystal layer obtained by immobilizing a helically aligned liquid crystal compound. The cholesteric liquid crystal layer is the specific layer in the first embodiment, and as described above, it is the reflective type polarizer 40A (reflective type circular polarizer) in the virtual reality display apparatus 104 shown in FIG. 3.

As is well known, the cholesteric liquid crystal layer has a helical structure in which the liquid crystal compound is helically turned and laminated. In the helical structure, a configuration in which the liquid crystal compound is helically rotated once (rotated by 360°) and laminated is set as single helical period (the helical period), and the helically turned liquid crystal compounds are laminated a plurality of periods.

The cholesteric liquid crystal layer reflects levorotatory circularly polarized light or dextrorotatory circularly polarized light in a specific wavelength range and allows the transmission of the other light depending on the length of the helical period and the helical turning direction (sense) of the liquid crystal compound.

Therefore, in a case where the virtual reality display apparatus displays a color image, the reflective type circular polarizer may include, for example, a plurality of cholesteric liquid crystal layers including a cholesteric liquid crystal layer that has a central wavelength of selective reflection for red light, a cholesteric liquid crystal layer that has a central wavelength of selective reflection for green light, and a cholesteric liquid crystal layer that has a central wavelength of selective reflection for blue light.

In the first embodiment, various known materials can be used as the cholesteric liquid crystal layer.

In the optical laminate (optical lens) according to the first embodiment, a reflective type linear polarizer may be used instead of the fourth optically anisotropic layer, that is, the cholesteric liquid crystal layer.

In the first embodiment, various known materials can be used as the reflective type linear polarizer.

Examples of the reflective type linear polarizer include a film obtained by stretching a layer containing two types of polymers, a wire grid polarizer, and the like, as described in JP2011-053705A. From the viewpoint of brightness, a film in which a layer including a polymer is stretched is preferable. As a commercially available product thereof, a reflective type polarizer (trade name: APF) manufactured by 3M Company, a wire grid polarizer (trade name: WGF) manufactured by Asahi Kasei Corporation, or the like can be suitably used.

<Virtual Reality Display Apparatus>

The virtual reality display apparatus according to the first embodiment includes an image display device emitting at least polarized light, and the optical lens according to the first embodiment, which is obtained by bonding the optical laminate according to the first embodiment to a lens base material. In addition, the virtual reality display apparatus according to the first embodiment may include a λ/4 retardation layer, an absorption type linear polarizer, a half mirror, or the like in addition to these components, and may further include an additional optical member such as a visual acuity adjustment lens.

Various known λ/4 retardation layers can be used as the λ/4 retardation layer used in the virtual reality display apparatus. Examples of the λ/4 retardation layer include a λ/4 retardation layer as the third optically anisotropic layer obtained by immobilizing a uniformly aligned liquid crystal compound, a triacetyl cellulose retardation layer, a polymer carbonate retardation layer, and a cycloolefin retardation layer.

As the absorption type linear polarizer, various known absorption type linear polarizers can be used, and the absorption type linear polarizer may be a coating type polarizer or a stretching type polarizer. Examples of the absorption type linear polarizer include an iodine-based polarizer, a dye-based polarizer using a dichroic dye, and a polyene-based polarizer. In addition, an absorption type linear polarizer produced by adsorbing iodine or a dichroic dye to polyvinyl alcohol and stretching the polyvinyl alcohol can also be suitably used.

<Image Display Device>

In the virtual reality display apparatus of the first embodiment, as the image display device, a known image display device can be used.

Examples thereof include a display device in which self-luminous microscopic light emitters are arranged on a transparent substrate, such as an organic electroluminescent display device, a light emitting diode (LED) display device, and a micro LED display device. In these self-luminous display devices, a (circular) polarizing plate is usually bonded to a display surface to prevent reflection on the display surface. Therefore, the emitted light is polarized. In addition, a liquid crystal display device is exemplified as other image display devices. Since the liquid crystal display device also has a polarizing plate on the surface, the emitted light is polarized.

In the virtual reality display apparatuses shown in FIGS. 1 to 3, the image display device is composed of the image display panel 70, the λ/4 retardation layer 13, the absorption type linear polarizer 21, and the λ/4 retardation layer 11. In addition, as described above, the image display device may include the antireflection layer 50.

Hereinafter, the second embodiment will be described in detail.

<Optically Anisotropic Film>

The optically anisotropic film according to the second embodiment includes a first optically anisotropic layer having an optical axis, in which the first optically anisotropic layer has a non-linearly aligned region in which at least an orientation of the optical axis continuously changes in a plane.

In addition, it is preferable that the optically anisotropic film further includes a second optically anisotropic layer having an optical axis, in which an orientation of the optical axis is uniform in a plane. Generally, a plurality of optically anisotropic layers are used in the pancake lens, but in order to appropriately control an angle between the first optically anisotropic layer and the second optically anisotropic layer, it is preferable that the optically anisotropic film includes both the first optically anisotropic layer and the second optically anisotropic layer and that the orientation of the optical axis of the first optically anisotropic layer and the orientation of the optical axis of the second optically anisotropic layer are changed at the same time in a case where the optically anisotropic film is molded into a three-dimensional shape.

<First Optically Anisotropic Layer>

As described above, the first optically anisotropic layer according to the second embodiment has a non-linearly aligned region in which at least the orientation of the optical axis continuously changes in the plane. Here, the "orientation of the optical axis continuously changes in the plane" means that, in a case where a short line segment representing the orientation of the optical axis is drawn at each position in the plane, an envelope connecting these line segments is not a straight line.

In addition, it is preferable that the orientation of the optical axis is distributed in a point-symmetrical manner with at least one point as a center. In a case of such a distribution, when the optically anisotropic film is molded into a curved surface having rotational symmetry, the orientation of the optical axis after the molding is also point-symmetrical, and thus it is possible to suppress unevenness of an image to be displayed in the virtual reality display apparatus using a pancake lens, which is preferable.

In addition, it is also preferable that an optical thickness of the first optically anisotropic layer in the non-linearly aligned region continuously changes in the plane. In particular, in a case where the optically anisotropic film is molded into a three-dimensional shape, it is preferable that the optical thickness is changed in accordance with different stretching ratios for each location so that the optical thickness after the molding is uniform in the plane. The optical thickness can be changed not only by adjusting a physical film thickness but also by adjusting refractive index, birefringence, optical density, or the like.

In the retardation layer, the optical thickness refers to a product of an actual film thickness and a birefringence Δn. In addition, in a case of an absorbent film, the value is obtained by multiplying the actual film thickness by a light absorption coefficient.

The first optically anisotropic layer according to the second embodiment may be a retardation layer. In this case, the retardation layer is preferably a λ/4 plate. A ¼ plate may have a phase difference of approximately ¼ wavelength at any of the wavelengths in the visible range. For example, a retardation plate having a retardation of approximately 138 nm at a wavelength of 550 nm can be suitably used. In addition, from the viewpoint of suppressing stray light, ghost, and the like in the virtual reality display apparatus and further improving display performance such as brightness and color reproducibility, it is preferable that the ¼ wave plate has reverse dispersibility with respect to the wavelength. Here, the expression "having reverse dispersibility with respect to the wavelength" denotes that as the wavelength increases, the value of phase difference at the wavelength increases.

In a case where the first optically anisotropic layer is a retardation layer, a slow axis thereof is the optical axis in the second embodiment. That is, in a case where the first optically anisotropic layer is a retardation layer, the first optically anisotropic layer has at least a non-linearly aligned region in which an orientation of the slow axis continuously changes in the plane.

In a case where the first optically anisotropic layer is a retardation layer, the expression "non-linearly aligned region in which the orientation of the optical axis (slow axis) continuously changes in the plane" refers to a region in which the orientation of the slow axis observed in each measurement range continuously changes, by performing the operation of measuring the predetermined measurement range with AxoScan to obtain the direction of the slow axis in the range, a plurality of times in one direction in the plane. That is, in a case where the two measurement ranges continuous in one direction in the plane have different orientations of the slow axes from each other, a region including the two measurement ranges is the "non-linearly aligned region".

The continuous measurement ranges are not limited to those in contact with each other, and may be spaced apart from each other or may overlap with each other even in a case where the ranges are shifted.

A size of one measurement range is preferably φ0.1 to φ2 mm and more preferably φ0.1 to φ1 mm.

In addition, an interval between the continuous measurement ranges (interval between the centers) is preferably 1 to 10 mm and more preferably 1 to 2 mm.

In addition, the "orientation of the optical axis (slow axis) continuously changes in the plane" means that the orientation of the optical axis in each measurement range is changed in a rotation direction of either right rotation or left rotation along one direction in the plane. In addition, in the second embodiment, the rotation direction of the optical axis in one direction in the plane is a rotation direction of the optical axis, in which angles between the optical axes of the continuous measurement ranges are smaller.

Figure 4:
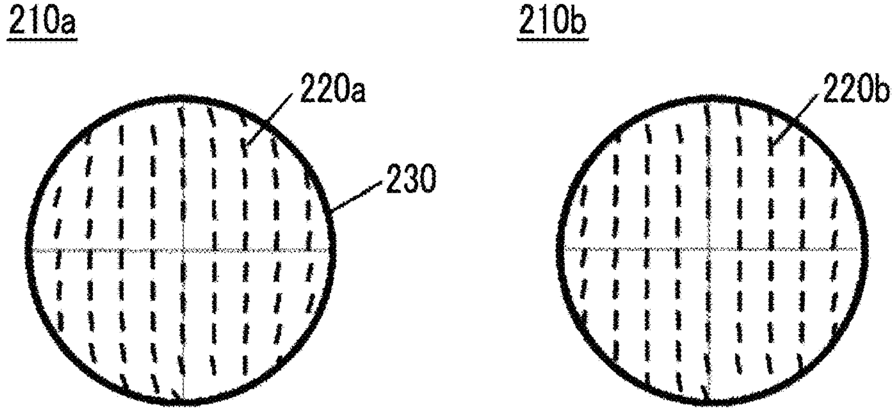
FIG. 4 is an example of a first optically anisotropic layer according to a second embodiment of the present invention.

The "non-linearly aligned region" will be further described with reference to a diagram showing a first optically anisotropic layer 210*a* shown in FIG. 4, which will be described later. The first optically anisotropic layer 210*a* shown in FIG. 4 is a diagram showing the first optically anisotropic layer 210*a*, in which the orientation of the optical axis is measured by AxoScan at a plurality of in-plane locations and the orientation of the slow axis is shown to correspond to the in-plane position of the measurement range as indicated by a reference numeral 220*a*. The first optically anisotropic layer 210*a* shown in FIG. 4 is, for example, a layer laminated along a curved surface of a convex lens or a concave lens, which is rotationally symmetrical. Therefore, as will be described later, the first optically anisotropic layer 210*a* shown in FIG. 4 is formed in a substantially spherically crowned shape. Therefore, a region where the first optically anisotropic layer 210*a* is molded has a substantially circular shape.

In a case where an up-down direction passing through a center of the first optically anisotropic layer 210*a* is defined as the one direction in the plane, it can be said that the slow axes of the three measurement ranges on the upper side in the drawing are rotated clockwise (to the right) from the top to the bottom. In addition, the slow axes of the third measurement range from the top to the sixth measurement range are not rotated and are parallel to each other. Furthermore, it can be said that the sixth measurement range from the top to the ninth measurement range is rotated counterclockwise (to the left) from the top to the bottom.

Therefore, in the first optically anisotropic layer 210*a* of the example shown in FIG. 4, a region connecting the first measurement range to the third measurement range from the top corresponds to the "non-linearly aligned region" in the second embodiment; and a region connecting the sixth measurement range to the ninth measurement range from the top corresponds to the "non-linearly aligned region" in the second embodiment, in the up-down direction passing through the center. The upper non-linearly aligned region and the lower non-linearly aligned region are changed in a rotation direction along the one direction. In the second embodiment, the first optically anisotropic layer has such a "non-linearly aligned region".

In addition, in the first optically anisotropic layer 210*a* shown in FIG. 4, the orientation of the optical axis (slow axis) in each measurement range is distributed in a point-symmetrical manner with respect to the center.

In addition, in the first optically anisotropic layer of the second embodiment, in a case where the change in orientation (angle) of the optical axis in each measurement range along the one direction in the plane is integrated, the total value of changed angles is preferably 0° to 10°, more preferably 0° to 5°, and still more preferably 0° to 3°. The change in angle of the optical axis of the continuous measurement range is integrated with the right rotation as plus and the left rotation as minus.

The distribution of the orientation of the optical axis in the first optically anisotropic layer may be appropriately set according to a shape in which the first optically anisotropic layer is molded (curvature radius or the like of the curved surface), the form of the other laminated layers (for example, the second optically anisotropic layer described later), and the like. In addition, a shape of the molding region in the first optically anisotropic layer may be appropriately set to a circular shape, an elliptical shape, an amorphous shape, or the like according to the shape of the first optically anisotropic layer to be molded.

For example, as in the example shown in FIG. 4, in a case where the first optically anisotropic layer 210*a* is molded into a substantially spherically crowned shape, a difference in stretching rate between a diameter direction and a circumferential direction is larger in a region closer to the edge part, and a stretching ratio in a vertical direction and a stretching ratio in a horizontal direction are different from each other depending on the position. Therefore, the change in orientation of the optical axis in a case of molding is larger in the region closer to the edge part. Accordingly, in a case where the first optically anisotropic layer 210*a* is molded into a substantially spherically crowned shape, the first optically anisotropic layer 210*a* may have the non-linearly aligned region in the region close to the edge part, in order to correct the change in orientation of the optical axis.

The first optically anisotropic layer according to the second embodiment may be a polarizer layer. In this case, the polarizer layer contains at least a matrix compound and a dichroic substance, and an alignment degree of the dichroic substance is preferably 0.95 or more. The alignment degree of the dichroic substance is more preferably 0.97 or more, and as the alignment degree is higher, the stray light, the ghost, and the like can be suppressed more effectively.

In a case where the first optically anisotropic layer is a polarizer layer, an absorption axis thereof is the optical axis in the second embodiment. That is, in a case where the first optically anisotropic layer is a polarizer layer, the first optically anisotropic layer has at least a non-linearly aligned region in which an orientation of the absorption axis continuously changes in the plane.

In a case where the first optically anisotropic layer is a polarizer layer, the first optically anisotropic layer has the same configuration as the configuration in the case of the retardation layer described above, except that the slow axis is reinterpreted as the absorption axis.

In a case where the first optically anisotropic layer is a polarizer layer, the orientation of the absorption axis in each measurement range can be obtained by AxoScan.

The first optically anisotropic layer according to the second embodiment is also preferably a layer obtained by immobilizing a liquid crystal compound. Since the liquid crystal compound can be aligned in any orientation by photo alignment or the like, it is easy to continuously change the orientation of the optical axis in the plane, and is suitable for producing the non-linearly aligned region. In addition, in a case where the liquid crystal compound is aligned and then immobilized by photopolymerization or the like, the alignment orientation of the liquid crystal compound can be fixed.

In a case where the first optically anisotropic layer is a retardation layer, for example, a retardation layer having reverse dispersibility can also be produced by uniformly aligning and immobilizing a rod-like liquid crystal compound having reverse dispersibility, for example, with reference to JP2020-084070A. In addition, in a case where the first optically anisotropic layer is a polarizer layer, the polarizer layer can be produced by aligning and immobilizing a mixture containing a liquid crystal compound and a dichroic substance. That is, the liquid crystal compound corresponds to the above-described matrix compound.

<Second Optically Anisotropic Layer>

The second optically anisotropic layer is characterized in that an optical axis is uniformly aligned. The second optically anisotropic layer is not particularly limited, and may be, for example, a layer produced by stretching a film consisting of cellulose acylate, polycarbonate, polysulfone, polyethersulfone, polyacrylate, polymethacrylate, cyclic polyolefin, polyolefin, polyamide, polystyrene, polyester, or the like. In addition, a layer in which the liquid crystal compound is uniformly aligned and immobilized may be used.

The second optically anisotropic layer may be a retardation layer or a polarizer layer, and can be appropriately selected according to the required function, the use purpose, and the like.

The optically anisotropic film according to the second embodiment may be a laminate in which one of the first optically anisotropic layer or the second optically anisotropic layer is directly coated with the other, or a laminate in which the first optically anisotropic layer and the second optically anisotropic layer are individually produced and then bonded to each other.

<Substrate>

The optically anisotropic film according to the second embodiment may include other members such as a substrate. The substrate is not particularly limited, but from the viewpoint of facilitating the molding into a three-dimensional shape, the substrate preferably has a (tan δ) (loss tangent (loss coefficient)) peak temperature of 170° C. or lower. From the viewpoint that the laminated optical film can be molded at a low temperature, the tan δ peak temperature is preferably 150° C. or lower and more preferably 130° C. or lower. Examples of the substrate in which the tan δ peak temperature is 170° C. or lower include polyacrylate and polymethacrylate, cyclic polyolefin, and polyolefin.

Here, a method of measuring tan δ will be described.

E" (loss elastic modulus) and E' (storage elastic modulus) of a film sample which has been humidity-adjusted in advance in an atmosphere of a temperature of 25° C. and a humidity of 60% Rh for 2 hours or longer are measured under the following conditions using a dynamic viscoelasticity measuring device (DVA-200, manufactured by IT Measurement & Control Co., Ltd.), and the values are used to acquire tan δ (=E"/E').

Device: DVA-200 manufactured by IT Measurement & Control Co., Ltd.
Sample: 5 mm, length of 50 mm (gap of 20 mm)
Measurement conditions: tension mode
Measurement temperature: −150° C. to 220° C.
Heating conditions: 5° C./min
Frequency: 1 Hz Typically in optical applications, a resin base material subjected to a stretching treatment is frequently used, and the tan δ peak temperature is frequently increased due to the stretching treatment. For example, with a triacetyl cellulose (TAC) base material (for example, TG40 manufactured by FUJIFILM Corporation), the tan δ peak temperature is 180° C. or higher.

<Molded Body>

The molded body according to the second embodiment is a molded body obtained by molding the optically anisotropic film including the first optically anisotropic layer and the second optically anisotropic layer into a three-dimensional shape including a curved surface, in which the optical axis of the first optically anisotropic layer and the optical axis of the second optically anisotropic layer form an angle of 45° in the non-linearly aligned region of the first optically anisotropic layer.

Here, an example of the change in distribution of the orientation of the optical axis in the non-linearly aligned region included in the first optically anisotropic layer is shown in FIG. 4. The reference numeral 210*a* represents a first optically anisotropic layer before the optically anisotropic film is molded into a three-dimensional shape. In a non-linearly aligned region 230, an orientation 220*a* of the optical axis is distributed in a point-symmetrical manner with at least one point as a center of the non-linearly aligned region 230. A first optically anisotropic layer 210*b* after the optically anisotropic film is molded into a three-dimensional shape is stretched at a partially different stretching ratio, so that the orientation of the optical axis is changed and a distribution as the reference numeral 220*b* is formed.

Figure 5:
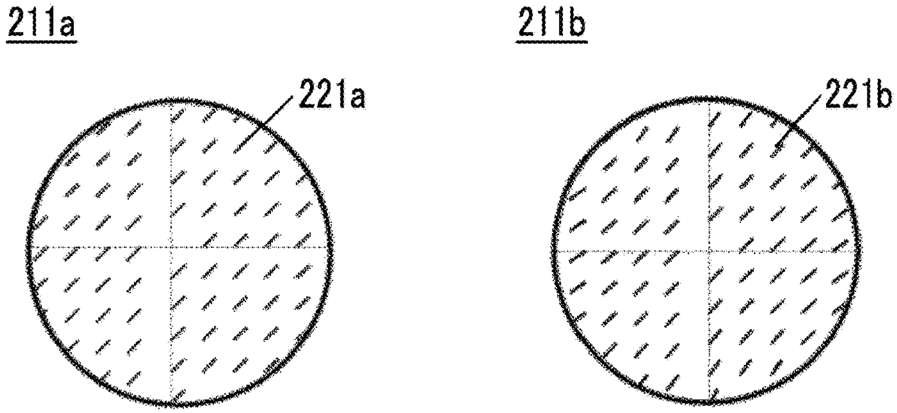
FIG. 5 is an example of a second optically anisotropic layer according to the second embodiment of the present invention.

In addition, FIG. 5 shows the change in distribution of the orientation of the optical axis in the second optically anisotropic layer. The reference numeral 211*a* represents a second optically anisotropic layer before the optically anisotropic film is molded into a three-dimensional shape. The orientation 221*a* of the optical axis is uniformly aligned. On the other hand, a second optically anisotropic layer 211*b* after the optically anisotropic film is molded into a three-dimensional shape is stretched at a partially different stretching ratio, so that the orientation of the optical axis is changed and a non-uniform distribution as the reference numeral 221*b* is formed.

Figure 6:
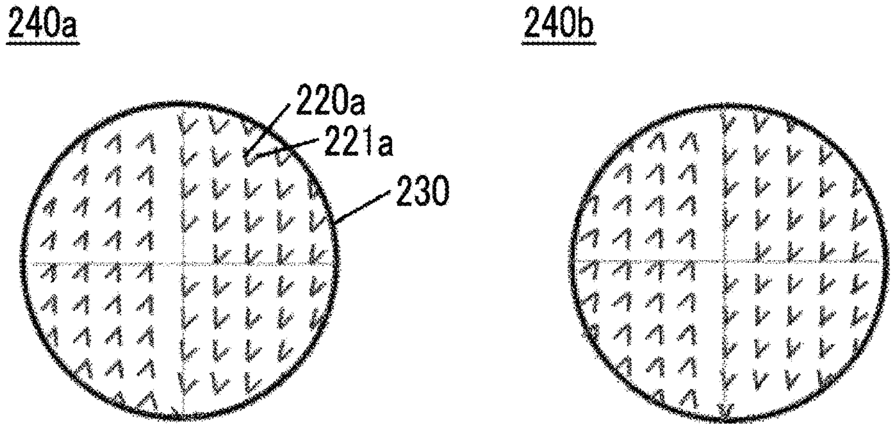
FIG. 6 is an example of an optically anisotropic film and a molded body according to the second embodiment of the present invention.

FIG. 6 shows the change in distribution of each optical axis in the optically anisotropic film including the first optically anisotropic layer and the second optically anisotropic layer. A reference numeral 240*a* is an optically anisotropic film before being molded into a three-dimensional shape. Angles between optical axes of the respective optically anisotropic layers are different depending on the location. On the other hand, in a molded body 240*b* after the optically anisotropic film is molded into a three-dimensional shape, as a result of changing the orientation of each optical axis by the molding, the angle between the optical axes is 45° in the non-linearly aligned region 230 regardless of the position.

As a method of molding the optically anisotropic film into a three-dimensional shape, for example, thermal molding or vacuum molding can be used. Specific examples thereof include insert molding as described in JP2004-322501A; and vacuum molding, injection molding, blow molding, decompression coating molding, in-mold transfer, and mold pressing as described in WO2010/1867A, JP2012-116094A, and the like.

It is also preferable to perform heating during the molding, and the temperature is preferably 80° C. to 170° C., more preferably 100° C. to 150° C., and still more preferably 110° C. to 140° C.

<Virtual Reality Display Apparatus>

The optically anisotropic film according to the second embodiment, which is molded into a three-dimensional shape, can be suitably used as a part of a so-called pancake lens in a virtual reality display apparatus.

Figure 7:
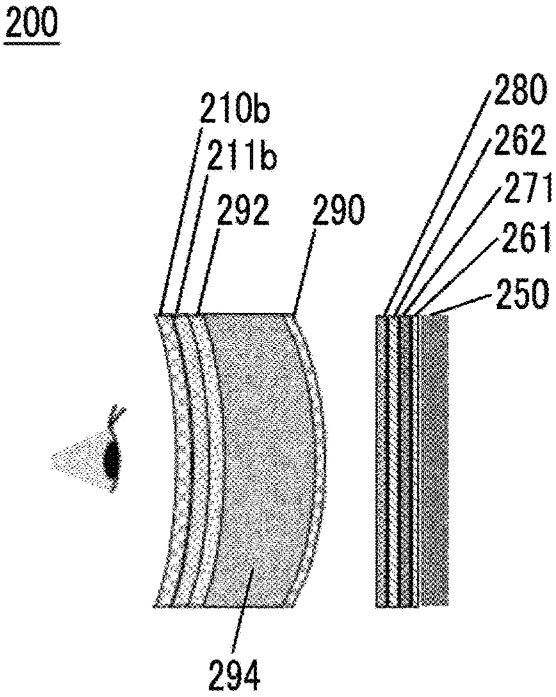
FIG. 7 is an example of a virtual reality display apparatus using the molded body according to the second embodiment of the present invention.

FIG. 7 is a view conceptually showing an example of a virtual reality display apparatus including the optically anisotropic film according to the second embodiment, which is molded into a three-dimensional shape.

A virtual reality display apparatus 200 shown in FIG. 7 includes an image display panel 250, a λ/4 retardation layer 261, an absorption type linear polarizer 271, a λ/4 retardation layer 262, an antireflection layer 280, a half mirror 290, a lens base material 294, a reflective circular polarizer 292, a second optically anisotropic layer 211*b*, and a first optically anisotropic layer 210*b*.

In the example shown in FIG. 7, the λ/4 retardation layer 261, the absorption type linear polarizer 271, the λ/4 retardation layer 262, and the antireflection layer 280 are laminated in this order on a display surface side of the image display panel 250.

The lens base material 294 is disposed at a predetermined distance from the image display panel 250 (antireflection layer 280) and spaced apart from the image display panel 250, and has a surface on the image display panel 250 side, which is a convex surface, and a surface on the opposite side, which is a concave surface.

The half mirror 290 is laminated on the convex surface side of the lens base material 294 and is curved along a curved surface shape of the convex surface of the lens base material 294.

On the concave surface side of the lens base material 294, the reflective circular polarizer 292, the second optically anisotropic layer 211*b*, and the first optically anisotropic layer 210*b* are laminated in this order, and are bent along the curved surface shape of the concave surface of the lens base material 294. In addition, in the present example, the first optically anisotropic layer 210*b* is a polarizer layer, and the second optically anisotropic layer 211*b* is a retardation layer (λ/4 retardation layer).

In such a virtual reality display apparatus 200, in a case where light (video light) of unpolarized light is emitted from the image display panel 250, the light passes through the λ/4 retardation layer 261 as the unpolarized light, is converted into linearly polarized light by the absorption type linear polarizer 271, and is converted into circularly polarized light by the λ/4 retardation layer 262. That is, a transmission axis of the absorption type linear polarizer 271 and a slow axis of the λ/4 retardation layer 262 are disposed to be approximately 45°.

As an example, in a case where the levorotatory circularly polarized light is converted by the λ/4 retardation layer 262, the levorotatory circularly polarized light is incident on the half mirror 290.

Approximately half of the levorotatory circularly polarized light incident on the half mirror 290 is transmitted through the half mirror 290, is transmitted through the lens base material 294, and is incident on the reflective circular polarizer 292. In this case, since the reflective circular polarizer 292 is a circularly polarizing plate which reflects the levorotatory circularly polarized light and transmits the dextrorotatory circularly polarized light, the incident levorotatory circularly polarized light is reflected by the reflective circular polarizer 292 toward the half mirror 290 side.

Approximately half of the levorotatory circularly polarized light reflected by the reflective circular polarizer 292 and incident on the half mirror 290 is reflected by the half mirror 290. In this case, the levorotatory circularly polarized light is converted into dextrorotatory circularly polarized light.

The dextrorotatory circularly polarized light reflected by the half mirror 290 is transmitted through the lens base material 294 and is incident on the reflective circular polarizer 292, but since the reflective circular polarizer 292 is a circularly polarizing plate which transmits the dextrorotatory circularly polarized light, the incident dextrorotatory circularly polarized light is transmitted through the reflective circular polarizer 292 and is incident on the second optically anisotropic layer 211*b*. The dextrorotatory circularly polarized light incident on the second optically anisotropic layer 211*b* which is a retardation layer is converted into linearly polarized light and is incident on the first optically anisotropic layer 210*b*. Since the first optically anisotropic layer 210*b* which is a polarizer layer is disposed to transmit the linearly polarized light, the linearly polarized light is transmitted through the first optically anisotropic layer 210*b* and is emitted toward an user U. Here, in a case of being viewed from the user U side, since the half mirror 290 is formed into a concave shape, light is emitted to the viewing side in a state in which the light is converged more than immediately after being emitted from the image display panel 250 by the action of the concave mirror of the half mirror 290. As a result, the light appears to be emitted from a position farther than the image display panel 250. Therefore, the user U who sees the light appears to be irradiated with the light from a rear side (side opposite to the user U side) of the image display panel 250. As a result, the video (image) displayed by the image display panel 250 is visually recognized by the user U as a virtual image on the rear side of the image display panel 250.

In addition, approximately half of the levorotatory circularly polarized light reflected by the reflective circular polarizer 292 and incident on the half mirror 290 is transmitted through the half mirror 290. The transmitted levorotatory circularly polarized light is transmitted through the antireflection layer 280 and is incident on the λ/4 retardation layer 262 to be converted into linearly polarized light. The linearly polarized light is transmitted through the absorption type linear polarizer 271 and is incident on the λ/4 retardation layer 261 to be converted into circularly polarized light. The circularly polarized light is reflected by a surface or the like of the image display panel 250 and is incident on the λ/4 retardation layer 261 again. In the reflection, a revolution direction of the circularly polarized light is converted to an opposite direction, and thus the circularly polarized light is converted into linearly polarized light in a direction orthogonal to the transmission axis of the absorption type linear polarizer 271 in the λ/4 retardation layer 261. The linearly polarized light is absorbed by the absorption type linear polarizer 271.

Here, in the virtual reality display apparatus, some of the light rays emitted from the image display panel may not travel back and forth between the reflective type polarizer and the half mirror due to the disturbance of the polarization, the undesirable reflection, and the like, and may be leaked as the light leakage, which may lead to the occurrence of the double images, the decrease in contrast, and the like.

On the other hand, it is considered that, by disposing the circularly polarizing plate including a polarizer layer and a retardation layer (λ/4 retardation layer) on the emission side of the virtual reality display apparatus, light other than the light which has passed through the desired optical path is shielded to prevent the occurrence of the double images, the decrease in contrast, and the like.

However, according to the studies by the present inventors, in a case where the polarizer layer and the retardation layer (λ/4 retardation layer) are molded into a three-dimensional shape including a curved surface, it has been found that the angle between the transmission axis of the polarizer layer and the slow axis of the retardation layer deviates from an appropriate angle (45°) depending on the position, and thus the light leakage cannot be sufficiently shielded.

On the other hand, in a case where the optically anisotropic film that the first optically anisotropic layer having a non-linearly aligned region in which the orientation of the optical axis continuously changes in the plane and the second optically anisotropic layer are laminated is molded into a three-dimensional shape including a curved surface in the second embodiment, the angle between the transmission axis of the polarizer layer after the molding and the slow axis of the retardation layer can be set to an appropriate angle (45°) regardless of the position. Therefore, it is possible to sufficiently shield the light leakage and to prevent the occurrence of the double images, the decrease in contrast, and the like.

Hereinafter, the third embodiment will be described in detail.

[Reflective Circular Polarizer]

The reflective circular polarizer according to the third embodiment is a reflective circular polarizer including a light reflecting layer formed by immobilizing a cholesteric liquid crystalline phase, in which a helical pitch of the cholesteric liquid crystalline phase has an in-plane distribution.

In a case where a reflective circular polarizer including a light reflecting layer obtained by immobilizing a cholesteric liquid crystalline phase in the related art is molded into a non-planar shape and applied to a virtual reality display apparatus, it is presumed that the change in tint of the main image occurs by the following mechanism. In a case where the reflective circular polarizer is molded into a non-planar shape, since a stretching ratio of the layer formed by immobilizing the cholesteric liquid crystalline phase is not uniform in the plane, there may be a region where a thickness is partially thin and the helical pitch of the cholesteric liquid crystalline phase is reduced in the layer after the molding. As a result, it is presumed that a reflected wavelength range is different depending on the in-plane position, and thus the tint of the main image changes in the visual field in a case of being applied to the virtual reality display apparatus.

On the other hand, in the reflective circular polarizer according to the third embodiment, since the helical pitch of the cholesteric liquid crystalline phase in the light reflecting layer has an in-plane distribution, even in a case where a wavelength shift due to a difference in the stretching ratio depending on the in-plane position occurs in a case of being molded into a non-planar shape, the change in reflection wavelength range in the plane can be made more uniform in the reflective circular polarizer after the molding, and the change in tint of the main image depending on the position in the visual field in a case of being applied to the virtual reality display apparatus can be suppressed.

Hereinafter, the reflective circular polarizer according to the third embodiment will be described in more detail.

In the following description, the "layer formed by immobilizing the cholesteric liquid crystalline phase" or the "light reflecting layer obtained by immobilizing the cholesteric liquid crystalline phase" is also referred to as "cholesteric liquid crystal layer" as appropriate.

The reflective circular polarizer according to the third embodiment is an optical member which separates incidence ray into right-circularly polarized light and left-circularly polarized light, and specularly reflects one circularly polarized light and transmits the other circularly polarized light.

The reflective circular polarizer according to the third embodiment includes a light reflecting layer having a cholesteric liquid crystal layer. The light reflecting layer having a cholesteric liquid crystal layer functions as the reflective circular polarizer alone, and the film does not have a reflection axis and a transmission axis. Therefore, in a case where the reflective circular polarizer is stretched or molded into a three-dimensional shape or the like, there is less concern about the distortion of the polarization axis, and the decrease in polarization degree due to the distortion of the polarization axis is less likely to occur, and the reflective circular polarizer is a thin film and has a high polarization degree of transmitted light, which is preferable. As the reflective circular polarizer including the light reflecting layer formed by immobilizing the cholesteric liquid crystalline phase, for example, an optical film described in JP2020-060627A can be used.

Figure 11:
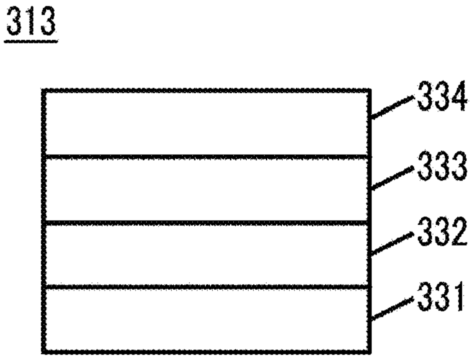
FIG. 11 is a schematic view showing an example of a reflective circular polarizer according to the third embodiment.

FIG. 11 conceptually shows an example of the reflective circular polarizer according to the third embodiment. In a reflective circular polarizer 313 shown in FIG. 11, a first light reflecting layer 331, a second light reflecting layer 332, a third light reflecting layer 333, and a fourth light reflecting layer 334 are arranged in this order, and each of the light reflecting layers is a layer obtained by immobilizing a cholesteric liquid crystalline phase having a helical pitch with an in-plane distribution.

The reflective circular polarizer according to the third embodiment is not limited to the aspect shown in FIG. 11.

It is sufficient that the reflective circular polarizer according to the third embodiment includes at least one light reflecting layer formed by immobilizing a cholesteric liquid crystalline phase having a helical pitch with an in-plane distribution. That is, the number of cholesteric liquid crystal layers having a helical pitch with an in-plane distribution may be one or a plurality.

In the reflective circular polarizer according to the third embodiment, the non-planar shape is molded, and the in-plane distribution of the helical pitch of the cholesteric liquid crystalline phase is set in advance in a case where the reflective circular polarizer is stretched at a non-uniform stretching ratio in the plane and the reflection wavelength range is shifted. That is, at each in-plane position, the size of the helical pitch of the cholesteric liquid crystalline phase is selected such that the reflection wavelength range is in an appropriate range according to the wavelength shift due to the stretching, and a region where the reflection wavelength range is different depending on the in-plane position is provided.

For example, in a case where a reflective circular polarizer having a circular cholesteric liquid crystal layer is molded into a shape along a curved surface, since the stretching ratio is larger and the helical pitch of the cholesteric liquid crystalline phase is smaller as the position is closer to the center part of the reflective circular polarizer, the in-plane distribution is set such that the helical pitch of the cholesteric liquid crystalline phase is larger as the position is closer to the center portion.

The "helical pitch of the cholesteric liquid crystalline phase has the in-plane distribution" means that a reflection spectrum measured for each in-plane region of the same cholesteric liquid crystal layer is shifted, that is, a difference between the maximum value and the minimum value of central wavelengths of reflected light measured in each in-plane region is 1% or more.

The in-plane distribution of the helical pitch of the cholesteric liquid crystalline phase in the light reflecting layer can be appropriately selected and set based on the known technology, such as a formulation of the light reflecting layer (type and content of a liquid crystal compound and a chiral agent described later), the layer configuration, size, and shape after molding of the reflective circular polarizer, and the target reflection wavelength range.

It is preferable that the reflective circular polarizer according to the third embodiment includes a light reflecting layer formed by immobilizing a cholesteric liquid crystalline phase containing a rod-like liquid crystal compound (hereinafter, also referred to as "light reflecting layer R"), and a light reflecting layer formed by immobilizing a cholesteric liquid crystalline phase containing a disk-like liquid crystal compound (hereinafter, also referred to as "light reflecting layer D"). In such a configuration, since the cholesteric liquid crystalline phase containing a rod-like liquid crystal compound has a positive Rth and the cholesteric liquid crystalline phase containing a disk-like liquid crystal compound has a negative Rth, the Rth of each other is offset, and thus the occurrence of the ghost can be suppressed even for the light incident from the oblique direction.

In a case where the reflective circular polarizer includes the light reflecting layer R and the light reflecting layer D, it is sufficient that the reflective circular polarizer includes one or more layers of each of the light reflecting layer R and the light reflecting layer D, and it may have two or more layers thereof. In a case where the reflective circular polarizer includes two or more layers of the light reflecting layers R, a layer other than the light reflecting layer R, such as the light reflecting layer D, may be provided between the two or more light reflecting layers R, or may not be provided. Similarly, in a case where the reflective circular polarizer includes two or more layers of the light reflecting layers D, a layer other than the light reflecting layer D, such as the light reflecting layer R, may be provided between the two or more light reflecting layers D, or may not be provided.

It is preferable that the reflective circular polarizer has a laminated structure in which the light reflecting layer R formed by immobilizing a cholesteric liquid crystalline phase containing a rod-like liquid crystal compound and the light reflecting layer D formed by immobilizing a cholesteric liquid crystalline phase containing a disk-like liquid crystal compound are alternately arranged.

The state in which the Rth is offset is represented by an expression as follows. In a reflective circular polarizer including n light reflecting layers, in a case where the light reflecting layers are named $L_1$, $L_2$, $L_3$, . . . , and $L_n$ from a light source side, the sum of Rth's of each layer from the light reflecting layer $L_1$ to the light reflecting layer $L_i$ is denoted by $SRth_i$. Specifically, the expression is as follows.

$$SRth_1 = Rth_1$$

$$SRth_2 = Rth_1 + Rth_2$$

$$\ldots$$

$$SRth_i = Rth_1 + Rth_2 \cdots + Rth_i$$

$$\ldots$$

$$SRth_n = Rth_1 + Rth_2 \cdots + Rth_i \cdots + Rth_n$$

Absolute values of all of $SRth_i$ ($SRth_1$ to $SRth_n$) are preferably 0.3 μm or less, more preferably 0.2 μm or less, and still more preferably 0.1 μm or less. The $Rth_i$ of each layer in the above-described expression is determined by the expression for calculating Rth described above.

It is preferable that the reflective circular polarizer according to the third embodiment includes a blue light reflecting layer, a green light reflecting layer, a yellow light reflecting layer, and a red light reflecting layer in this order.

A central wavelength of reflected light of the blue light reflecting layer is preferably in a range of 430 to 480 nm. A central wavelength of reflected light of the green light reflecting layer is preferably in a range of 520 to 570 nm. A central wavelength of reflected light of the yellow light reflecting layer is preferably in a range of 570 to 620 nm. A central wavelength of reflected light of the red light reflecting layer is preferably in a range of 620 to 670 nm.

It is preferable that the reflective circular polarizer according to the third embodiment includes a blue light reflecting layer in which a reflectivity at a wavelength of at least 460 nm is 40% or more, a green light reflecting layer in which a reflectivity at a wavelength of 550 nm is 40% or more, a yellow light reflecting layer in which a reflectivity at a wavelength of 600 nm is 40% or more, and a red light reflecting layer in which a reflectivity at a wavelength of 650 nm is 40% or more in this order. With such a configuration, high reflection characteristics can be exhibited over a wide wavelength range in the visible region. The above-described reflectivity is a reflectivity in a case where non-polarized light is incident on the reflective circular polarizer at each wavelength.

In addition, the blue light reflecting layer, the green light reflecting layer, the yellow light reflecting layer, and the red light reflecting layer, which are formed by immobilizing the cholesteric liquid crystalline phase, may have a pitch gradient layer in which the helical pitch of the cholesteric liquid crystalline phase continuously changes in the thickness direction. For example, the green light reflecting layer and the yellow light reflecting layer can be continuously produced with reference to JP2020-060627A and the like.

In a case where the reflective circular polarizer according to the third embodiment includes the blue light reflecting layer, the green light reflecting layer, the yellow light reflecting layer, and the red light reflecting layer in this order, it is preferable that the blue light reflecting layer is installed on a surface opposite to a retardation layer which converts circularly polarized light into linearly polarized light. In such an arrangement, a ray passes through the blue light reflecting layer, the green light reflecting layer, the yellow light reflecting layer, and the red light reflecting layer in this order. The present inventors have considered that the cause of the suppression of the occurrence of the ghost by disposing the blue light reflecting layer on the light source side is that the influence of Rth can be suppressed. The estimation mechanism will be described below. In a reflective circular polarizer including a light reflecting layer formed by immobilizing a cholesteric liquid crystalline phase, a film thickness required to obtain a sufficient reflectivity (for example, 40% or more) is thicker on the long wavelength side. Therefore, in a case where there is a light reflecting layer which reflects light having a long wavelength on the light source side, a film thickness thereof is increased, and as a result, Rth of the light passing through the light reflecting layer is increased. For such a reason, it is considered to be more preferable that a reflection band of the light reflecting layer disposed on the light source side is on the short wavelength side.

Each of the blue light reflecting layer, the green light reflecting layer, the yellow light reflecting layer, and the red light reflecting layer included in the reflective circular polarizer may be the light reflecting layer R formed by immobilizing a cholesteric liquid crystalline phase containing a rod-like liquid crystal compound or the light reflecting layer D formed by immobilizing a cholesteric liquid crystalline phase containing a disk-like liquid crystal compound.

According to the studies by the present inventors, it is preferable that the reflective circular polarizer includes a blue light reflecting layer consisting of a cholesteric liquid crystalline phase containing a disk-like liquid crystal compound, a green light reflecting layer consisting of a cholesteric liquid crystalline phase containing a rod-like liquid crystal compound, a yellow light reflecting layer consisting of a cholesteric liquid crystalline phase containing a disk-like liquid crystal compound, and a red light reflecting layer consisting of a cholesteric liquid crystalline phase containing a rod-like liquid crystal compound in this order.

In addition, in a case where the reflective circular polarizer includes the blue light reflecting layer, the green light reflecting layer, the yellow light reflecting layer, and the red light reflecting layer described above, the optical laminate may include two or more blue light reflecting layers, two or more green light reflecting layers, two or more yellow light reflecting layers, or two or more red light reflecting layers.

In a case where the number of layers of the blue light reflecting layer, the green light reflecting layer, the yellow light reflecting layer, or the red light reflecting layer included in the reflective circular polarizer is two or more, it is preferable that the reflective circular polarizer includes at least one light reflecting layer R and at least one light reflecting layer D for each color.

In addition, it is also preferable that the reflective circular polarizer includes an infrared light reflecting layer having a reflectivity of 40% or more at a wavelength of 800 nm, in consideration of the short wavelength shift of the reflection wavelength range due to the stretching or the molding.

In addition, it is also preferable that the reflection wavelength range is set wider than the required wavelength range in advance in consideration that the stretching ratios at the respective locations in the plane are different from each other.

A thickness of the reflective circular polarizer is not particularly limited, but from the viewpoint of thinning, it is preferably 30 μm or less and more preferably 15 μm or less.

The lower limit thereof is not particularly limited, but is preferably 1 μm or more.

(Method for Forming Cholesteric Liquid Crystalline Phase)

The cholesteric liquid crystalline phase can be formed according to the following procedure of: applying a liquid crystal composition, which is obtained by dissolving a liquid crystal compound, a chiral agent, a polymerization initiator, a surfactant added as necessary, and the like in a solvent, onto a support or an underlayer formed on the support; drying the support to obtain a coating film; aligning the liquid crystal compound in the coating film; and irradiating the coating film with actinic ray to cure the liquid crystal composition. As a result, a cholesteric liquid crystalline phase having a cholesteric liquid crystal structure in which the cholesteric regularity is fixed can be formed.

[Manufacturing Method of Reflective Circular Polarizer]

(Formation of Cholesteric Liquid Crystalline Phase Having Helical Pitch with In-Plane Distribution)

In a method of imparting the in-plane distribution to the helical pitch of the cholesteric liquid crystalline phase, for example, there is a method of using a chiral agent in which HTP is changed by photoisomerization.

The details will be described. With a liquid crystal composition containing a chiral agent in which HTP is changed by photoisomerization, by performing light irradiation corresponding to the photoisomerization on a cholesteric liquid crystalline phase of the liquid crystal composition, which is formed by applying (and in some cases, being heat-treated) to be aligned, it is possible to change the HTP of the chiral agent so as to change the helical pitch of the cholesteric liquid crystalline phase and to change the reflection wavelength. By utilizing this property, the aligned cholesteric liquid crystalline phase is irradiated with light in a patterned manner using an exposure mask or the like to be photoisomerized, thereby obtaining a pattern in which the reflection wavelength is changed only in the light-irradiated region. After obtaining such a pattern, the entire coating film is exposed to light for curing the liquid crystal composition, and the liquid crystal composition is polymerized, thereby finally obtaining a cholesteric liquid crystal layer (patterned cholesteric liquid crystal layer) having a helical pitch with an in-plane distribution. The patterned cholesteric liquid crystal layer after the curing no longer undergoes photoisomerization and has stable properties.

In order to effectively perform the pattern formation, it is preferable that the light irradiation for the photoisomerization and the light irradiation for the curing can be performed separately, in other words, one of the photoisomerization and the curing does not proceed as much as possible in a case where the other proceeds. Examples of a measure for separating the two and performing the light irradiation on each of the two include a distinction based on an oxygen concentration and a distinction based on an exposure wavelength.

First, with regard to the oxygen concentration, the photoisomerization is less affected by the oxygen concentration, but the curing is less likely to occur as the oxygen concentration is higher (depending on the initiator used). Therefore, the photoisomerization is easily performed separately from the curing by performing the photoisomerization under a condition of a high oxygen concentration, for example, in the atmosphere, and by performing the curing under a condition of a low oxygen concentration, for example, in a nitrogen atmosphere with an oxygen concentration of 300 ppm by volume or less.

In addition, with regard to the exposure wavelength, the photoisomerization by the chiral agent is likely to proceed at an absorption wavelength of the chiral agent, and the curing is likely to proceed at an absorption wavelength of the photopolymerization initiator. Therefore, in a case where the chiral agent and the photopolymerization initiator are selected such that the absorption wavelengths thereof are different from each other, it is possible to separate the photoisomerization and the curing by the exposure wavelength.

The photoisomerization and the curing may be performed under heating conditions, as necessary. A temperature at the time of heating is preferably 25° C. to 140° C. and more preferably 30° C. to 100° C.

As a method of the photoisomerization other than the method of using the chiral agent in which HTP is changed, there is also a method in which curing is performed in a patterned manner first and then isomerization of an uncured region is performed. That is, the aligned cholesteric liquid crystalline phase is first irradiated with light for curing in a patterned manner using an exposure mask or the like. Thereafter, by performing light irradiation for the photoisomerization on the entire surface, the pitch change due to the photoisomerization is unlikely to occur in the region which has been cured first, so that the pitch change due to the photoisomerization occurs only in the region which has not been cured first, and the reflection wavelength is changed. In this case as well, after obtaining the pattern, the entire cholesteric liquid crystal layer is exposed to light for curing the liquid crystal composition, and the liquid crystal composition is polymerized, thereby finally obtaining the patterned cholesteric liquid crystal layer.

(Formation of Light Reflecting Layer by Direct Application)

In a case where the reflective circular polarizer according to the third embodiment has a plurality of light reflecting layers, it is preferable that the plurality of light reflecting layers are in direct contact with each other without using an adhesive layer. For example, in a case of forming the light reflecting layer, the light reflecting layer can be formed without using an adhesive layer by directly applying a coating liquid containing the liquid crystal compound onto the already formed light reflecting layer (adjacent layer).

Furthermore, in order to reduce the difference in refractive index in all in-plane directions, it is preferable that alignment directions (slow axis directions) of the liquid crystal compound are arranged to continuously change at the interface. For example, in a case where a light reflecting layer containing a rod-like liquid crystal compound is formed on a light reflecting layer containing a disk-like liquid crystal compound, the light reflecting layer containing a rod-like liquid crystal compound can be formed by directly applying a coating liquid containing the rod-like liquid crystal compound, and the rod-like liquid crystal compound can be aligned such that the slow axis direction continuously changes at the interface by an alignment regulating force of the disk-like liquid crystal compound in the light reflecting layer containing a disk-like liquid crystal compound.

(Formation of Light Reflecting Layer by Adhesion)

In a case where the reflective circular polarizer according to the third embodiment has a plurality of light reflecting layers, each light reflecting layer can also be adhered by any adhesive method, and for example, can be adhered using a pressure sensitive adhesive or an adhesive.

As the pressure sensitive adhesive, a commercially available pressure sensitive adhesive can be optionally used. From the viewpoint of thinning and viewpoint of reducing the surface roughness Ra of the laminated optical body, a thickness of the adhesive layer is preferably 25 μm or less, more preferably 15 μm or less, and still more preferably 6 μm or less. In addition, a pressure sensitive adhesive which is unlikely to generate outgas is preferable as the pressure sensitive adhesive. Particularly, in a case of performing stretching or molding, a vacuum process or a heating process may be performed, and it is preferable that no outgas is generated even under such conditions.

A commercially available adhesive can be optionally used as the adhesive, and for example, an epoxy resin-based adhesive or an acrylic resin-based adhesive can be used.

From the viewpoint of thinning and viewpoint of reducing the surface roughness Ra of the reflective circular polarizer, the thickness of the adhesive layer is preferably 25 μm or less, more preferably 5 μm or less, and still more preferably 1 μm or less. In addition, from the viewpoint of reducing the thickness of the adhesive layer and coating an adherend with the adhesive such that the thickness thereof is uniform, a viscosity of the adhesive is preferably 300 cP or less and more preferably 100 cP or less.

In addition, in a case where the adherend has surface unevenness, from the viewpoint of reducing the surface roughness Ra of the reflective circular polarizer, an appropriate viscoelasticity or an appropriate thickness of the pressure sensitive adhesive or the adhesive can also be selected so that the surface unevenness of the layer to be bonded can be embedded. From the viewpoint of embedding the surface unevenness, it is preferable that the pressure sensitive adhesive or the adhesive has a viscosity of 50 cP or more. In addition, it is preferable that the thickness thereof is more than a height of the surface unevenness.

Examples of a method of adjusting the viscosity of the adhesive include a method of using an adhesive containing a solvent. In this case, the viscosity of the adhesive can be adjusted by a proportion of the solvent. In addition, the thickness of the adhesive can be further reduced by drying the solvent after coating the adherend with the adhesive.

In the reflective circular polarizer, from the viewpoint of reducing the extra reflection and suppressing a decrease in polarization degree of transmitted light, it is preferable that the pressure sensitive adhesive or adhesive used for adhering each layer has a small difference in refractive index with adjacent layers. Since the liquid crystal layer has birefringence, refractive indices differ between a fast axis direction and a slow axis direction. In a case where an average refractive index $n_{ave}$ of a liquid crystal layer is obtained by adding the refractive indices in the fast axis direction and the slow axis direction and dividing by 2, an absolute value of a difference between a refractive index of the adjacent pressure-sensitive adhesive layer or adhesive layer and the $n_{ave}$ is preferably 0.075 or less, more preferably 0.05 or less, and still more preferably 0.025 or less. The refractive index of the pressure sensitive adhesive or the adhesive can be adjusted, for example, by mixing fine particles of titanium oxide, fine particles of zirconia, or the like.

In addition, the reflective circular polarizer, the retardation layer, and the linear polarizer have in-plane refractive index anisotropy, but the difference in refractive index with the adjacent layer is preferably 0.10 or less in all in-plane directions. Therefore, the pressure sensitive adhesive or the adhesive may have in-plane refractive index anisotropy.

In addition, a refractive index adjusting layer in which a difference in refractive index between a fast axis direction and a slow axis direction is smaller than that of the reflective circular polarizer may be provided between the reflective circular polarizer and the pressure sensitive adhesive or between the reflective circular polarizer or the adhesive. In this case, the refractive index adjusting layer is preferably a cholesteric liquid crystal layer. By providing such a refractive index adjusting layer, interfacial reflection can be further suppressed, and occurrence of the ghost can be further suppressed. In addition, it is more preferable that an average refractive index of the refractive index adjusting layer is smaller than the average refractive index of the reflective circular polarizer. In addition, a central wavelength of reflected light of the refractive index adjusting layer may be less than 430 nm or more than 670 nm, and is more preferably less than 430 nm.

In addition, in the adhesive layer between the layers, it is also preferable that a thickness of the adhesive layer is 100 nm or less. In a case where the thickness of the adhesive layer is 100 nm or less, light in the visible region is less likely to be affected by the difference in refractive index, and extra reflection can be suppressed. The thickness of the adhesive layer is more preferably 50 nm or less and still more preferably 30 nm or less. Examples of a method of forming the adhesive layer having a thickness of 100 nm or less include a method of vapor-depositing a ceramic adhesive such as silicon oxide (SiOx layer) on the bonding surface. For the bonding surface of the bonding member, before the bonding, for example, a surface reforming treatment such as a plasma treatment, a corona treatment, and a saponification treatment can be performed, and a primer layer can be applied. In addition, in a case where a plurality of bonding surfaces are present, the kind and thickness of the adhesive layer can be adjusted for each of the bonding surfaces. Specifically, for example, the adhesive layer having a thickness of 100 nm or less can be provided by the procedures (1) to (3) described below.

(1) A layer to laminate is bonded to a temporary support consisting of a glass base material.

(2) A SiOx layer having a thickness of 100 nm or less is formed on both the surface of the layer to laminate and the surface of the layer to be laminated by vapor deposition or the like; the vapor deposition can be carried out by, for example, a vapor deposition device (model number ULEYES, manufactured by ULVAC, Inc.) using SiOx powder as a vapor deposition source; in addition, it is preferable that the surface of the formed SiOx layer is subjected to a plasma treatment.

(3) After the formed SiOx layers are bonded to each other, the temporary support is peeled off; it is preferable that the bonding is carried out, for example, at a temperature of 120° C.

The application, the adhesion, or the bonding of the layers may be carried out by roll-to-roll or single-wafer.

The roll-to-roll method is preferable from the viewpoint of improving the productivity and reducing axis misalignment of each layer.

Meanwhile, the single-wafer method is preferable from the viewpoints that this method is suitable for production of many kinds in small quantities and that a special adhesion method in which the thickness of the adhesive layer is 100 nm or less can be selected.

In addition, examples of the method of coating the adherend with the adhesive include known methods such as a roll coating method, a gravure printing method, a spin coating method, a wire bar coating method, an extrusion coating method, a direct gravure coating method, a reverse gravure coating method, a die-coating method, a spraying method, and an ink jet method.

The reflective circular polarizer according to the third embodiment may include a layer other than the cholesteric liquid crystal layer having a helical pitch with an in-plane distribution. Examples of the layer other than the cholesteric liquid crystal layer having a helical pitch with an in-plane distribution include a support, an alignment layer, and a light reflecting layer other than the layer consisting of the cholesteric liquid crystalline phase having a helical pitch with an in-plane distribution.

The support and the alignment layer may be a temporary support which is peeled off and removed in a case of manufacturing the laminated optical body. In a case of using the temporary support, it is preferable that the reflective circular polarizer is transferred to another laminate, and then the temporary support is peeled off and removed. This is because the thickness of the laminated optical body can be reduced by removing the temporary support (the support and/or the alignment layer), and the adverse effect of phase difference of the temporary support on the polarization degree of the transmitted light can be eliminated.

The type of the support is not particularly limited, but it is preferable that the support is transparent, and examples thereof include films of a resin such as cellulose acylate, polycarbonate, polysulfone, polyethersulfone, polyacrylate and polymethacrylate, cyclic polyolefin, polyolefin, polyamide, polystyrene, and polyester. Among these, a cellulose acylate film, a cyclic polyolefin film, polyacrylate, a polyacrylate film, or a polymethacrylate film is preferable. In addition, commercially available cellulose acetate films (for example, "TD80U" or "Z-TAC" manufactured by FUJIFILM Corporation) can also be used.

In a case where the support is a temporary support, a support having high tear strength is preferable from the viewpoint of preventing breakage during peeling. For example, a polycarbonate-based film, a polyester-based film, or the like is preferable.

In addition, from the viewpoint of suppressing the adverse effect on the polarization degree of transmitted light, it is preferable that the support has a small phase difference. Specifically, a magnitude of Re is preferably 10 nm or less, and an absolute value of a magnitude of Rth is preferably 50 nm or less. In addition, even in a case where the support is used as the above-described temporary support, it is preferable that the temporary support has a small retardation from the viewpoint of performing quality inspection of the reflective circular polarizer or other laminates in a step of manufacturing a laminated optical body.

In addition, it is preferable that the reflective circular polarizer according to the third embodiment is transparent to near-infrared light in order to minimize the influence on various sensors incorporated in optical systems such as a virtual reality display apparatus and an electronic finder, in which near-infrared light for eye tracking, facial expression recognition, and iris recognition is used as a light source.

[Non-Planar Reflective Circular Polarizer]

The non-planar reflective circular polarizer according to the third embodiment is a reflective circular polarizer obtained by molding a reflective circular polarizer which includes a light reflecting layer formed by immobilizing a cholesteric liquid crystalline phase, in which an in-plane distribution of a helical pitch of the cholesteric liquid crystalline phase is 1% or less.

Examples of such a non-planar reflective circular polarizer include a non-planar reflective circular polarizer obtained by molding the above-described reflective circular polarizer having a light reflecting layer in which the helical pitch of the cholesteric liquid crystalline phase has an in-plane distribution into a non-planar shape.

By applying the non-planar reflective circular polarizer according to the third embodiment to, for example, a virtual reality display apparatus in combination with a lens, it is possible to suppress the change in tint of the main image in the visual field.

The characteristics of each member such as the light reflecting layer included in the non-planar reflective circular polarizer are as described in the reflective circular polarizer according to the third embodiment.

[Laminated Optical Body]

The laminated optical body according to the third embodiment is a laminate in which at least a reflective circular polarizer, a retardation layer which converts circularly polarized light into linearly polarized light, and an absorption type linear polarizer are laminated in this order.

The reflective circular polarizer according to the third embodiment, the laminated optical body including the reflective circular polarizer, a virtual reality display apparatus using the laminated optical body according to the third embodiment, which is mentioned as a suitable usage example of a composite lens including the reflective circular polarizer, and the action of the laminated optical body according to the third embodiment will be described in detail.

Figure 8:
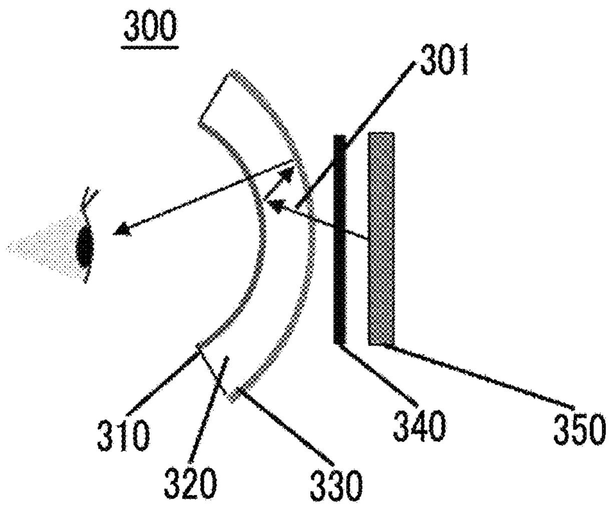
FIG. 8 is a schematic view showing an example of a virtual reality display apparatus using a laminated optical body according to a third embodiment, and showing an example of a ray of a main image.

FIG. 8 is a schematic view showing an example of a configuration of a virtual reality display apparatus using the laminated optical body according to the third embodiment. In a virtual reality display apparatus 300 shown in FIG. 8, a ray 301 emitted from an image display panel 350 is transmitted through a circularly polarizing plate 340 to be circularly polarized light, and is transmitted through a half mirror 330. Next, the ray is transmitted through a lens 320, is incident on a laminated optical body 310 according to the third embodiment from the reflective circular polarizer side, is reflected, is transmitted through the lens 320 again, is reflected by the half mirror 330, and is incident on the laminated optical body 310 again after being transmitted through the lens 320. In this case, the circularly polarized state of the ray 301 is not changed in a case of being reflected by the laminate, and is changed to the circularly polarized light orthogonal to circularly polarized light which is reflected by the half mirror in a case of being incident on the laminated optical body 310. Therefore, the ray 301 is transmitted through the laminated optical body 310 and visually recognized by a user. In addition, in a case where the ray 301 is reflected by the half mirror 330, since the half mirror has a concave mirror shape, the image is magnified so that the user can visually recognize the magnified virtual image. The system described above is referred to as a reciprocating optical system, a folded optical system, or the like.

Figure 9:
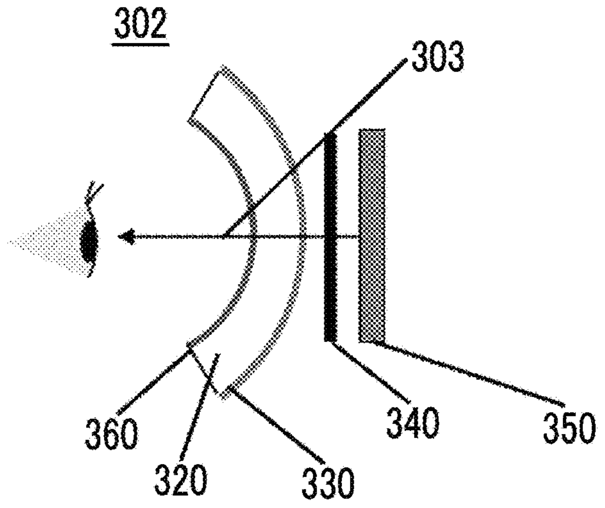
FIG. 9 is a schematic view showing an example of a virtual reality display apparatus using a laminated optical body in the related art, and showing an example of a ray of a ghost.

On the other hand, FIG. 9 is a schematic view showing an example of a configuration of a virtual reality display apparatus using a laminated optical body including a reflective circular polarizer in the related art. FIG. 9 indicates a virtual reality display apparatus 302, in which a ray 303 is transmitted without being reflected and is to be leaked light in a case where the ray 303 is incident on the laminated optical body 310 for the first time in the virtual reality display apparatus. As can be seen from the drawing, in this case, the user visually recognizes the image which is not enlarged. This image is referred to as the ghost or the like, and the ghost or the like is required to be reduced.

Since the laminated optical body 310 according to the third embodiment has a high polarization degree, leakage of transmitted light (that is, the ghost) in a case where the ray is incident on the laminated optical body 310 for the first time can be reduced.

In addition, since the laminated optical body 310 according to the third embodiment also has a high polarization degree with respect to the transmitted light, the transmittance in a case where the ray is incident on the laminated optical body 310 for the second time can be increased to improve the brightness of the main image, and the change in tint in the visual field of the main image can be further suppressed.

As shown in FIG. 8, the laminated optical body 310 may be molded on a curved surface such as a lens to form a laminated optical body having a non-planar shape.

Since the laminated optical body obtained by laminating a reflective linear polarizer and a retardation layer having a retardation of a ¼ wavelength, which is known as a reflective circular polarizer in the related art, has optical axes such as a transmission axis, a reflection axis, and a slow axis, the optical axes are distorted in a case of being stretched or molded into a curved shape, and thus the polarization degree of the transmitted light is decreased. On the contrary, in the laminated optical body according to the third embodiment, since the reflective circular polarizer has no optical axis, a decrease in polarization degree due to stretching or molding is unlikely to occur. Therefore, even in a case where the laminated optical body 310 is molded into a curved surface shape, the decrease in polarization degree is unlikely to occur.

Figure 10:
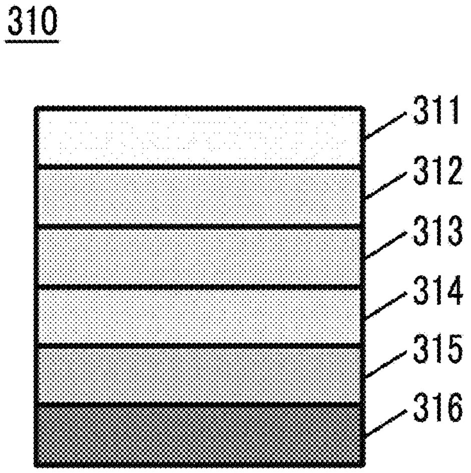
FIG. 10 is a schematic view showing an example of a laminated optical body according to the third embodiment.

FIG. 10 shows a layer configuration of the laminated optical body 310 according to the third embodiment. In the laminated optical body 310 shown in FIG. 10, an antireflection layer 311, a positive C-plate 312, a reflective circular polarizer 313, a positive C-plate 314, a retardation layer 315, and an absorption type linear polarizer 316 are arranged in this order. Since the laminated optical body 310 includes the reflective circular polarizer 313, the retardation layer 315 which converts circularly polarized light into linearly polarized light, and the absorption type linear polarizer 316 in this order, leaked light from the reflective circular polarizer 313 is converted into the linearly polarized light by the retardation layer 315, and the light can be absorbed by the absorption type linear polarizer 316. Therefore, the polarization degree of the transmitted light can be increased. In a case where the laminated optical body 310 is stretched or molded, the slow axis of the retardation layer 315 or the absorption axis of the absorption type linear polarizer 316 may be distorted. However, as described above, the reflective circular polarizer 313 maintains a high polarization degree even after being stretched or molded, and the amount of leakage light from the reflective circular polarizer 313 is small, the increase in leakage light is suppressed to a slight amount.

FIG. 11 shows an example of a layer configuration of the reflective circular polarizer 313 according to the third embodiment. In the reflective circular polarizer 313 shown in FIG. 11, a first light reflecting layer 331, a second light reflecting layer 332, a third light reflecting layer 333, and a fourth light reflecting layer 334 are arranged in this order.

In addition, it is preferable that a surface roughness Ra on the surface of the laminated optical body according to the third embodiment is small. This is because, in a case where the surface roughness Ra is small, sharpness of the image can be improved, for example, in a case where the laminated optical body is used in the virtual reality display apparatus or the like. The present inventors have presumed that, in a case where the light is reflected on the laminated optical body, an angle of the reflected light is distorted in a case where the laminated optical body has unevenness, which leads to image distortion and blurriness. The surface roughness Ra of the surface of the laminated optical body is preferably 100 nm or less, more preferably 50 nm or less, still more preferably 30 nm or less, and particularly preferably 10 nm or less.

In addition, the laminated optical body according to the third embodiment is produced by laminating a large number of layers. According to the studies conducted by the present inventors, it has been found that, in a case where a layer is laminated on a layer with unevenness, the unevenness may be amplified. Therefore, in the laminated optical body according to the third embodiment, it is preferable that the surface roughness Ra is small in all the layers. The surface roughness of each layer of the laminated optical body according to the third embodiment is preferably 100 nm or less, more preferably 50 nm or less, still more preferably 30 nm or less, and particularly preferably 10 nm or less.

In addition, from the viewpoint of increasing the image sharpness of the reflected image, it is particularly preferable that the reflective circular polarizer has a small surface roughness Ra.

The surface roughness Ra can be measured by, for example, a non-contact surface/layer cross-sectional shape measuring system VertScan (manufactured by Ryoka System, Inc.). Since the Vertscan is a surface shape measurement method using a phase of reflected light from a sample, in a case of measuring a reflective circular polarizer consisting of a light reflecting layer formed by immobilizing a cholesteric liquid crystalline phase, the reflected light from inside the film may overlap, which makes it possible to accurately measure the surface shape. In this case, a metal layer may be formed on the surface of the sample to increase the reflectivity of the surface and further suppress the reflection from the inside. As a main method of forming the metal layer on the surface of the sample, a sputtering method is used. Au, Al, Pt, or the like is used as a material to be sputtered.

In the laminated optical body according to the third embodiment, it is preferable that the number of point defects per unit area is small. Since the laminated optical body according to the third embodiment is produced by laminating a large number of layers, it is preferable that the number of point defects in each layer is also small in order to reduce the number of point defects in the entire laminated optical body. Specifically, the number of point defects in each layer is preferably 20 or less, more preferably 10 or less, and still more preferably 1 or less per square meter. The number of point defects in the entire laminated optical body is preferably 100 or less, more preferably 50 or less, and still more preferably 5 or less per square meter.

Since the point defects lead to a decrease in polarization degree of transmitted light or reflected light or a decrease in image sharpness, it is preferable that the number of point defects is small.

Here, the point defects include foreign matter, scratches, stains, fluctuations in film thickness, alignment failure of a liquid crystal compound, and the like.

In addition, it is preferable that the number of the above-described point defects is counted with the number of point defects having a size of preferably 100 μm or more, more preferably 30 μm or more, and still more preferably 10 μm or more.

In addition, various sensors may be incorporated in optical systems such as a virtual reality display apparatus and an electronic finder, in which near-infrared light for eye tracking, facial expression recognition, and iris recognition is used as a light source, and in order to minimize the influence on the sensor, it is preferable that the laminated optical body according to the third embodiment is transparent to near-infrared light.

The configuration of the laminated optical body according to the third embodiment is not particularly limited to the configuration of the laminated optical body 310 shown in FIG. 10, as long as the laminated optical body according to the third embodiment includes the reflective circular polarizer according to the third embodiment, the retardation layer which converts circularly polarized light into linearly polarized light, and the absorption type linear polarizer in this order.

Hereinafter, members other than the reflective circular polarizer, included in the laminated optical body according to the third embodiment, will be described.

[Retardation Layer]

The retardation layer used in the laminated optical body according to the third embodiment has a function of converting emitted light into substantially linearly polarized light in a case where circularly polarized light is incident. For example, a retardation layer in which Re is approximately ¼ wavelength at any of wavelengths in the visible range can be used, and an in-plane retardation Re (550) at a wavelength of 550 nm is preferably 120 to 150 nm, more preferably 125 to 145 nm, and still more preferably 135 to 140 nm.

In addition, a retardation layer in which the Re is an approximately ¾ wavelength or approximately 5/4 wavelength is also preferable from the viewpoint that the linearly polarized light can be converted into the circularly polarized light.

In addition, it is preferable that the retardation layer used in the laminated optical body according to the third embodiment has reverse dispersibility with respect to the wavelength. It is preferable that the retardation layer has reverse dispersibility from the viewpoint that circularly polarized light can be converted into linearly polarized light over a wide wavelength range in the visible region. Here, the expression “having reverse dispersibility with respect to the wavelength” denotes that as the wavelength increases, the value of the phase difference at the wavelength increases.

The retardation layer having reverse dispersibility can be prepared, for example, by uniaxially stretching a polymer film such as a modified polycarbonate resin film having reverse dispersibility with reference to JP2017-049574A and the like.

In addition, the retardation layer having reverse dispersibility is not limited as long as the retardation layer substantially has reverse dispersibility, and can be prepared by laminating a retardation layer having Re of an approximately ¼ wavelength and a retardation layer having Re of an approximately ½ wavelength such that the slow axes form an angle of approximately 60° as described in, for example, JP6259925B. Here, it is known that even in a case where the ¼ wavelength retardation layer and the ½ wavelength retardation layer each have forward dispersibility (as the wavelength increases, the value of the phase difference at the wavelength decreases), circularly polarized light can be converted into linearly polarized light over a wide wavelength range in the visible region, and the layers can be regarded as having substantially reverse dispersibility. In this case, it is preferable that the laminated optical body according to the third embodiment includes a reflective circular polarizer, a ¼ wavelength retardation layer, a ½ wavelength retardation layer, and a linear polarizer in this order.

In addition, it is also preferable that the retardation layer used in the laminated optical body according to the third embodiment has a layer formed by immobilizing uniformly aligned liquid crystal compounds. For example, a layer formed by uniformly aligning rod-like liquid crystal compounds horizontally to the in-plane direction or a layer formed by uniformly aligning disk-like liquid crystal compounds vertically to the in-plane direction can be used. Furthermore, for example, a retardation layer having reverse dispersibility can be prepared by uniformly aligning rod-like liquid crystal compounds having reverse dispersibility and immobilizing the compounds with reference to JP2020-084070A and the like.

In addition, it is also preferable that the retardation layer used in the laminated optical body according to the third embodiment has a layer formed by immobilizing twistedly aligned liquid crystal compounds with a helical axis in the thickness direction. For example, as described in JP5753922B and JP5960743B, a retardation layer having a layer formed by immobilizing twistedly aligned rod-like liquid crystal compounds or twistedly aligned disk-like liquid crystal compounds with a helical axis in the thickness direction is used. In this case, the retardation layer can be regarded as having substantially reverse dispersibility, which is preferable.

A thickness of the retardation layer is not particularly limited, but is preferably 0.1 to 8 μm and more preferably 0.3 to 5 μm from the viewpoint of thinning.

The retardation layer may include a support, an alignment layer, a retardation layer, or the like, but the support and the alignment layer may be a temporary support which is peeled off and removed during the production of the laminated optical body. It is preferable that a temporary support is used from the viewpoint that the thickness of the laminated optical body can be reduced by transferring the retardation layer to another laminate and peeling and removing the temporary support and the adverse effect of the phase difference of the temporary support on the polarization degree of transmitted light can be eliminated.

The type of the support is not particularly limited, but it is preferable that the support is transparent, and examples thereof include films made of cellulose acylate, polycarbonate, polysulfone, polyethersulfone, polyacrylate and polymethacrylate, cyclic polyolefin, polyolefin, polyamide, polystyrene, polyester, or the like. Among these, a cellulose acylate film, a cyclic polyolefin film, polyacrylate, a polyacrylate film, or a polymethacrylate film is preferable. In addition, commercially available cellulose acetate films (for example, "TD80U" or "Z-TAC" manufactured by FUJIFILM Corporation) can also be used.

In a case where the support is a temporary support, a support having high tear strength is preferable from the viewpoint of preventing breakage during peeling. For example, a polycarbonate-based film, a polyester-based film, or the like is preferable.

In addition, from the viewpoint of suppressing the adverse effect on the polarization degree of transmitted light, it is preferable that the support has a small phase difference. Specifically, a magnitude of Re is preferably 10 nm or less, and an absolute value of a magnitude of Rth is preferably 50 nm or less. In addition, even in a case where the support is used as the above-described temporary support, it is preferable that the temporary support has a small phase difference from the viewpoint of performing quality inspection of the retardation layer or other laminates in a step of manufacturing the laminated optical body.

In addition, it is preferable that the retardation layer used in the laminated optical body according to the third embodiment is transparent to near-infrared light in order to minimize the influence on various sensors incorporated in optical systems such as a virtual reality display apparatus and an electronic finder, in which near-infrared light for eye tracking, facial expression recognition, and iris recognition is used as a light source.

[Absorption Type Linear Polarizer]

The absorption type linear polarizer (hereinafter, also simply referred to as "linear polarizer") used for the laminated optical body according to the third embodiment absorbs linearly polarized light in an absorption axis direction of incidence ray and transmits linearly polarized light in a transmission axis direction. A typical polarizer can be used as the linear polarizer, and for example, a polarizer in which a dichroic substance is dyed on polyvinyl alcohol or another polymer resin and is stretched so that the dichroic substance is aligned may be used, or a polarizer in which a dichroic substance is aligned by using alignment of a liquid crystal compound may be used. Among these, from the viewpoint of availability and an increase in polarization degree, a polarizer obtained by dyeing polyvinyl alcohol with iodine and stretching polyvinyl alcohol is preferable.

A thickness of the linear polarizer is preferably 10 μm or less, more preferably 7 μm or less, and still more preferably 5 μm or less. In a case where the linear polarizer is thin, cracks or breakage of the film can be prevented in a case where the laminated optical body is stretched or molded.

In addition, a single plate transmittance of the linear polarizer is preferably 40% or more and more preferably 42% or more. Moreover, the polarization degree is preferably 90% or more, more preferably 95% or more, and still more preferably 99% or more. In the present invention, the single plate transmittance and the polarization degree of the linear polarizer are measured using an automatic polarizing film measuring device: VAP-7070 (manufactured by Jasco Corporation).

In addition, it is preferable that the direction of the transmission axis of the linear polarizer coincides with the direction of the polarization axis of light converted into linearly polarized light by the retardation layer. For example, in a case where the retardation layer is a layer having a phase difference of a ¼ wavelength, an angle between the transmission axis of the linear polarizer and the slow axis of the retardation layer is preferably approximately 45°.

It is also preferable that the linear polarizer used in the laminated optical body according to the third embodiment is a light absorption anisotropic layer containing a liquid crystal compound and a dichroic substance. The linear polarizer containing a liquid crystal compound and a dichroic substance is preferable from the viewpoint that the thickness thereof can be reduced and cracks or breakage is unlikely to occur even in a case of being stretched or molded. A thickness of the light absorption anisotropic layer is not particularly limited, but is preferably 0.1 to 8 μm and more preferably 0.3 to 5 μm from the viewpoint of thinning.

The linear polarizer containing a liquid crystal compound and a dichroic substance can be produced with reference to, for example, JP2020-023153A. From the viewpoint of improving the polarization degree of the linear polarizer, an alignment degree of the dichroic substance in the light absorption anisotropic layer is preferably 0.95 or more and more preferably 0.97 or more.

In a case where the linear polarizer includes the light absorption anisotropic layer containing the liquid crystal compound and the dichroic substance, the linear polarizer may include a support, an alignment layer, a light absorption anisotropic layer, or the like, but the support and the alignment layer may be a temporary support which is peeled off and removed during the production of the laminated optical body. It is preferable that a temporary support is used from the viewpoint that the thickness of the laminated optical body can be reduced by transferring the light absorption anisotropic layer to another laminate and peeling and removing the temporary support and the adverse effect of the phase difference of the temporary support on the polarization degree of transmitted light can be eliminated.

The type of the support is not particularly limited, but it is preferable that the support is transparent, and examples thereof include films made of cellulose acylate, polycarbonate, polysulfone, polyethersulfone, polyacrylate and polymethacrylate, cyclic polyolefin, polyolefin, polyamide, polystyrene, polyester, or the like. Among these, a cellulose acylate film, cyclic polyolefin, polyacrylate, or polymethacrylate is preferable. In addition, commercially available cellulose acetate films (for example, “TD80U” or “Z-TAC” manufactured by FUJIFILM Corporation) can also be used.

In a case where the support is a temporary support, a support having high tear strength is preferable from the viewpoint of preventing breakage during peeling. For example, a polycarbonate-based film, a polyester-based film, or the like is preferable.

In addition, from the viewpoint of suppressing the adverse effect on the polarization degree of transmitted light, it is preferable that the support has a small phase difference. Specifically, a magnitude of Re is preferably 10 nm or less, and an absolute value of a magnitude of Rth is preferably 50 nm or less. In addition, even in a case where the support is used as the above-described temporary support, it is preferable that the temporary support has a small phase difference from the viewpoint of performing quality inspection of the light absorption anisotropic layer or other laminates in a step of manufacturing the laminated optical body.

In addition, it is preferable that the linear polarizer used in the laminated optical body according to the third embodiment is transparent to near-infrared light in order to minimize the influence on various sensors incorporated in optical systems such as a virtual reality display apparatus and an electronic finder, in which near-infrared light for eye tracking, facial expression recognition, and iris recognition is used as a light source.

Here, the light absorption anisotropic layer will be described in more detail. The light absorption anisotropic layer contains a liquid crystal compound and a dichroic substance, and the dichroic substance can be aligned in one direction by uniformly aligning the liquid crystal compound.

From the viewpoint of suppressing the decrease in polarization degree during stretching or molding, it is preferable that the liquid crystal compound or the dichroic substance has a radically polymerizable group. A molar content of the radically polymerizable group is preferably 0.6 mmol/g or more, more preferably 1.0 mmol/g or more, and still more preferably 1.5 mmol/g or more with respect to the solid content weight of a composition liquid used for forming the light absorption anisotropic layer.

<Liquid Crystal Compound>

The liquid crystal compound contained in a composition for forming the light absorption anisotropic layer is preferably a liquid crystal compound which does not exhibit dichroism in the visible range.

As such a liquid crystal compound, both a low-molecular-weight liquid crystal compound and a polymer liquid crystal compound can be used. Here, the “low-molecular-weight liquid crystal compound” denotes a liquid crystal compound having no repeating units in the chemical structure. In addition, the “polymer liquid crystal compound” refers to a liquid crystal compound including a repeating unit in a chemical structure.

Examples of the low-molecular-weight liquid crystal compound include liquid crystal compounds described in [0027] to [0034] of JP2013-228706A. Among these, a low-molecular-weight liquid crystal compound exhibiting smectic properties is preferable.

Examples of the polymer liquid crystal compound include thermotropic liquid crystal polymers described in JP2011-237513A. In addition, it is preferable that the polymer liquid crystal compound has a crosslinkable group (such as an acryloyl group or a methacryloyl group) at a terminal.

The liquid crystal compound may be used alone or in combination of two or more kinds thereof. It is also preferable that the polymer liquid crystal compound and the low-molecular-weight liquid crystal compound are used in combination.

A content of the liquid crystal compound is preferably 25 to 2000 parts by mass, more preferably 33 to 1000 parts by mass, and still more preferably 50 to 500 parts by mass with respect to 100 parts by mass of a content of the dichroic substance in the present composition. In a case where the content of the liquid crystal compound is within the above-described range, the alignment degree of the polarizer is further improved.

From the viewpoint of further increasing the alignment degree of the light absorption anisotropic layer to be obtained, it is preferable that the liquid crystal compound is a polymer liquid crystal compound and more preferable that the liquid crystal compound is a polymer liquid crystal compound having a repeating unit represented by Formula (1) (hereinafter, also referred to as “repeating unit (1)”).

(1)

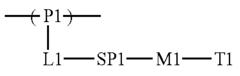

In Formula (1), P1 represents a main chain of the repeating unit, $L_1$ represents a single bond or a divalent linking group, SP1 represents a spacer group, M1 represents a mesogen group, and T1 represents a terminal group.

Specific examples of the main chain of the repeating unit, represented by P1, include groups represented by Formulae (P1-A) to (P1-D). Among these, from the viewpoint of diversity and handleability of a monomer serving as a raw material, a group represented by Formula (P1-A) is preferable.

(P1-A)

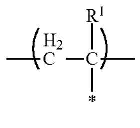

(P1-B)

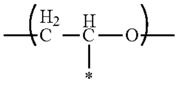

(P1-C)

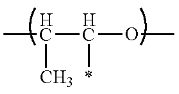

(P1-D)

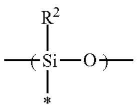

In Formulae (P1-A) to (P1-D), "*" represents a bonding position to $L_1$ in Formula (1). In Formula (P1-A), $R^1$ represents a hydrogen atom or a methyl group. In Formula (P1-D), $R^2$ represents an alkyl group.

From the viewpoint of further increasing the alignment degree of the light absorption anisotropic layer to be obtained, it is preferable that the group represented by Formula (P1-A) is a unit of a partial structure of poly(meth) acrylic acid ester obtained by polymerizing (meth)acrylic acid ester.

From the viewpoint of further increasing the alignment degree of the light absorption anisotropic layer to be obtained, it is preferable that the group represented by Formula (P1-B) is an ethylene glycol unit in polyethylene glycol obtained by polymerizing ethylene glycol.

From the viewpoint of further increasing the alignment degree of the light absorption anisotropic layer to be obtained, it is preferable that the group represented by Formula (P1-C) is a propylene glycol unit in polypropylene glycol obtained by polymerizing propylene glycol.

From the viewpoint of further increasing the alignment degree of the light absorption anisotropic layer to be obtained, it is preferable that the group represented by Formula (P1-D) is a siloxane unit of polysiloxane obtained by polycondensation of silanol.

L1 is a single bond or a divalent linking group.

Examples of the divalent linking group represented by L1 include —C(O)O—, —OC(O)—, —O—, —S—, —C(O)$NR^3$—, —$NR^3$C(O)—, —$SO_2$—, and —$NR^3R^4$—. In the formulae, $R^3$ and $R^4$ each independently represent a hydrogen atom or an alkyl group having 1 to 6 carbon atoms, which may have a substituent.

In a case where P1 is a group represented by Formula (P1-A), from the viewpoint of further increasing the alignment degree of the light absorption anisotropic layer to be obtained, it is preferable that L1 is a group represented by —C(O)O—.

In a case where P1 is a group represented by Formulae (P1-B) to (P1-D), from the viewpoint of further increasing the alignment degree of the light absorption anisotropic layer to be obtained, it is preferable that L1 is a single bond.

From the reason of easily expressing liquid crystallinity and availability of raw materials, it is preferable that the spacer group represented by SP1 has at least one structure selected from the group consisting of an oxyethylene structure, an oxypropylene structure, a polysiloxane structure, and an alkylene fluoride structure.

Here, the oxyethylene structure represented by SP1 is preferably a group represented by $*-(CH_2-CH_2O)_{n1}-*$ is preferable. In the formula, n1 represents an integer of 1 to 20, and * represents a bonding position to L1 or M1 in Formula (1). From the viewpoint of further increasing the alignment degree of the light absorption anisotropic layer to be obtained, n1 is preferably an integer of 2 to 10, more preferably an integer of 2 to 4, and most preferably 3.

In addition, from the viewpoint of further increasing the alignment degree of the light absorption anisotropic layer to be obtained, the oxypropylene structure represented by SP1 is preferably a group represented by $*-(CH(CH_3)-CH_2O)_{n2}-*$. In the formula, n2 represents an integer of 1 to 3, and * represents a bonding position to L1 or M1.

In addition, from the viewpoint of further increasing the alignment degree of the light absorption anisotropic layer to be obtained, the polysiloxane structure represented by SP1 is preferably a group represented by $*-(Si(CH_3)_2-O)_{n3}-*$. In the formula, n3 represents an integer of 6 to 10, and * represents a bonding position to L1 or M1.

In addition, from the viewpoint of further increasing the alignment degree of the light absorption anisotropic layer to be obtained, the alkylene fluoride structure represented by SP1 is preferably a group represented by $*-(CF_2-CF_2)_{n4}-*$. In the formula, n4 represents an integer of 6 to 10, and * represents a bonding position to L1 or M1.

The mesogen group represented by M1 is a group representing a main skeleton of a liquid crystal molecule which contributes to liquid crystal formation. A liquid crystal molecule exhibits liquid crystallinity which is in an intermediate state (mesophase) between a crystal state and an isotropic liquid state. The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly description in Chapter 3 of "Liquid Crystal Handbook" (Maruzen, 2000) edited by Liquid Crystal Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint of further increasing the alignment degree of the light absorption anisotropic layer to be obtained, the mesogen group preferably has an aromatic hydrocarbon group, more preferably has two to four aromatic hydrocarbon groups, and still more preferably has three aromatic hydrocarbon groups.

As the mesogen group, from the viewpoint of exhibiting the liquid crystallinity, of adjusting the liquid crystal phase transition temperature, of availability of raw materials, and of synthetic suitability, and from the viewpoint of more excellent effect of the third embodiment, a group represented by Formula (M1-A) or Formula (M1-B) is preferable, and a group represented by Formula (M1-B) is more preferable.

$$*-(A1)_{a1}-* \qquad \text{(M1-A)}$$

$$*-(A2-LA1)_{a2}-A3-* \qquad \text{(M1-B)}$$

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, an alkoxy group, or a substituent.

It is preferable that the divalent group represented by A1 is a 4- to 6-membered ring. In addition, the divalent group represented by A1 may be a monocyclic ring or a fused ring.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoint of design diversity of the mesogenic skeleton and the availability of raw materials, a phenylene group or a naphthylene group is preferable and a phenylene group is more preferable.

The divalent heterocyclic group represented by A1 may be any of aromatic or non-aromatic, but from the viewpoint of further improving the alignment degree, a divalent aromatic heterocyclic group is preferable.

Examples of atoms other than carbon, constituting the divalent aromatic heterocyclic group, include a nitrogen atom, a sulfur atom, and an oxygen atom. In a case where the aromatic heterocyclic group has a plurality of atoms other than carbon, constituting a ring, these atoms may be the same or different from each other.

Specific examples of the divalent aromatic heterocyclic group include a pyridylene group (pyridine-diyl group), a pyridazine-diyl group, an imidazole-diyl group, thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 represents 2 or more, a plurality of A1's may be the same or different from each other.

In Formula (M1-B), A2 and A3 each independently represent a divalent group selected from the group consisting of an aromatic hydrocarbon group, a heterocyclic group, and an alicyclic group. Specific examples and suitable aspects of A2 and A3 are the same as those for A1 in Formula (M1-A), and thus the description thereof will not be repeated.

In Formula (M1-B), a2 represents an integer of 1 to 10, and in a case where a2 is 2 or more, a plurality of A2's may be the same or different from each other, a plurality of A3's may be the same or different from each other, and a plurality of LA1's may be the same or different from each other. From the viewpoint of further increasing the alignment degree of the light absorption anisotropic layer to be obtained, a2 is preferably an integer of 2 or more and more preferably 2.

In Formula (M1-B), in a case where a2 is 1, LA1 represents a divalent linking group. In a case where a2 is 2 or more, a plurality of LA1's each independently represent a single bond or a divalent linking group, and at least one of the plurality of LA1's is a divalent linking group. In a case where a2 is 2, from the viewpoint of further increasing the alignment degree of the light absorption anisotropic layer to be obtained, it is preferable that one of two LA1's is a divalent linking group and the other is a single bond.

Examples of the divalent linking group represented by LA1 in Formula (M1-B) include —O—, $-(CH_2)_g-$, $-(CF_2)_g-$, $-Si(CH_3)_2-$, $-(Si(CH_3)_2O)_g-$, $-(OSi(CH_3)_2)_g-$ (g represents an integer of 1 to 10), —N(Z)—, —C(Z)=C(Z')—, —C(Z)=N—, —N=C(Z)—, $-C(Z)_2-C(Z')_2-$, —C(O)—, —OC(O)—, —C(O)O—, —O—C(O)O—, —N(Z) C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O) N(Z")—, —N(Z")—C(O)—C(Z)=C(Z')—, —C(Z)=C(Z')—C(O)—S—, —S—C(O)—C(Z)=C(Z')—, —C(Z)—N—N—C(Z')—(Z, Z', and Z" independently represent hydrogen, a C1 to C4 alkyl group, a cycloalkyl group, an aryl group, a cyano group, or a halogen atom), —C≡C—, —N=N—, —S—, —S(O)—, —S(O) (O)—, —(O) S(O)O—, —O(O) S(O) O—, —SC(O)—, and —C(O)S—. Among these, from the viewpoint of further increasing the alignment degree of the light absorption anisotropic layer to be obtained, —C(O)O— is preferable. LA1 may be a group obtained by combining two or more of these groups.

Specific examples of M1 include the following structures. In the following specific examples, "Ac" represents an acetyl group.

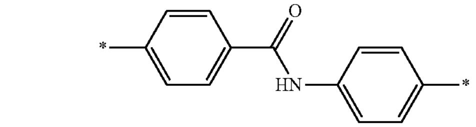

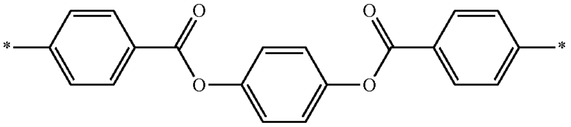

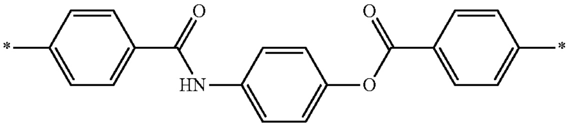

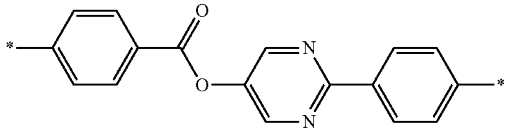

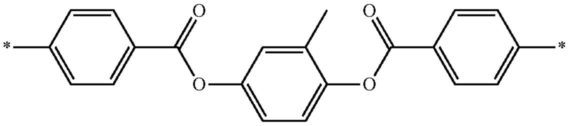

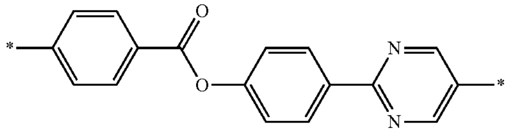

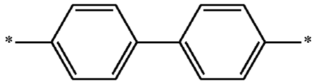

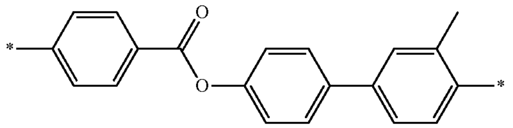

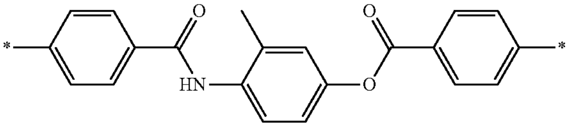

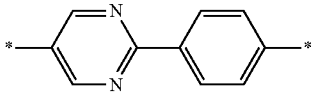

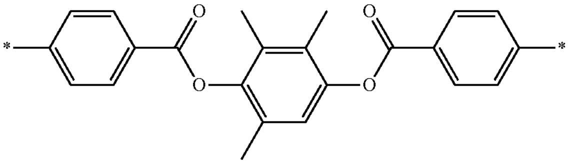

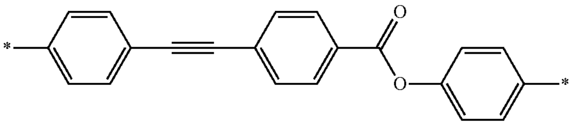

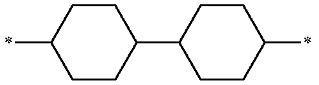

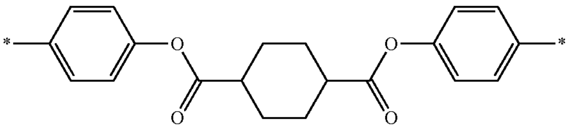

-continued
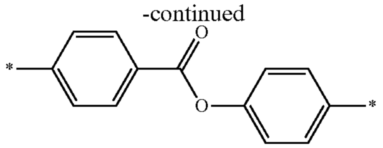
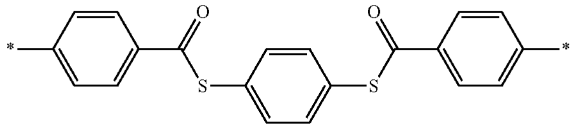
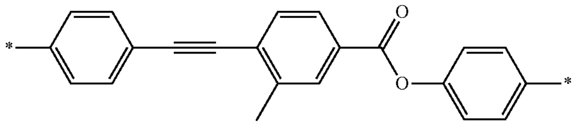
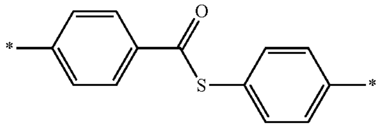
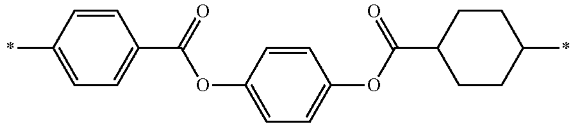
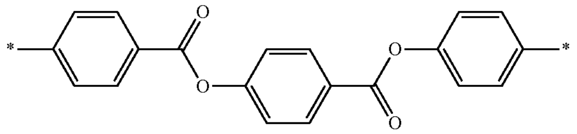
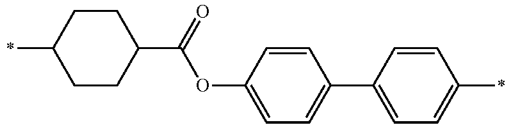
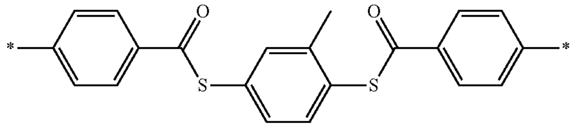
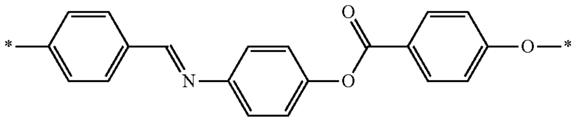
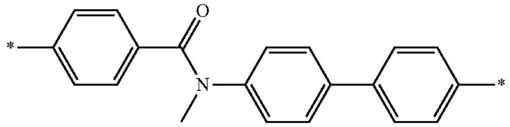
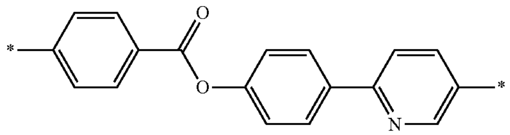
-continued
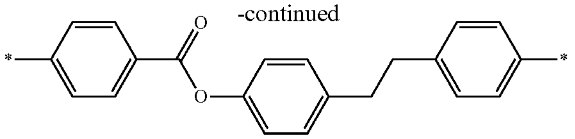
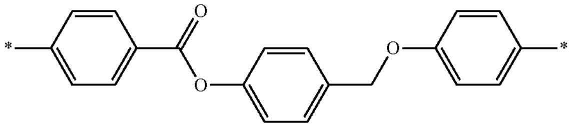
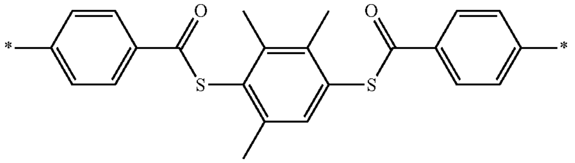
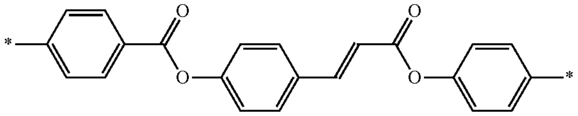
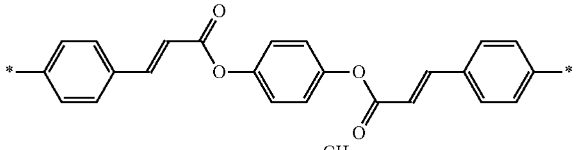
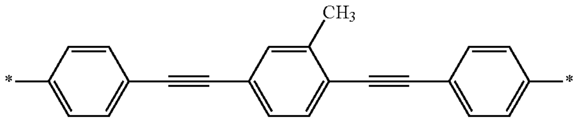
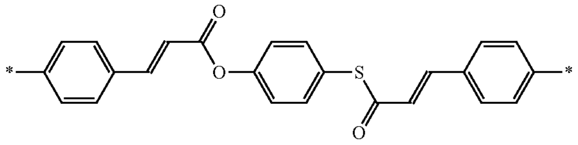
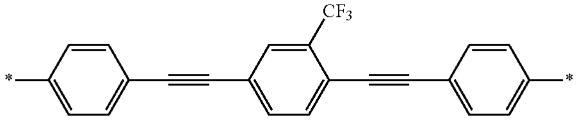
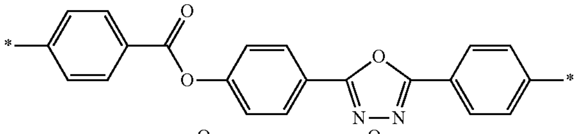
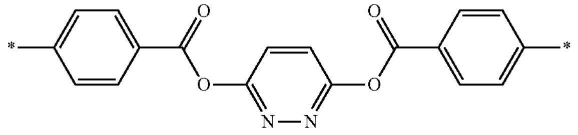
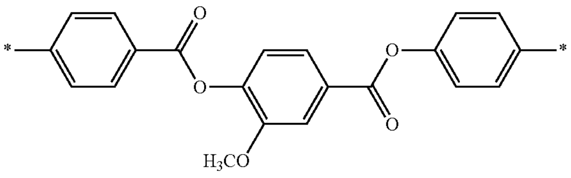

-continued
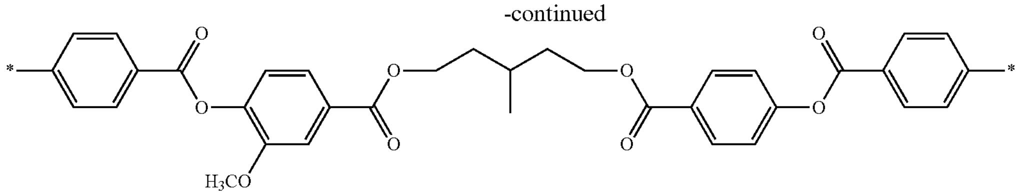
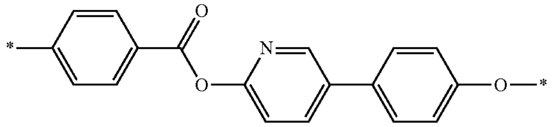
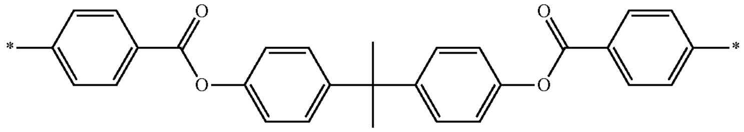
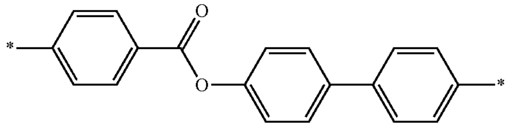
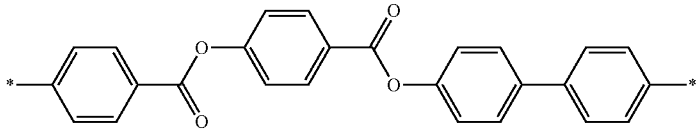
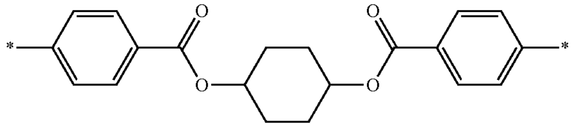
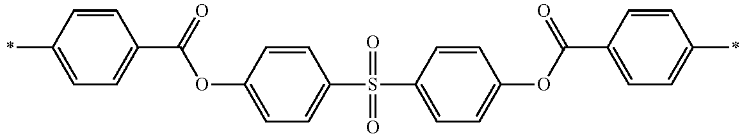
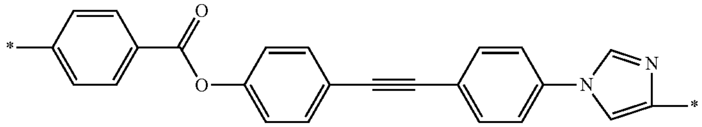
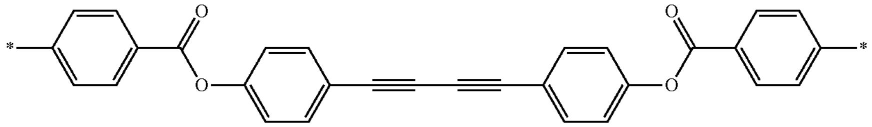
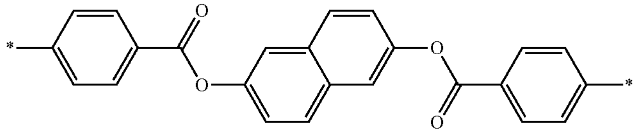
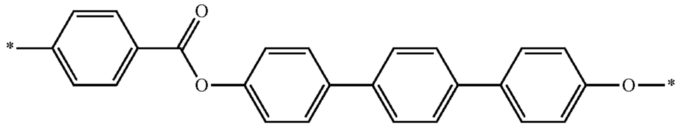
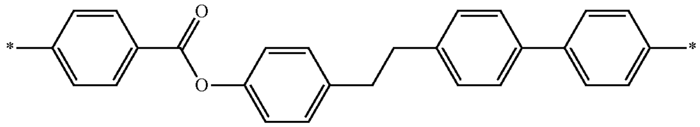
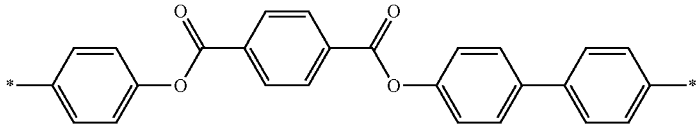

-continued
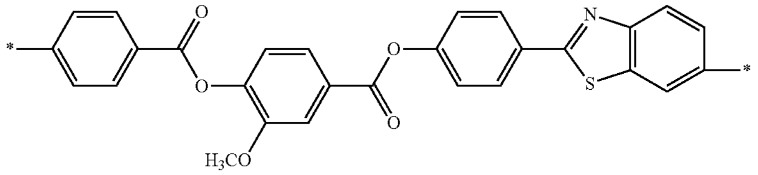
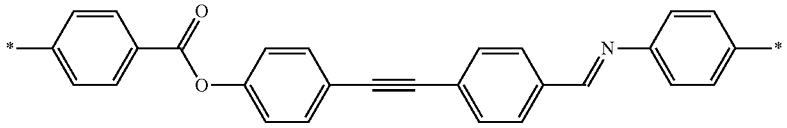
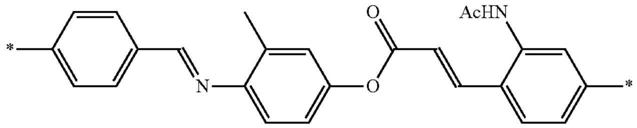
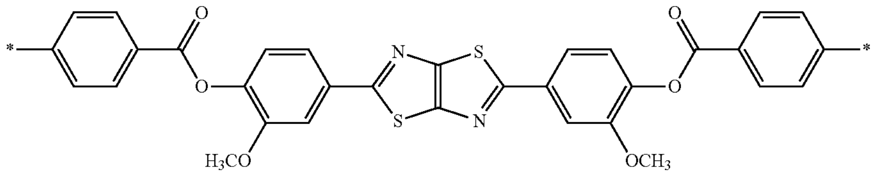
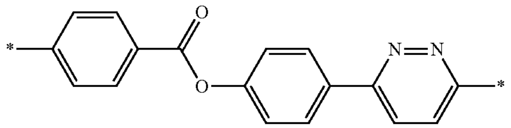
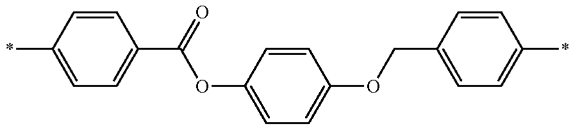
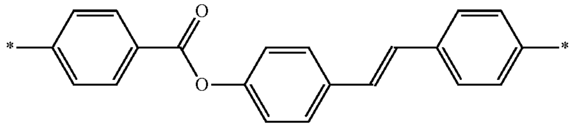
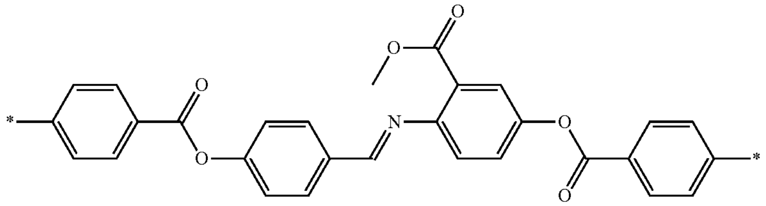
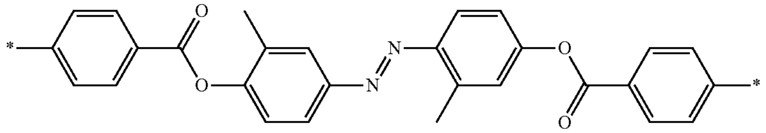
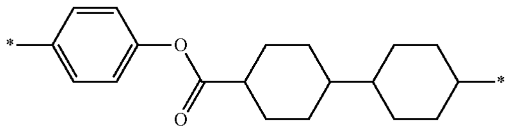
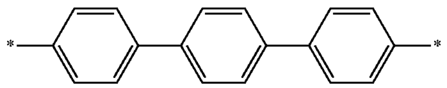
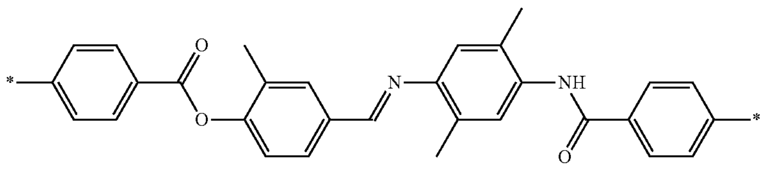
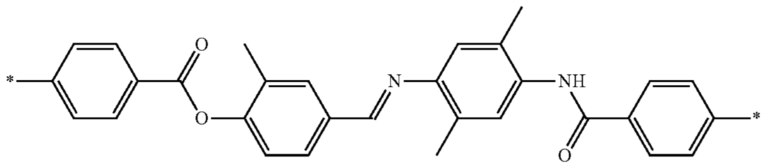

-continued

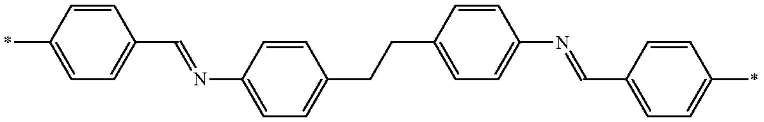

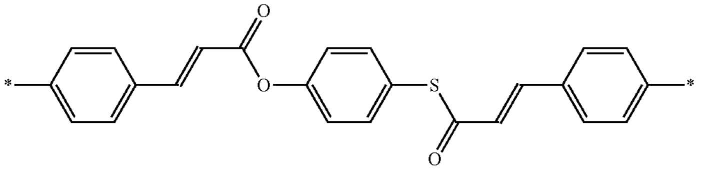

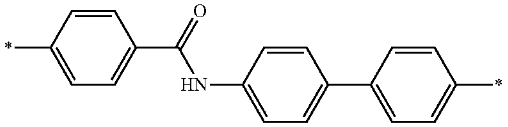

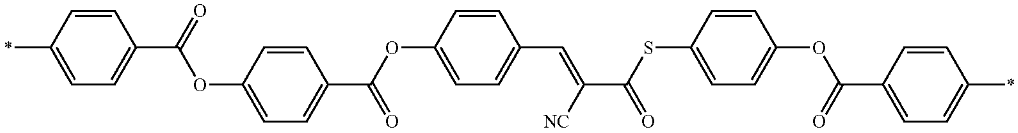

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—; R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the above-described (meth)acryloyloxy group-containing group include a group represented by -L-A (L represents a single bond or a linking group; specific examples of the linking group are the same as those for L1 and SP1 described above; and A represents a (meth)acryloyloxy group).

From the viewpoint of further increasing the alignment degree of the light absorption anisotropic layer to be obtained, T1 is preferably an alkoxy group having 1 to 10 carbon atoms, more preferably an alkoxy group having 1 to 5 carbon atoms, and still more preferably a methoxy group. These terminal groups may be further substituted with the groups or polymerizable groups described in JP2010-244038A.

From the viewpoint of further increasing the alignment degree of the light absorption anisotropic layer to be obtained, the number of atoms in the main chain of T1 is preferably 1 to 20, more preferably 1 to 15, still more preferably 1 to 10, and particularly preferably 1 to 7. In a case where the number of atoms in the main chain of T1 is 20 or less, the alignment degree of the polarizer is further improved. Here, the "main chain" of T1 means the longest molecular chain bonded to M1, and the number of hydrogen atoms is not included in the number of atoms in the main chain of T1. For example, in a case where T1 is an n-butyl group, the number of atoms in the main chain is 4, and in a case where T1 is an sec-butyl group, the number of atoms in the main chain is 3.

From the viewpoint of further increasing the alignment degree of the light absorption anisotropic layer to be obtained, a content of the repeating unit (1) is preferably 20% to 100% by mass with respect to 100% by mass of all repeating units of the polymer liquid crystal compound.

In the third embodiment of the present invention, the content of each repeating unit included in the polymer liquid crystal compound is calculated based on the charged amount (mass) of each monomer used to obtain each repeating unit.

The polymer liquid crystal compound may include only one of the repeating unit (1), or two or more kinds of the repeating units (1). Among these, from the viewpoint of further increasing the alignment degree of the light absorption anisotropic layer to be obtained, it is preferable that the polymer liquid crystal compound has two kinds of the repeating units (1).

In a case where the polymer liquid crystal compound has two kinds of the repeating units (1), from the viewpoint of further increasing the alignment degree of the light absorption anisotropic layer to be obtained, it is preferable that the terminal group represented by T1 in one unit (repeating unit A) is an alkoxy group and the terminal group represented by T1 in the other unit (repeating unit B) is a group other than the alkoxy group.

From the viewpoint of further increasing the alignment degree of the light absorption anisotropic layer to be obtained, as the terminal group represented by T1 in the above-described repeating unit B, an alkoxycarbonyl group, a cyano group, or a (meth)acryloyloxy group-containing group is preferable, and an alkoxycarbonyl group or a cyano group is more preferable.

From the viewpoint of further increasing the alignment degree of the light absorption anisotropic layer to be obtained, a proportion (A/B) of a content of the above-described repeating unit A in the polymer liquid crystal compound to a content of the above-described repeating unit B in the polymer liquid crystal compound is preferably 50/50 to 95/5, more preferably 60/40 to 93/7, and still more preferably 70/30 to 90/10.

<Repeating Unit (3-2)>

The polymer liquid crystal compound may further include a repeating unit represented by Formula (3-2) (also referred to as "repeating unit (3-2)" in the present specification). This has advantages such as improvement of the solubility of the polymer liquid crystal compound in a solvent and ease of adjustment of the liquid crystal phase transition temperature.

The repeating unit (3-2) is different from the above-described repeating unit (1) in that the repeating unit (3-2) does not have at least a mesogen group.

In a case where the polymer liquid crystal compound includes the repeating unit (3-2), the polymer liquid crystal compound is a copolymer of the repeating unit (1) and the repeating unit (3-2) (or may be a copolymer further including the repeating units A and B), and may be any polymer such as a block polymer, an alternating polymer, a random polymer, or a graft polymer.

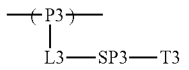

(3-2)

In Formula (3-2), P3 represents the main chain of the repeating unit, L3 represents a single bond or a divalent linking group, SP3 represents a spacer group, and T3 represents a terminal group.

Specific examples of P3, L3, SP3, and T3 in Formula (3-2) are the same as those for P1, L1, SP1, and T1 in Formula (1).

Here, from the viewpoint of improving the strength of the light absorption anisotropic layer, it is preferable that T3 in Formula (3-2) includes a polymerizable group.

In a case of containing the repeating unit (3-2), a content of the repeating unit (3-2) is preferably 0.5% to 40% by mass and more preferably 1% to 30% by mass with respect to 100% by mass of all repeating units of the polymer liquid crystal compound.

The polymer liquid crystal compound may include only one of the repeating unit (3-2), or two or more kinds of the repeating units (3-2). In the case of including two or more kinds of the repeating units (3-2), it is preferable that the total amount thereof is within the above-described range.

(Weight-Average Molecular Weight)

From the viewpoint of further increasing the alignment degree of the light absorption anisotropic layer to be obtained, a weight-average molecular weight (Mw) of the polymer liquid crystal compound is preferably 1,000 to 500,000 and more preferably 2,000 to 300,000. In a case where the Mw of the polymer liquid crystal compound is within the above-described range, the polymer liquid crystal compound is easily handled.

In particular, from the viewpoint of suppressing cracking during coating, the weight-average molecular weight (Mw) of the polymer liquid crystal compound is preferably 10,000 or more and more preferably 10,000 to 300,000.

In addition, from the viewpoint of temperature latitude of the alignment degree, the weight-average molecular weight (Mw) of the polymer liquid crystal compound is preferably less than 10,000 and preferably 2,000 or more and less than 10,000.

Here, the weight-average molecular weight and the number-average molecular weight in the present specification are values measured by a gel permeation chromatography (GPC) method.

Solvent (eluent): N-methylpyrrolidone

Device name: TOSOH HLC-8220GPC

Column: using three columns of TOSOH TSKgel Super AWM-H (6 mm×15 cm) connected

Column temperature: 25° C.

Sample concentration: 0.1% by mass

Flow rate: 0.35 mL/min

Calibration curve: TSK standard polystyrene (manufactured by TOSOH Corporation), calibration curves of 7 samples with Mw of 2,800,000 to 1,050 (Mw/Mn=1.03 to 1.06) are used (Content)

In the third embodiment, a content of the liquid crystal compound is preferably 50% to 99% by mass, and more preferably 70% to 96% by mass of the solid content in the composition for forming the light absorption anisotropic layer.

Here, the "solid content in the composition for forming the light absorption anisotropic layer" denotes a component excluding a solvent, and specific examples of the solid content include the above-described liquid crystal compound, and a dichroic substance, a polymerization initiator, an interface improver described later.

<Dichroic Substance>

The composition for forming the light absorption anisotropic layer contains a dichroic substance.

The dichroic substance is not particularly limited, and examples thereof include a visible light absorbing substance (dichroic coloring agent), an ultraviolet absorbing substance, an infrared absorbing substance, a nonlinear optical substance, and a carbon nanotube. In addition, known dichroic substances (dichroic coloring agents) of the related art can be used.

Specific examples thereof include substances described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-014883A, paragraphs [0012] to [0029] of JP2013-109090A, paragraphs [0009] to [0017] of JP2013-101328A, paragraphs [0051] to [0065] of JP2013-037353A, paragraphs [0049] to [0073] of JP2012-063387A, paragraphs [0016] to [0018] of JP1999-305036A (JP-H11-305036A), paragraphs [0009] to [0011] of JP2001-133630A, [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, and the like.

In the third embodiment, two or more kinds of dichroic substances may be used in combination. For example, from the viewpoint of obtaining a high polarization degree over a wider wavelength range, it is preferable that at least one dichroic substance having a maximal absorption wavelength in a wavelength range of 370 to 550 nm and at least one dichroic substance having a maximal absorption wavelength in a wavelength range of 500 to 700 nm are used in combination.

The above-described dichroic substance may have a crosslinkable group. In particular, from the viewpoint of suppressing the change in polarization degree during heating, it is preferable to have a crosslinkable group.

Specific examples of the above-described crosslinkable group include a (meth)acryloyl group, an epoxy group, an oxetanyl group, and a styryl group, and among these, a (meth)acryloyl group is preferable.

(Content)

From the viewpoint of further increasing the alignment degree of the dichroic substance, a content of the dichroic substance in the composition for forming the light absorption anisotropic layer is preferably 1 to 400 parts by mass, more preferably 2 to 100 parts by mass, and still more preferably 5 to 30 parts by mass with respect to 100 parts by mass of the liquid crystal compound.

It is preferable that none of the liquid crystal compound and the dichroic substance described above has absorption to near-infrared light. In this manner, it is possible to minimize the influence of the light absorption anisotropic layer on various sensors using near-infrared light as a light source, such as eye tracking, facial expression recognition, and iris authentication, which are incorporated into the optical system, such as a virtual reality display apparatus or an electronic finder.

<Surfactant>

As the surfactant contained in the composition for forming the light absorption anisotropic layer, a known surfactant in the related art can be used, but a copolymer having a repeating unit containing a fluorinated alkyl group (hereinafter, also referred to as “repeating unit F”) and a repeating unit having a ring structure (hereinafter, also referred to as “repeating unit M”) is preferable.

As a Hansen solubility parameter, a value calculated by inputting a structural formula of a compound to HSPiP (Ver. 5.1.08) is employed. A dispersion element δD is an element resulting from the Van der Waals force.

In the copolymer, the δD and the volume are calculated by a structural formula in which a bonding portion of each repeating unit is substituted with a hydrogen atom, and a value averaged by the volume ratio is employed.

High-temperature aging at 80° C. to 140° C. is required to align the liquid crystal compound, and a decrease in the viscosity of the composition during the high-temperature aging may result in cissing failure. As a result of studies by the inventors, it has been found that there is a correlation between δD of the surfactant and the clogging failure. Specifically, the δD of the surfactant is preferably 15.5 or more and 17.5 or less and more preferably 15.8 or more and 17.0 or less.

(Repeating Unit F)

The repeating unit F included in the above-described copolymer is preferably a repeating unit represented by Formula (a).

(a)

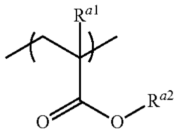

In Formula (a), $R^{a1}$ represents a hydrogen atom or an alkyl group having 1 to 20 carbon atoms, $R^{a2}$ represents an alkyl group having 1 to 20 carbon atoms or an alkenyl group having 2 to 20 carbon atoms, in which at least one carbon atom has a fluorine atom as a substituent.

In Formula (a), from the viewpoint of further suppressing alignment defects of the light absorption anisotropic layer to be obtained, $R^{a2}$ represents preferably an alkyl group having 1 to 10 carbon atoms or an alkenylene group having 2 to 10 carbon atoms, in which at least one carbon atom has a fluorine atom as a substituent, more preferably an alkyl group having 1 to 10 carbon atoms, and particularly preferably a group in which half or more of the carbon atoms included in $R^{a2}$ have a fluorine atom as a substituent.

In the third embodiment, the repeating unit F included in the above-described copolymer is more preferably a repeating unit represented by Formula (b).

(b)

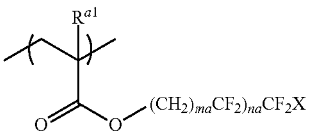

In Formula (b), $R^{a1}$ represents a hydrogen atom or an alkyl group having 1 to 20 carbon atoms, ma and na each independently represent an integer of 0 or more, and X represents a hydrogen atom or a fluorine atom.

Here, it is preferable that ma represents an integer of 1 or more and 10 or less and na represents 4 or more and 12 or less.

Specific examples of a monomer which forms the repeating unit F included in the copolymer (hereinafter, also abbreviated as “fluoroalkyl group-containing monomer”) include 2,2,2-trifluoroethyl (meth)acrylate, 2,2,3,3,3-pentafluoropropyl (meth)acrylate, 2-(perfluorobutyl)etyl (meth) acrylate. 2-(perfluorohexyl)ethyl (meth)acrylate, 2-(perfluoroctyl (meth)acrylate. 2-(perfluorodecyl)ethyl (meth) acrylate, 2-(perfluoro-3-methylbutyl)etyl (meth)acrylate. 2-(perfluoro-5-methylhexyl)etyl (meth)acrylate. 2-(perfluoro-7-methyloctyl)etyl (meth)acrylate. 1H,1H,3H-tetrafluoropropyl (meth)acrylate. 1H,1H,5H-octafluoropentyl (meth)acrylate. 1H,1H,7H-dodecafluoroheptyl (meth)acrylate. 1H, 1H,9H-hexadecafluorononyl (meth)acrylate. 1H-1-(trifuolomethyl)trifluoroethyl (meth)acrylate. 1H, 1H,3H-hexafluorobutyl (meth)acrylate. 3-perfluorobutyl-2-hydroxypropyl (meth)acrylate. 3-perfluorohexyl-2-hydroxypropyl (meth)acrylate. 3-perfluorooctyl-2-hydroxypropyl (meth)acrylate. 3-(perfluoro-3-methylbutyl)-2-hydroxypropyl (meth)acrylate,3-(perfluoro-5-methylhexyl)-2-hydroxypropyl (meth)acrylate, and 3-(perfluoro-7-methyloctyl)-2-hydroxypropyl (meth)acrylate.

In the third embodiment, from the viewpoint of reactivity and surface modification effect, a proportion of the fluoroalkyl group-containing monomer to be copolymerized with respect to 1 mol of the monomer having a mesogenic group, which will be described later, is preferably 0.01 to 100 mol, more preferably 0.1 to 50 mol, and still more preferably 1 to 30 mol.

(Repeating Unit M)

The repeating unit M included in the above-described copolymer may be a unit having a ring structure.

The ring structure is, for example, at least one ring structure selected from the group consisting of an aromatic hydrocarbon group, a heterocyclic group, and an alicyclic group. From the viewpoint of suppressing alignment defects, it is preferable that the repeating unit M has two or more ring structures.

In the third embodiment, the repeating unit M included in the above-described copolymer is more preferably a repeating unit represented by Formula (b).

(c)

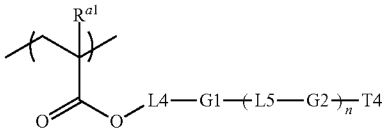

In Formula (c), $R^{a1}$ represents a hydrogen atom or an alkyl group having 1 to 20 carbon atoms, L4 and L5 represent a single bond or an alkylene group having 1 to 8 carbon atoms, G1 and G2 represent a divalent cyclic group, T1 represents a terminal group, and n represents an integer of 0 to 4.

In regard to the alkylene group represented by L4 and L5, one or more $—CH_2—$'s constituting the alkylene group may be substituted with at least one group selected from the group consisting of a single bond, —O—, —S—, $—NR^{31}—$, —C(═O)—, —C(═S)—, $—CR^{32}—CR^{32}—$, —C≡C—, $—SiR^{33}R^{34}—$, —N═N—, $—CR^{35}═N—N═CR^{36}—$, $—CR^{37}═N—$, and $—SO_2—$, and $R^{31}$ to $R^{37}$ each independently represent a hydrogen atom, a halogen atom, a cyano group, a nitro group, or a linear or branched alkyl group having 1 to 10 carbon atoms.

In addition, in a case where L represents an alkylene group, hydrogen atoms contained in one or more pieces of $—CH_2—$ constituting an alkylene group may be substituted with at least one group selected from the group consisting of a halogen atom, a cyano group, a nitro group, a hydroxyl group, a linear alkyl group having 1 to 10 carbon atoms, and a branched alkyl groups having 1 to 10 carbon atoms.

Among these, it is preferable that L4 represents an alkyleneoxy group having 4 to 6 carbon atoms and having a terminal which is oxygen, and it is most preferable that L5 represents an ester group.

Each divalent cyclic group represented by G1 and G2 is independently a divalent alicyclic hydrocarbon group or a divalent aromatic hydrocarbon group having 5 to 8 carbon atoms, and one or more $—CH_2—$ constituting the alicyclic hydrocarbon group may be substituted with —O—, —S—, or —NH—. Furthermore, a plurality of alicyclic hydrocarbon groups or aromatic hydrocarbon groups may be bonded through a single bond. Among these, a benzene ring is preferable.

Examples of the terminal group represented by T4 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—; R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Among these, a hydrogen atom or a cyano group is most preferable.

A molar ratio of the repeating unit F to all repeating units is preferably 50% by mole or more from the viewpoint of the alignment degree, and is preferably 70% by mole or less from the viewpoint of cissing.

(Content)

In the third embodiment, from the viewpoint of further increasing the alignment degree of the light absorption anisotropic layer to be obtained, a content of the above-described surfactant is preferably 0.05 to 15 parts by mass, more preferably 0.08 to 10 parts by mass, and still more preferably 0.1 to 5 parts by mass with respect to 100 parts by mass of the above-described liquid crystal compound.

<Polymerization Initiator>

It is preferable that the composition for forming the light absorption anisotropic layer contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds ([0065] of JP2016-027384A), and acylphosphine oxide compounds (JP1988-040799B (JP-S63-040799B), JP1993-029234B (JP-H5-029234B), JP1998-095788A (JP-H10-095788A), and JP1998-29997A (JP-H10-029997A)).

Commercially available products can also be used as such a photopolymerization initiator, and examples thereof include IRGACURE-184, IRGACURE-907, IRGACURE-369, IRGACURE-651, IRGACURE-819, IRGACURE-OXE-01, and IRGACURE-OXE-02, manufactured by BASF SE.

In a case where the composition for forming the light absorption anisotropic layer contains a polymerization initiator, a content of the polymerization initiator is preferably 0.01 to 30 parts by mass and more preferably 0.1 to 15 parts by mass with respect to 100 parts by mass of the total amount of the above-described dichroic substance and the above-described polymer liquid crystal compound in the composition for forming the light absorption anisotropic layer. The durability of the light absorption anisotropic film is enhanced in a case where the content of the polymerization initiator is 0.01 parts by mass or more, and the alignment degree of the light absorption anisotropic film is improved in a case where the content thereof is 30 parts by mass or less.

The polymerization initiator may be used alone or in combination of two or more kinds thereof. In a case of containing two or more kinds of polymerization initiators, it is preferable that the total amount thereof is within the above-described range.

<Solvent>

From the viewpoint of workability and the like, the coloring composition for forming the light absorption anisotropic layer preferably contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, 2-methyltetrahydrofuran, cyclopentyl methyl ether, tetrahydropyran, and dioxolane), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane, dichloroethane, dichlorobenzene, and chlorotoluene), esters (such as methyl acetate, ethyl acetate, butyl acetate, and ethyl lactate), alcohols (such as ethanol, isopropanol, butanol, cyclohexanol, isopentyl alcohol, neopentyl alcohol, diacetone alcohol, and benzyl alcohol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, and N-ethylpyrrolidone), and heterocyclic compounds (such as pyridine), and water. These solvents may be used alone or in combination of two or more kinds thereof.

Among these solvents, from the viewpoint of taking advantage of excellent solubility, ketones (particularly, cyclopentanone or cyclohexanone), ethers (particularly, tetrahydrofuran, cyclopentyl methyl ether, tetrahydropyran, or dioxolane), or amides (particularly, dimethylformamide, dimethylacetamide, N-methylpyrrolidone, or N-ethylpyrrolidone) are preferable.

In a case where the composition for forming the light absorption anisotropic layer contains a solvent, a content of the solvent is preferably 80% to 99% by mass, more preferably 83% to 97% by mass, and particularly preferably 85% to 95% by mass with respect to the total mass of the composition for forming the light absorption anisotropic layer.

The solvent may be used alone or in combination of two or more kinds thereof. In a case of containing two or more kinds of solvents, it is preferable that the total amount thereof is within the above-described range.

<Method of Forming Light Absorption Anisotropic Layer>

A method of forming the light absorption anisotropic layer is not particularly limited, and examples thereof include a method including, in the following order, a step of applying the above-described composition for forming the light absorption anisotropic layer onto the above-described photoalignment layer to form a coating film (hereinafter, also referred to as "coating film forming step") and a step of aligning liquid crystal components or dichroic substance contained in the coating film (hereinafter, also referred to as "alignment step").

In a case where the above-described dichroic substance has liquid crystallinity, the liquid crystal component is a component which also includes the dichroic substance having liquid crystallinity in addition to the above-described liquid crystal compound.

(Coating Film Forming Step)

The coating film forming step is a step of applying the composition for forming the light absorption anisotropic layer onto the photoalignment layer to form a coating film.

The composition for forming the light absorption anisotropic layer can be easily applied onto the photoalignment layer using a composition for forming a light absorption anisotropic layer, which contains the above-described solvent, or using a liquid such as a melt obtained by heating the composition for forming the light absorption anisotropic layer.

Specific examples of a method of applying the composition for forming the light absorption anisotropic layer include known methods such as a roll coating method, a gravure printing method, a spin coating method, a wire bar coating method, an extrusion coating method, a direct gravure coating method, a reverse gravure coating method, a die-coating method, a spraying method, and an ink jet method.

(Alignment Step)

The alignment step is a step of aligning the liquid crystal component contained in the coating film. In this manner, the light absorption anisotropic layer is obtained.

The alignment step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystal component contained in the composition for forming the light absorption anisotropic layer may be aligned by the coating film forming step or the drying treatment described above. For example, in an aspect in which the composition for forming the light absorption anisotropic layer is prepared as a coating liquid containing a solvent, a coating film having light absorption anisotropy (that is, a light absorption anisotropic film) is obtained by drying the coating film and removing the solvent from the coating film.

In a case where the drying treatment is performed at a temperature higher than or equal to a transition temperature of the liquid crystal component contained in the coating film to the liquid crystal phase, a heat treatment described below may not be performed.

From the viewpoint of manufacturing suitability or the like, the transition temperature of the liquid crystal component contained in the coating film to the liquid crystal phase is preferably 10° C. to 250° C. and more preferably 25° C. to 190° C. In a case where the above-described transition temperature is 10° C. or higher, a cooling treatment or the like for lowering the temperature to a temperature range in which the liquid crystal phase is exhibited is not necessary, which is preferable. In addition, in a case where the above-described transition temperature is 250° C. or lower, a high temperature is not required even in a case of setting an isotropic liquid state at a temperature higher than the temperature range in which the liquid crystal phase is temporarily exhibited, and waste of thermal energy and deformation and deterioration of a substrate can be reduced, which is preferable.

It is preferable that the alignment step includes a heat treatment. In this manner, since the liquid crystal component contained in the coating film can be aligned, the coating film after being subjected to the heat treatment can be suitably used as the light absorption anisotropic film.

From the viewpoint of the manufacturing suitability or the like, the heat treatment is performed at a temperature of preferably 10° C. to 250° C. and more preferably 25° C. to 190° C. In addition, the heating time is preferably 1 to 300 seconds and more preferably 1 to 60 seconds.

The alignment step may include a cooling treatment performed after the heat treatment. The cooling treatment is a treatment of cooling the heated coating film to room temperature (20° C. to 25° C.). In this manner, the alignment of the liquid crystal component contained in the coating film can be fixed. A cooling unit is not particularly limited, and the cooling treatment can be performed according to a known method.

The light absorption anisotropic film can be obtained by performing the above-described steps.

In the present embodiment, examples of a method of aligning the liquid crystal component contained in the coating film include the drying treatment and the heat treatment, but the present invention is not limited thereto, and the liquid crystal component can be aligned by a known alignment treatment.

(Other Steps)

The method of forming the light absorption anisotropic layer may include a step of curing the light absorption anisotropic layer after the alignment step (hereinafter, also referred to as "curing step").

The curing step is performed by heating the light-absorbing anisotropic layer and/or irradiating the light-absorbing anisotropic layer with light (exposing the light-absorbing anisotropic layer to light), for example, in a case where the light-absorbing anisotropic layer has a crosslinkable group (polymerizable group). Among these, it is preferable that the curing step is performed by irradiating the light-absorbing anisotropic layer with light.

Various light sources such as infrared rays, visible light, and ultraviolet rays can be used as a light source for curing, but ultraviolet rays are preferable. In addition, ultraviolet rays may be applied while the layer is heated during curing, or ultraviolet rays may be applied through a filter which transmits only a specific wavelength.

In a case where the exposure is performed while the layer is heated, the heating temperature during the exposure depends on the transition temperature of the liquid crystal component contained in the liquid crystal film to the liquid crystal phase, but it is preferably 25° C. to 140° C.

In addition, the exposure may be performed under a nitrogen atmosphere. In a case where the curing of the liquid crystal film proceeds by radical polymerization, since inhibition of polymerization by oxygen is reduced, it is preferable that the exposure is performed in a nitrogen atmosphere.

[Other Functional Layers]

The laminated optical body according to the third embodiment may have other functional layers in addition to the reflective circular polarizer, the retardation layer, and the linear polarizer.

In addition, it is preferable that the other functional layers are transparent to near-infrared light in order to minimize the influence on various sensors incorporated in optical systems such as a virtual reality display apparatus and an electronic finder, in which near-infrared light for eye tracking, facial expression recognition, and iris recognition is used as a light source.

<Positive C-Plate>

It is also preferable that the laminated optical body according to the third embodiment further includes a positive C-plate. Here, the positive C-plate is a retardation layer in which the Re is substantially zero and the Rth has a negative value. The positive C-plate can be obtained, for example, by vertically aligning rod-like liquid crystal compounds. With regard to the details of the method for manufacturing the positive C-plate, reference can be made to the description in, for example, JP2017-187732A, JP2016-053709A, JP2015-200861A, and the like.

The positive C-plate functions as an optical compensation layer for increasing the polarization degree of the transmitted light with respect to light incident obliquely. A plurality of the positive C-plates may be provided at any position of the laminated optical body.

The positive C-plate may be disposed adjacent to the reflective circular polarizer or inside the reflective circular polarizer. For example, in a case where a light reflecting layer containing a rod-like liquid crystal compound, which is formed by immobilizing a cholesteric liquid crystalline phase, is used as the reflective circular polarizer, the light reflecting layer has a positive Rth. Here, in a case where light is incident on the reflective circular polarizer in an oblique direction, the polarization states of the reflected light and the transmitted light may change due to the action of the Rth, and the polarization degree of the transmitted light may decrease. In a case where the positive C-plate is provided inside the reflective circular polarizer and/or in the vicinity thereof, the change in polarization state of the oblique incident light is suppressed and the decrease in polarization degree of the transmitted light can be suppressed, which is preferable. According to the studies conducted by the writers, it is preferable that the positive C-plate is disposed on a surface of the blue light reflecting layer on a side opposite to the green light reflecting layer, but the positive C-plate may be disposed at another place. Re of the positive C-plate in this case is preferably approximately 10 nm or less, and Rth thereof is preferably −600 to −100 nm and more preferably −400 to −200 nm.

In addition, the positive C-plate may be provided adjacent to the retardation layer or inside the retardation layer. For example, in a case where a layer formed by immobilizing a rod-like liquid crystal compound is used as the retardation layer, the retardation layer has a positive Rth. Here, in a case where light is incident on the retardation layer in an oblique direction, the polarization state of the transmitted light may change due to the action of the Rth, and the polarization degree of the transmitted light may decrease. In a case where the positive C-plate is provided inside the retardation layer and/or in the vicinity thereof, the change in polarization state of the oblique incident light is suppressed and the decrease in polarization degree of the transmitted light can be suppressed, which is preferable. According to the studies conducted by the writers, it is preferable that the positive C-plate is disposed on a surface of the retardation layer on a side opposite to the linear polarizer, but the positive C-plate may be disposed at another place. Re of the positive C-plate in this case is preferably approximately 10 nm or less, and Rth thereof is preferably −90 to −40 nm.

<Antireflection Layer>

It is also preferable that the laminated optical body according to the third embodiment includes an antireflection layer on a surface thereof. The laminated optical body according to the third embodiment has a function of reflecting specific circularly polarized light and transmitting circularly polarized light orthogonal to the specific circularly polarized light, and the reflection on a surface of the laminated optical body typically includes unintended reflection of polarized light, which leads to the decrease in polarization degree of the transmitted light. Therefore, it is preferable that the laminated optical body includes an antireflection layer on the surface thereof. The antireflection layer may be provided only on one surface or on both surfaces of the laminated optical body.

The type of the antireflection layer is not particularly limited, but from the viewpoint of further decreasing the reflectivity, a moth-eye film or an AR film is preferable. In addition, in a case where the laminated optical body is stretched or molded, the moth-eye film is preferable from the viewpoint that high antireflection performance can be maintained even in a case of fluctuation in the film thickness due to the stretching. Furthermore, in a case where the antireflection layer includes a support and stretching or molding is performed, from the viewpoint of facilitating the stretching or the molding, the above-described support has a Tg peak temperature of preferably 170° C. or lower and more preferably 130° C. or lower. The above-described support is preferably, for example, a PMMA film or the like.

<Second Retardation Layer>

It is also preferable that the laminated optical body according to the third embodiment further includes a second retardation layer. For example, the laminated optical body may include the reflective circular polarizer, the retardation layer, the linear polarizer, and the second retardation layer in this order.

It is preferable that the second retardation layer converts linearly polarized light into circularly polarized light, and for example, a retardation layer having Re of a ¼ wavelength is preferable. The reason for this will be described below.

Light which has been incident on the laminated optical body from the side of the reflective circular polarizer and transmitted through the reflective circular polarizer, the retardation layer, and the linear polarizer is converted into linearly polarized light, and a part of the light is reflected on the outermost surface on the side of the linear polarizer and emitted from the surface on the side of the reflective circular polarizer again. Such light is extra reflected light and may decrease the polarization degree of the reflected light, and thus it is preferable that the amount of such light is reduced. Therefore, a method of laminating an antireflection layer may be considered to suppress reflection on the outermost surface on the side of the linear polarizer, but in a case where the laminated optical body is used by being bonded to a medium such as glass or plastic, the antireflection effect cannot be obtained because reflection on the surface of the medium cannot be suppressed even in a case where the antireflection layer is provided on the bonding surface of the laminated optical body.

Meanwhile, in a case where the second retardation layer which converts linearly polarized light into circularly polarized light is provided, light which reaches the outermost surface on the side of the linear polarizer is converted into circularly polarized light, and converted into circularly polarized light orthogonal to each other in a case of reflection on the outermost surface of the medium. Thereafter, in a case where the light is transmitted through the second retardation layer again and reaches the linear polarizer, the light is converted into linearly polarized light in the absorption axis azimuth of the linear polarizer and absorbed by the linear polarizer. Therefore, it is possible to prevent extra reflection.

From the viewpoint of more effectively suppressing the extra reflection, it is preferable that the second retardation layer has substantially reverse dispersibility.

<Support>

The laminated optical body according to the third embodiment may further include a support. The support can be provided at any position, and for example, in a case where the reflective circular polarizer, the retardation layer, or the linear polarizer is a film used by being transferred from the temporary support, the support can be used as a transfer destination thereof.

The type of the support is not particularly limited, but it is preferable that the support is transparent, and examples thereof include films made of cellulose acylate, polycarbonate, polysulfone, polyethersulfone, polyacrylate and polymethacrylate, cyclic polyolefin, polyolefin, polyamide, polystyrene, polyester, or the like. Among these, a cellulose acylate film, cyclic polyolefin, polyacrylate, or polymethacrylate is preferable. In addition, commercially available cellulose acetate films (for example, “TD80U” or “Z-TAC” manufactured by FUJIFILM Corporation) can also be used.

In addition, it is preferable that the support has a small retardation from the viewpoint of suppressing the adverse effect on the polarization degree of the transmitted light and viewpoint of facilitating the optical inspection of the laminated optical body. Specifically, a magnitude of Re is preferably 10 nm or less, and an absolute value of a magnitude of Rth is preferably 50 nm or less.

From the viewpoint of reducing the ghost, as the support, a polymethyl methacrylate (PMMA) film is preferable because it has negative birefringence.

In a case where the laminated optical body according to the third embodiment is stretched or molded, it is preferable that the support has a tan δ peak temperature of 170° C. or lower. From the viewpoint that the laminated optical film can be molded at a low temperature, the tan δ peak temperature is preferably 150° C. or lower and more preferably 130° C. or lower.

Here, a method of measuring tan δ will be described. E" (loss elastic modulus) and E' (storage elastic modulus) of a film sample which has been humidity-adjusted in advance in an atmosphere of a temperature of 25° C. and a humidity of 60% Rh for 2 hours or longer are measured under the following conditions using a dynamic viscoelasticity measuring device (DVA-200, manufactured by IT Measurement & Control Co., Ltd.), and the values are used to acquire tan δ (=E"/E').

Device: DVA-200, manufactured by IT Measurement & Control Co., Ltd.

Sample: 5 mm, length of 50 mm (gap of 20 mm)

Measurement conditions: tension mode

Measurement temperature: −150° C. to 220° C.

Heating conditions: 5° C./min

Frequency: 1 Hz

Typically in optical applications, a resin base material subjected to a stretching treatment is frequently used, and the tan δ peak temperature is frequently increased due to the stretching treatment. For example, with a TAC (triacetyl cellulose) base material (TG40, manufactured by FUJIFILM Corporation), the tan δ peak temperature is 180° C. or higher.

The support having a tan δ peak temperature of 170° C. or lower is not particularly limited, and various resin base materials can be used. Examples thereof include polyolefin such as polyethylene, polypropylene, and a norbornene-based polymer; a cyclic olefin-based resin; polyvinyl alcohol; polyethylene terephthalate; an acrylic resin such as polymethacrylic acid ester and polyacrylic acid ester; polyethylene naphthalate; polycarbonate; polysulfone; polyethersulfone; polyetherketone; polyphenylene sulfide, and polyphenylene oxide. Among these, from the viewpoint of being easily available from the market and having excellent transparency, a cyclic olefin-based resin, polyethylene terephthalate, or an acrylic resin is preferable, and a cyclic olefin-based resin or polymethacrylic acid ester is particularly preferable.

Examples of commercially available resin base materials include TECHNOLLOY S001G, TECHNOLLOY S014G, TECHNOLLOY S000, TECHNOLLOY C001, and TECHNOLLOY C000 (manufactured by Sumika Acryl Co., Ltd.), LUMIRROR U type, LUMIRROR FX10, and LUMIRROR SF20 (Toray Industries, Inc.), HK-53A (Higashiyama Film Co., Ltd.), TEFLEX FT3 (TOYOBO CO., LTD.), ESCENA and SCA40 (Sekisui Chemical Co., Ltd.), ZEONOR Film (ZEON CORPORATION), and an Arton Film (JSR Corporation).

A thickness of the support is not particularly limited, and is preferably 5 to 300 μm, more preferably 5 to 100 μm, and still more preferably 5 to 30 μm.

[Manufacturing Method of Laminated Optical Body]
<Lamination by Adhesion of Each Layer>

The laminated optical body according to the third embodiment is a laminate consisting of a plurality of layers. Each layer can be bonded by an optional adhesion method, and for example, a pressure sensitive adhesive or an adhesive can be used.

As the pressure sensitive adhesive, a commercially available pressure sensitive adhesive can be optionally used. From the viewpoint of thinning and viewpoint of reducing the surface roughness Ra of the laminated optical body, a thickness of the adhesive layer is preferably 25 μm or less, more preferably 15 μm or less, and still more preferably 6 μm or less. In addition, a pressure sensitive adhesive which is unlikely to generate outgas is preferable as the pressure sensitive adhesive. Particularly, in a case of performing stretching or molding, a vacuum process or a heating process may be performed, and it is preferable that no outgas is generated even under such conditions.

A commercially available adhesive can be optionally used as the adhesive, and for example, an epoxy resin-based adhesive or an acrylic resin-based adhesive can be used.

From the viewpoint of thinning and viewpoint of reducing the surface roughness Ra of the laminated optical body, a thickness of the adhesive layer is preferably 25 μm or less, more preferably 5 μm or less, and still more preferably 1 μm or less. In addition, from the viewpoint of reducing the thickness of the adhesive layer and coating an adherend with the adhesive such that the thickness thereof is uniform, a viscosity of the adhesive is preferably 300 cP or less, more preferably 100 cP or less, and still more preferably 10 cP or less.

In addition, in a case where the adherend has surface unevenness, from the viewpoint of reducing the surface roughness Ra of the laminated optical body, an appropriate viscoelasticity or an appropriate thickness of the pressure sensitive adhesive or the adhesive can also be selected so that the surface unevenness of the layer to be bonded can be embedded. From the viewpoint of embedding the surface unevenness, it is preferable that the pressure sensitive adhesive or the adhesive has a viscosity of 50 cP or more. In addition, it is preferable that the thickness thereof is more than a height of the surface unevenness.

Examples of a method of adjusting the viscosity of the adhesive include a method of using an adhesive containing a solvent. In this case, the viscosity of the adhesive can be adjusted by a proportion of the solvent. In addition, the thickness of the adhesive can be further reduced by drying the solvent after coating the adherend with the adhesive.

In the laminated optical body, from the viewpoint of reducing the extra reflection and suppressing a decrease in polarization degrees of transmitted light and reflected light, it is preferable that the pressure sensitive adhesive or adhesive used for adhering each layer has a small difference in refractive index with adjacent layers. Specifically, the difference in refractive index with the adjacent layer is preferably 0.1 or less, more preferably 0.05 or less, and still more preferably 0.01 or less. The refractive index of the pressure sensitive adhesive or the adhesive can be adjusted, for example, by mixing fine particles of titanium oxide, fine particles of zirconia, or the like.

In addition, the reflective circular polarizer, the retardation layer, and the linear polarizer have in-plane refractive index anisotropy, but the difference in refractive index with the adjacent layer is preferably 0.05 or less in all in-plane directions. Therefore, the pressure sensitive adhesive or the adhesive may have in-plane refractive index anisotropy.

In addition, in the adhesive layer between the layers, it is also preferable that a thickness of the adhesive layer is 100 nm or less. In a case where the thickness of the adhesive layer is 100 nm or less, light in the visible region is less likely to be affected by the difference in refractive index, and extra reflection can be suppressed. The thickness of the adhesive layer is more preferably 50 nm or less. Examples of a method of forming the adhesive layer having a thickness of 100 nm or less include a method of vapor-depositing a ceramic adhesive such as silicon oxide (SiOx layer) on the bonding surface. For the bonding surface of the bonding member, before the bonding, for example, a surface reforming treatment such as a plasma treatment, a corona treatment, and a saponification treatment can be performed, and a primer layer can be applied. In addition, in a case where a plurality of bonding surfaces are present, the kind and thickness of the adhesive layer can be adjusted for each of the bonding surfaces. Specifically, for example, the adhesive layer having a thickness of 100 nm or less can be provided by the procedures (1) to (3) described below.

(1) A layer to laminate is bonded to a temporary support consisting of a glass base material.

(2) A SiOx layer having a thickness of 100 nm or less is formed on both the surface of the layer to laminate and the surface of the layer to be laminated by vapor deposition or the like; the vapor deposition can be carried out by, for example, a vapor deposition device (model number ULEYES, manufactured by ULVAC, Inc.) using SiOx powder as a vapor deposition source; In addition, it is preferable that the surface of the formed SiOx layer is subjected to a plasma treatment.

(3) After the formed SiOx layers are bonded to each other, the temporary support is peeled off; it is preferable that the bonding is carried out, for example, at a temperature of 120° C.

The application, the adhesion, or the bonding of the layers may be carried out by roll-to-roll or single-wafer. The roll-to-roll method is preferable from the viewpoint of improving the productivity and reducing axis misalignment of each layer.

Meanwhile, the single-wafer method is preferable from the viewpoints that this method is suitable for production of many kinds in small quantities and that a special adhesion method in which the thickness of the adhesive layer is 100 nm or less can be selected.

In addition, examples of the method of coating the adherend with the adhesive include known methods such as a roll coating method, a gravure printing method, a spin coating method, a wire bar coating method, an extrusion coating method, a direct gravure coating method, a reverse gravure coating method, a die-coating method, a spraying method, and an ink jet method.

<Direct Application of Each Layer>

It is also preferable that no adhesive layer is provided between the layers of the laminated optical body according to the third embodiment. In a case of forming a layer, the layer can be formed without using an adhesive layer by directly applying a composition for forming the layer onto the already formed adjacent layer. Furthermore, in a case where one or both adjacent layers are layers containing a liquid crystal compound, it is preferable to form a layer in which the alignment direction of the liquid crystal compound is continuously changed at the interface in order to reduce the difference in refractive index in all in-plane directions. For example, the linear polarizer containing a liquid crystal compound and a dichroic substance is directly coated a retardation layer containing a liquid crystal compound, and the liquid crystal compound of the retardation layer can be aligned can be aligned so as to align the liquid crystal compound continuously at the interface by alignment regulating force of the liquid crystal compound of the linear polarizer.

<Lamination Order>

The laminated optical body according to the third embodiment consists of a plurality of layers, and the order of the steps of laminating the plurality of layers is not particularly limited and can be optionally selected.

For example, in a case where a functional layer is transferred from a film consisting of a temporary support and a functional layer, wrinkles or cracks during the transfer can be prevented by adjusting the laminating order such that the thickness of the film at the transfer destination reaches 10 μm or more.

In addition, from the viewpoint of reducing the surface roughness Ra of the laminated optical body, in a case where another layer is laminated on a layer having large surface unevenness, the surface unevenness may be further amplified, and thus it is preferable that the layers are laminated in order from a layer having a smaller surface roughness Ra.

In addition, from the viewpoint of quality evaluation in the step of producing the laminated optical body, the laminating order can also be selected. For example, layers excluding the reflective circular polarizer are laminated, the quality evaluation is performed using a transmission optical system, the reflective circular polarizer is laminated, and the quality evaluation is performed using a reflection optical system.

In addition, from the viewpoint of improving the production yield of the laminated optical body and reducing the cost, it is also possible to select the laminating order.

[Composite Lens]

One aspect of the composite lens according to the third embodiment includes a lens and the non-planar reflective circular polarizer according to the third embodiment. In addition, another aspect of the composite lens according to the third embodiment includes a lens and a non-planar laminated optical body obtained by molding the laminated optical body according to the third embodiment. In the composite lens, a half mirror may be formed on one surface of the lens on a side opposite to the non-planar reflective circular polarizer or the non-planar laminated optical body.

As the lens, a convex lens or a concave lens can be used. As the convex lens, a biconvex lens, a plano-convex lens, or a convex meniscus lens can be used. As the concave lens, a biconcave lens, a plano-concave lens, or a concave meniscus lens can be used. As the lens used in the virtual reality display apparatus, a convex meniscus lens or a concave meniscus lens is preferable for enlarging the angle of view, and a concave meniscus lens is more preferable in that chromatic aberration can be further suppressed. As a material of the lens, a material transparent to visible light, such as glass, crystal, and plastic, can be used. Since the birefringence of the lens causes rainbow-like unevenness or light leakage, it is preferable that the birefringence is small, and a lens made of a material having zero birefringence is more preferable.

[Virtual Reality Display Apparatus]

One aspect of the virtual reality display apparatus according to the third embodiment includes at least an image display device which emits polarized light, and a composite lens including the non-planar reflective circular polarizer according to the third embodiment. In addition, another aspect of the virtual reality display apparatus according to the third embodiment includes at least an image display device which emits polarized light, and a composite lens including the laminated optical body according to the third embodiment. In addition, the virtual reality display apparatus according to the third embodiment may include an additional optical member such as a half mirror and a visual acuity adjustment lens.

<Image Display Device>

As the image display device used in the third embodiment, a known image display device can be used. Examples thereof include a display device in which self-luminous microscopic light emitters are arranged on a transparent substrate, such as an organic electroluminescent display device, a light emitting diode (LED) display device, and a micro LED display device. In these self-luminous display devices, a (circular) polarizing plate is usually bonded to a display surface to prevent reflection on the display surface. Therefore, the emitted light is polarized. In addition, a liquid crystal display device is exemplified as other image display devices. Since the liquid crystal display device also has a polarizing plate on the surface, the emitted light is polarized. In the following description, the organic electroluminescent display device will also be referred to as "OLED". OLED is an abbreviation for "Organic Light Emitting Diode".

In the present invention, the first embodiment to the third embodiment can be used in combination.

For example, the optical laminate according to the first embodiment and the optically anisotropic film according to the second embodiment may be combined and used. For example, a virtual reality display apparatus including an optical lens in which the optical laminate according to the first embodiment is bonded to a curved surface part of a lens base material, and a molded body obtained by molding the optically anisotropic film according to the second embodiment into a rectangular shape including a curved surface may be manufactured.

In addition, for example, the optical laminate according to the first embodiment and the reflective circular polarizer or the non-planar reflective circular polarizer according to the third embodiment may be combined and used. For example, a virtual reality display apparatus including tan optical lens in which the optical laminate according to the first embodiment is bonded to a curved surface part of a lens base material, and a non-planar reflective circular polarizer obtained by molding the reflective circular polarizer according to the third embodiment may be manufactured.

In addition, for example, the optically anisotropic film according to the second embodiment and the reflective circular polarizer or the non-planar reflective circular polarizer according to the third embodiment may be combined and used. For example, a virtual reality display apparatus including a molded body obtained by molding the optically anisotropic film according to the second embodiment into a rectangular shape including a curved surface, and a non-planar reflective circular polarizer obtained by molding the reflective circular polarizer according to the third embodiment may be manufactured.

The above descriptions are examples of a combination of the first embodiment to the third embodiment, and the combination is not limited in the present invention.

EXAMPLES

Hereinafter, the features of the present invention will be described in more detail with reference to Examples. The materials, the used amounts, the proportions, the treatment contents, the treatment procedures, and the like described in Examples can be appropriately changed without departing from the gist of the present invention. In addition, configurations other than the configurations described below can be employed without departing from the gist of the present invention.

Example A

<Production of Polystyrene Film>

0.3% by mass of a hindered phenol-based stabilizer "Irganox 1010" (manufactured by Chiba Specialty Chemicals Corporation) and 0.7% by mass of an ultraviolet absorber 2,2'-(p-phenylene) di-3,1-benzoxazin-4-one (manufactured by FUJIFILM Fine Chemicals Co., Ltd., product name UVSORB 101) were mixed with a commercially available atactic polystyrene resin HF77 (manufactured by PS Japan Corporation), and the mixture was melt-extruded at 300° C. using a 30 mmΦ single-axis extruder, and then closely attached to a cooling roll at 50° C. by an electrostatic pinning method to obtain a non-stretched film having a thickness of 40 μm. At this time, a screen filter, a gear pump, and a leaf disk filter were arranged between the extruder and a die in this order, in which these were connected by a melting pipe, and the mixture was extruded from a die having a width of 450 mm and a lip gap of 1 mm.

The polystyrene film produced in this manner was used as a first optically anisotropic layer in Example A1.

<Production of Acrylic Film>

A non-stretched acrylic film was produced in the same manner as in Example A1, except that the material was changed to a commercially available modified acrylic resin DELPET 980N (manufactured by Asahi Kasei Corporation).

The acrylic film produced in this manner was used as a first optically anisotropic layer in Example A2.

[Production of Retardation Layer 1]

A retardation layer 1 having reverse dispersibility was produced with reference to the method described in paragraphs 0151 to 0163 of JP2020-084070A. Re of the retardation layer 1 was 146 nm and Rth thereof was 73 nm.

The retardation layer 1 produced in this manner was used as a third optically anisotropic layer in Examples A1 and A2 and Comparative Example A1.

[Production of Coating Liquids R-1, R-2, D-1, and D-2 for Cholesteric Liquid Crystal Layer]

A composition shown below was stirred and dissolved in a container kept at 70° C. to prepare each of coating liquids R-1 and R-2 for a cholesteric liquid crystal layer. Here, R represents a coating liquid containing a rod-like liquid crystal.

| Coating liquid R-1 for cholesteric liquid crystal layer | | |
|---|---|---|
| Methyl ethyl ketone | 120.9 | parts by mass |
| Cyclohexanone | 21.3 | parts by mass |
| Mixture of rod-like liquid crystals shown below | 100.0 | parts by mass |
| Photopolymerization initiator b | 1.00 | part by mass |
| Chiral agent A shown below | 3.00 | parts by mass |
| Surfactant F1 shown below | 0.027 | parts by mass |
| Surfactant F2 shown below | 0.067 | parts by mass |

(Coating Liquid R-2 for Cholesteric Liquid Crystal Layer)

A coating liquid R-2 for a cholesteric liquid crystal layer was prepared in the same manner as in the coating liquid R-1 for a cholesteric liquid crystal layer, except that the addition amount of the chiral agent A was changed as shown in the following table.

Table 1. Amount of Chiral Agent in Coating Liquid Containing Rod-Like Liquid Crystal

TABLE 1

| Coating liquid name | Amount of chiral agent (part by mass) |
|---|---|
| Liquid R-1 | 3.00 |
| Liquid R-2 | 3.62 |

Mixture of Rod-Like Liquid Crystals

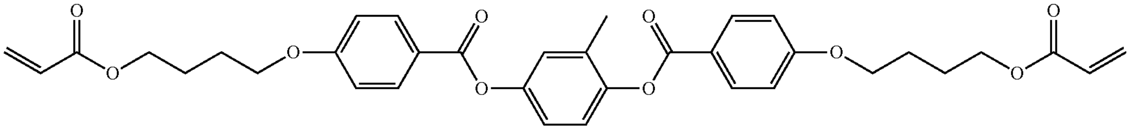

84%

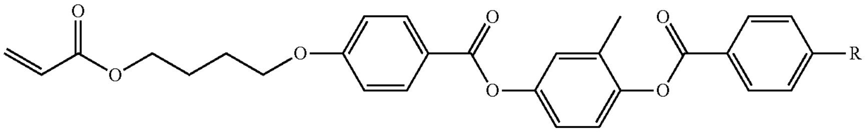

14%

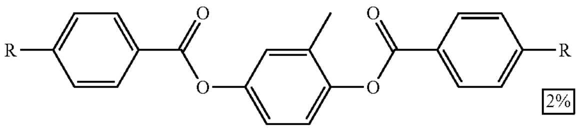

2%

R

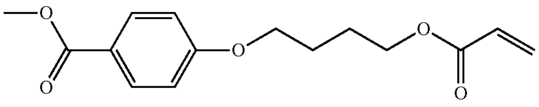

In the above-described mixture, each numerical value denotes the content in units of % by mass. In addition, R is a group bonded through an oxygen atom. Furthermore, an average molar absorption coefficient of the above-described rod-like liquid crystal at a wavelength of 300 to 400 nm was 140/mol·cm.

Chiral Agent A

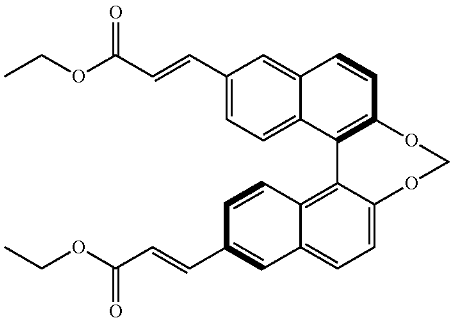

Surfactant F1

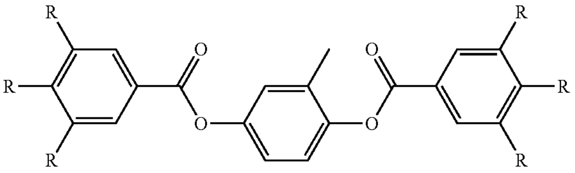

Surfactant F2

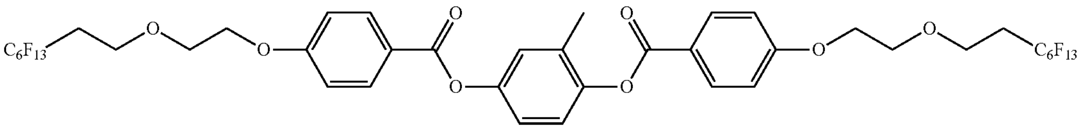

Photopolymerization initiator B

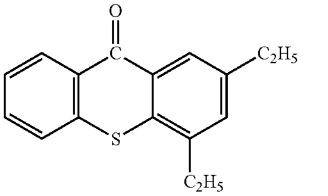

R =

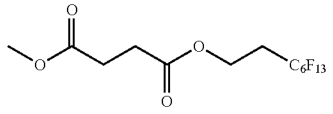

The chiral agent A is a chiral agent in which the helical twisting power (HTP) is reduced by light.

(Coating Liquid D-1 for Cholesteric Liquid Crystal Layer)

A composition shown below was stirred and dissolved in a container kept at 50° C. to prepare each of coating liquids D-1 and D-2 for a cholesteric liquid crystal layer. Here, D represents a coating liquid containing a disk-like liquid crystal.

| Coating liquid D-1 for cholesteric liquid crystal layer | |
|---|---|
| Disc-like liquid crystal (A) shown below | 80 parts by mass |
| Disc-like liquid crystal (B) shown below | 20 parts by mass |
| Polymerizable monomer E1 | 10 parts by mass |
| Surfactant F4 | 0.3 parts by mass |
| Photopolymerization initiator (IRGACURE 907 manufactured by BASF SE) | 3 parts by mass |
| Chiral agent A | 4.00 parts by mass |
| Methyl ethyl ketone | 290 parts by mass |
| Cyclohexanone | 50 parts by mass |

(Coating Liquid D-2 for Cholesteric Liquid Crystal Layer)

A coating liquid D-2 for a cholesteric liquid crystal layer was prepared in the same manner as in the coating liquid D-1 for a cholesteric liquid crystal layer, except that the addition amount of the chiral agent A was changed as shown in Table 2.

Table 2. Amount of Chiral Agent in Coating Liquid Containing Disk-Like Liquid Crystal

TABLE 2

| Coating liquid name | Amount of chiral agent (part by mass) |
|---|---|
| Liquid D-1 | 4.00 |
| Liquid D-2 | 5.30 |

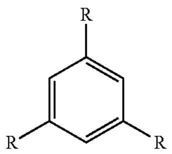

Disk-like liquid crystal (A)

R =

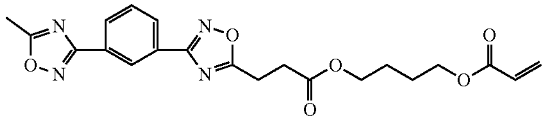

-continued

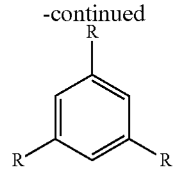

Disk-like liquid crystal (B)

R =

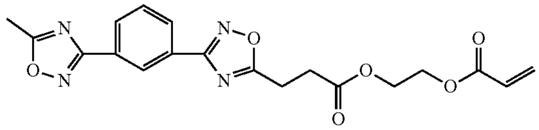

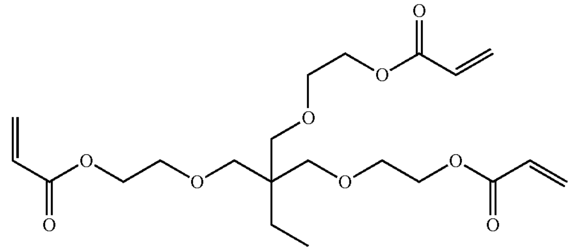

Polymerizable monomer E1

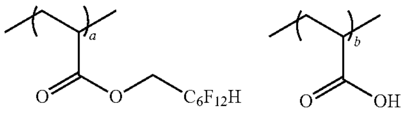

Surfactant F4 a/b = 98/2

[Production of Cholesteric Liquid Crystal Layer 1]

A polyethylene terephthalate (PET) film (A4100 manufactured by Toyobo Co., Ltd.) having a thickness of 50 μm was prepared as a temporary support. The PET film had an easy adhesion layer on one surface.

A surface of the PET film, which was not provided with the easy adhesion layer, was subjected to a rubbing treatment, coated with the coating liquid R-1 for a cholesteric liquid crystal layer prepared above using a wire bar coater, and dried at 110° C. for 120 seconds. Thereafter, the surface was irradiated with light using a metal halide lamp at 100° C., an illuminance of 80 mW/$cm^2$, and an irradiation amount of 500 mJ/$cm^2$ in a low oxygen atmosphere (100 ppm or less), thereby curing the coating liquid to form a red light reflecting cholesteric liquid crystal layer consisting of a cholesteric liquid crystal layer. The irradiation with light was performed from the side of the cholesteric liquid crystal layer in all cases. Here, the coating thickness was adjusted so that the film thickness of the cured red light reflecting cholesteric liquid crystal layer was 4.5 μm.

Next, the surface of the red light reflecting cholesteric liquid crystal layer was subjected to a corona treatment at a discharge amount of 150 W·min/$m^2$, and the surface subjected to the corona treatment was coated with the coating liquid D-1 for a cholesteric liquid crystal layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was kept at 45° C. and irradiated with ultraviolet rays (300 mJ/$cm^2$) using a metal halide lamp in a nitrogen atmosphere, thereby curing the coating film to form a yellow light reflecting cholesteric liquid crystal layer on the red light reflecting cholesteric liquid crystal layer. The irradiation with light was performed from the side of the cholesteric liquid crystal layer in all cases. Here, the coating thickness was adjusted so that the film thickness of the cured yellow light reflecting cholesteric liquid crystal layer was 3.3 μm.

Next, the yellow light reflecting cholesteric liquid crystal layer was coated with the coating liquid R-2 for a cholesteric liquid crystal layer using a wire bar coater and dried at 110° C. for 120 seconds. Thereafter, the surface was irradiated with light using a metal halide lamp at 100° C., an illuminance of 80 mW/$cm^2$, and an irradiation amount of 500 mJ/$cm^2$ in a low oxygen atmosphere (100 ppm or less), thereby curing the coating liquid to form a green light reflecting cholesteric liquid crystal layer on the yellow light reflecting cholesteric liquid crystal layer. The irradiation with light was performed from the side of the cholesteric liquid crystal layer in all cases. Here, the coating thickness was adjusted so that the film thickness of the cured green light reflecting cholesteric liquid crystal layer was 2.7 μm.

Next, the surface of the green light reflecting cholesteric liquid crystal layer was subjected to a corona treatment at a discharge amount of 150 W·min/$m^2$, and the surface subjected to the corona treatment was coated with the coating liquid D-2 for a cholesteric liquid crystal layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was kept at 45° C. and irradiated with ultraviolet rays (300 mJ/$cm^2$) using a metal halide lamp in a nitrogen atmosphere, thereby curing the coating film to form a blue light reflecting cholesteric liquid crystal layer on the green light reflecting cholesteric liquid crystal layer. The irradiation with light was performed from the side of the cholesteric liquid crystal layer in all cases. Here, the coating thickness was adjusted so that the film thickness of the cured blue light reflecting cholesteric liquid crystal layer was 2.5 μm.

In this manner, a cholesteric liquid crystal layer 1 was produced.

Example A1

A virtual reality display apparatus "VIVE FLOW" manufactured by HTC Corporation was disassembled, and an optical lens was taken out. The "VIVE FLOW" is a virtual reality display apparatus in which a pancake lens is adopted, and a liquid crystal display device which emits circularly polarized light by a polarizing plate bonded to a surface is used as an image display device.

In addition, the taken optical lens was two types of lenses, one of which was a biconvex lens having a half-mirror coating on one surface and the other of which was a plano-convex lens having an optical laminate bonded to a plane.

Next, the above-described polystyrene film, which had been molded into a curved surface by a vacuum molding method, was bonded to a surface of the above-described biconvex lens opposite to the surface on which the half-mirror coating was performed. As a pressure sensitive adhesive for adhering the film to the biconvex lens, a pressure sensitive adhesive NCF-D695 (thickness: 5 μm) manufactured by LINTEC Corporation was used. In the following description, in a case where the vacuum molding method was used, the film was attached to the curved surface in the same manner using the pressure sensitive adhesive NCF-D695 manufactured by LINTEC Corporation. Furthermore, the above-described retardation layer 1 was bonded to the polystyrene film by superimposing the retardation layer 1 on the polystyrene film and molding into a curved surface by the vacuum molding method.

In this manner, an optical lens 1 in which the optical laminate including the polystyrene film (first optically anisotropic layer) and the retardation layer 1 (third optically anisotropic layer) was laminated on one curved surface of the biconvex lens was obtained.

Next, the optical laminate was peeled off from the plane of the taken plano-convex lens, and an absorption type polarizer, a reflective type linear polarizer "APF" manufactured by 3M, and an antireflection film "AR100" manufactured by Dexerials Corporation were bonded thereto in this order.

The obtained optical lens 1 and the plano-convex lens were assembled again into a lens barrel of "VIVE FLOW" to produce a virtual reality display apparatus of Example 1.

Example A2

A virtual reality display apparatus of Example A2 was produced in the same manner as in Example 1, except that the polystyrene film used as the first optically anisotropic layer was changed to the above-described acrylic film.

Example A3

A virtual reality display apparatus "VIVE FLOW" manufactured by HTC Corporation was disassembled, and an optical lens was taken out.

In the taken optical lens, a plano-convex lens 1 with a curvature radius of 65 mm, a diameter of 50 mm, and a focal length of 125 mm on the convex surface side was prepared by removing a plano-convex lens to which the optical laminate was bonded. The absorption type polarizer, the above-described retardation layer 1, and the above-described cholesteric liquid crystal layer 1, which had been molded into a curved surface by the vacuum molding method, were sequentially bonded to the convex surface side of the plano-convex lens 1 in this order. The support of the retardation layer 1 and the support of the cholesteric liquid crystal layer 1 were removed by peeling after the molding.

Next, the above-described polystyrene film was further molded on the cholesteric liquid crystal layer 1 by the vacuum molding method. In this manner, an optical lens 2 in which the optical laminate was laminated on the convex surface side of the plano-convex lens was obtained.

The obtained optical lens 2 and the biconvex lens taken out from the "VIVE FLOW" were assembled again into a lens barrel of "VIVE FLOW" to produce a virtual reality display apparatus of Example 3.

Comparative Example A1

A virtual reality display apparatus of Comparative Example A1 was produced in the same manner as in Example A1, except that the polystyrene film was not used.

<Evaluation of Phase Difference of Optical Laminate>

A phase difference of the optical laminate produced in Examples A1 to A3 and Comparative Example A1 was measured using AxoScan OPMF-1 (manufactured by Opto Science, Inc.). The phase difference was measured at each azimuthal angle of 45° at a position of 15 mm from the center of the optical lens, and a value at which a deviation amount of Re from the above-described retardation layer 1 was the largest was recorded. The results are shown in Table 3.

In the optical laminate of Example A3, the cholesteric liquid crystal layer 1 used in the optical laminate was measured for the phase difference at a wavelength of 500 nm, at which the cholesteric liquid crystal layer 1 did not have reflectivity. In the other optical laminates, the phase difference was measured at a wavelength of 550 nm.

<Evaluation of Light Leakage>

In the virtual reality display apparatuses produced in Examples A1 to A3 and Comparative Example A1, a black-and-white checker pattern was displayed on the image display device, and a degree of light leakage was evaluated by visual observation in the following three stages. In a case where there was the light leakage, double images were visually recognized, and a contrast of the corresponding portion was lowered.

A: double images were hardly visible.

B: double images were slightly visible but not noticeable.

C: clear double images were observed.

The results are shown in Table 3.

Table 3. Evaluation Results of Light Leakage in Virtual Reality Display Apparatuses of Examples and Comparative Example

TABLE 3

| | First optically anisotropic layer | Third optically anisotropic layer | Fourth optically anisotropic layer | Deviation of phase difference in optical laminate | Light leakage |
|---|---|---|---|---|---|
| Example A1 | Polystyrene film | Retardation layer 1 | None | 5 nm | A |
| Example A2 | Acrylic film | Retardation layer 1 | None | 4 nm | A |
| Example A3 | Polystyrene film | Retardation layer 1 | Cholesteric liquid crystal layer 1 | 4 nm | A |
| Comparative Example A1 | None | Retardation layer 1 | | 20 nm | C |

As shown in Table 3, in the optical laminates of Examples A1 to A3, the deviation of Re from the retardation layer 1 was suppressed to be small, and thus, in the virtual reality display apparatus according to the first embodiment, the light leakage was effectively reduced as compared with that of Comparative Example, and the occurrence of double images and the decrease in contrast were suppressed.

It is considered that this is because the change in phase difference of the cholesteric liquid crystal layer, expressed by stretching on the curved surface, was offset by the change in phase difference (refractive index) of the retardation layer, expressed by the first optically anisotropic layer, that is, the negative birefringent resin, which was the polystyrene film or the acrylic film.

The virtual reality display apparatus according to the first embodiment of the present invention has been described in detail above, but the first embodiment of the present invention is not limited to the above-described examples, and various improvements and changes may be made without departing from the spirit of the first embodiment of the present invention.

Example B

[Production of First Optically Anisotropic Layer]

<Production of Photo-Alignment Film>

A coating liquid PA1 for forming an alignment layer, which will be described later, was continuously applied onto a resin base material "TECHNOLLOY C001" (polycarbonate/poly(methyl methacrylate) (PMMA) laminated substrate, 75 μm thick) manufactured by Sumitomo Acryl Co., Ltd. using a wire bar. The support on which the coating film had been formed was dried with hot air at 140° C. for 120 seconds to obtain a support 1 with a photo-alignment film.

A thickness of the photo-alignment film was 0.3 μm.

| Coating liquid PA1 for forming alignment layer | |
|---|---|
| Polymer PA-1 shown below | 100.00 parts by mass |
| Acid generator PAG-1 shown below | 5.00 parts by mass |
| Acid generator CPI-110TF shown below | 0.005 parts by mass |
| Xylene | 1220.00 parts by mass |
| Methyl isobutyl ketone | 122.00 parts by mass |

Polymer PA-1

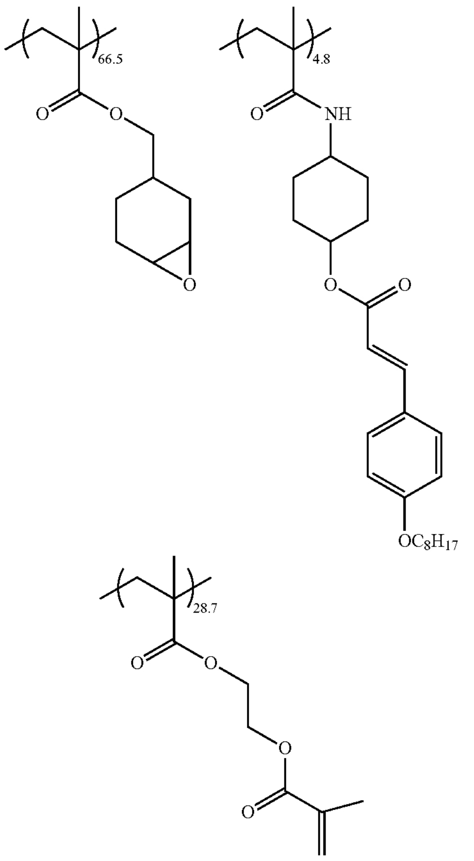

-continued

Acid generator PAG-1

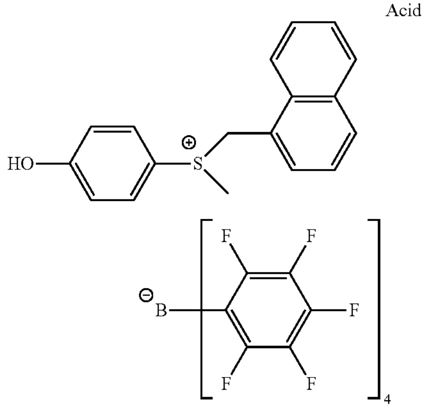

Acid generator CPI-100TF

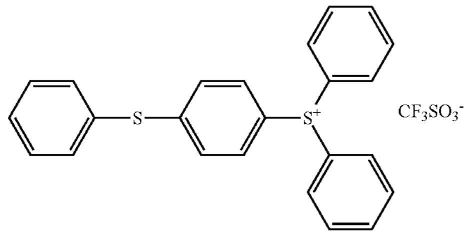

<Alignment Treatment of Photo-Alignment Film>

With reference to JP2012-118438A, a wire grid polarizer having the same distribution of the reflection axis as that of the optical axis 220*a* shown by the reference numeral 210*a* in FIG. 4 and a pitch of a concave-convex period of 10 nm was produced. Ultraviolet rays generated using an ultra-high pressure mercury lamp were collimated using a collimating lens, polarized by passing through the above-described wire grid polarizer, and irradiated on the support 1 with a photo-alignment film. In this way, an alignment treatment was performed on the photo-alignment film.

<Production of Composition for Forming Light Absorption Anisotropic Layer>

The following composition P1 for forming a light absorption anisotropic layer was produced.

| Formulation of composition P1 for forming light absorption anisotropic layer | |
|---|---|
| Dichroic substance DP-1 shown below | 0.05 parts by mass |
| Dichroic substance DP-2 shown below | 0.07 parts by mass |
| Dichroic substance DP-3 shown below | 0.12 parts by mass |
| Polymer liquid crystal compound P-1 shown below | 0.44 parts by mass |
| Low-molecular-weight liquid crystal compound M-1 shown below | 0.27 parts by mass |
| Polymerization initiator IRGACURE OXE-02 (manufactured by BASF SE) | 0.040 parts by mass |
| Surfactant F-1 shown below | 0.005 parts by mass |
| Cyclopentanone | 48.0 parts by mass |
| Tetrahydrofuran | 48.0 parts by mass |
| Benzyl alcohol | 3.00 parts by mass |

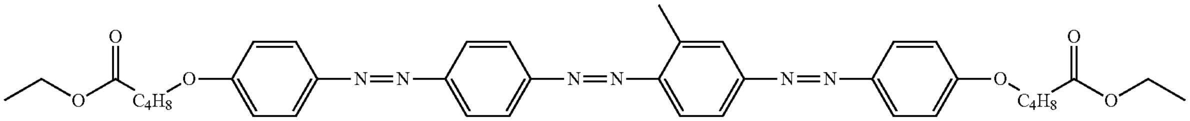
DP-1
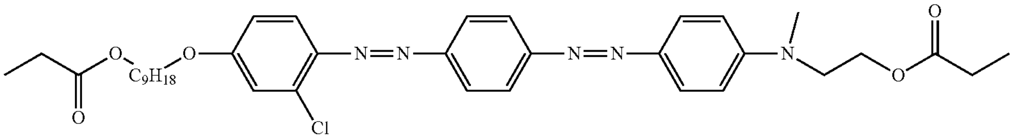
DP-2
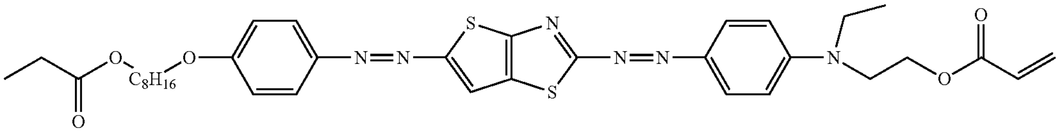
DP-3
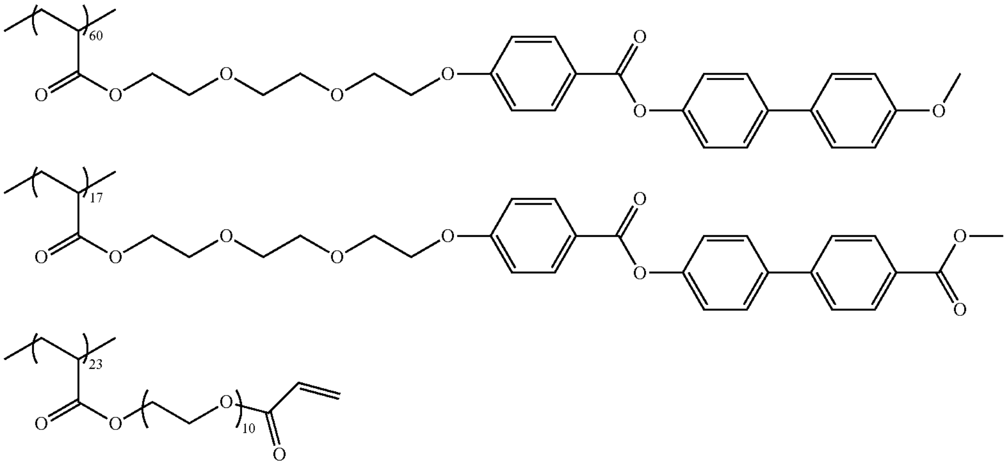
Polymer liquid crystal compound P-1
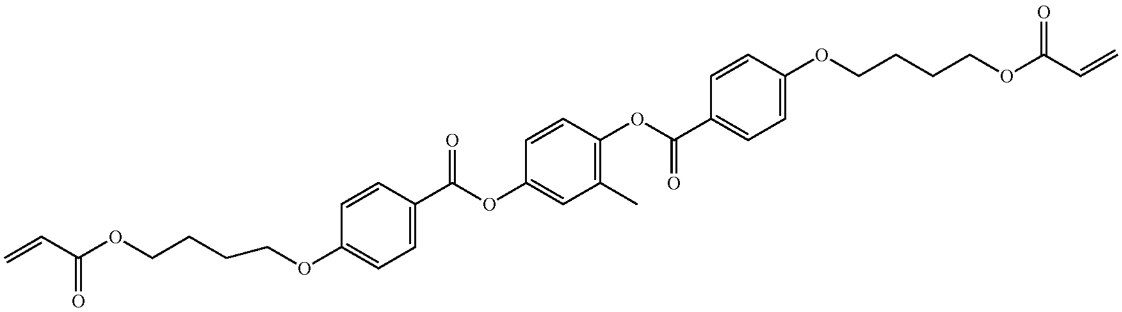
Low-molecular-weight liquid crystal compound M-1
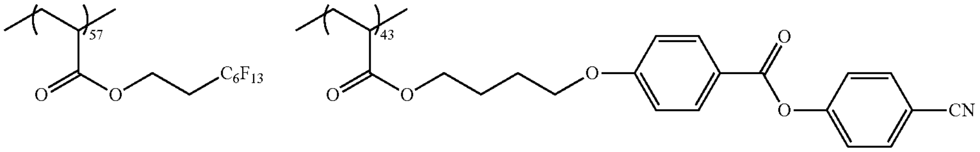
Surfactant F-1

<Production of First Optically Anisotropic Layer>

The above-described composition P1 for forming a light absorption anisotropic layer was applied onto the above-described photo-alignment film which had been subjected to the alignment treatment using a bar coater, thereby producing a coating layer P1. Next, the coating layer P1 was heated at 140° C. for 30 seconds and cooled to room temperature (23° C.). Next, the coating layer P1 was heated at 90° C. for 60 seconds and cooled to room temperature again. Thereafter, the coating layer P1 was irradiated with light of a light emitting diode (LED) lamp (central wavelength: 365 nm) under an irradiation condition of an illuminance of 200 $mW/cm^2$ for 2 seconds, thereby curing the coating layer P1 by photopolymerization to produce a light absorption anisotropic layer.

A film thickness of the obtained light absorption anisotropic layer was 1.6 μm.

This was used as a first optically anisotropic layer.

[Production of Second Optically Anisotropic Layer]

A retardation layer 1 having reverse dispersibility was produced with reference to the method described in paragraphs 0151 to 0163 of JP2020-084070A. Re of the retardation layer 1 was 146 nm and Rth thereof was 73 nm. In addition, the orientation of the optical axis of the retardation layer 1 was uniform.

The retardation layer 1 produced in this manner was used as a second optically anisotropic layer.

[Production of Optically Anisotropic Film]

The second optically anisotropic layer was bonded to the first optically anisotropic layer using a pressure-sensitive adhesive sheet "NCF-D692 (5)" manufactured by LINTEC Corporation, and then the support used in producing the retardation layer 1 was peeled off. In addition, at this time, the orientation of the optical axis of the first optically anisotropic layer and the orientation of the optical axis of the second optically anisotropic layer were set to have a relationship shown by the reference numeral 240*a* in FIG. 6.

In this manner, an optically anisotropic film used in Example B1 was obtained.

[Production of Reflective Circular Polarizer]

<Production of Coating Liquids R-1 and R-2 and D-1 and D-2 for Reflective Layer>

A composition shown below was stirred and dissolved in a container kept at 70° C. to prepare each of coating liquids R-1 and R-2 for a reflective layer. Here, R represents a coating liquid containing a rod-like liquid crystal.

| Coating liquid R-1 for reflective layer | |
|---|---|
| Methyl ethyl ketone | 120.9 parts by mass |
| Cyclohexanone | 21.3 parts by mass |
| Mixture of rod-like liquid crystals shown below | 100.0 parts by mass |
| Photopolymerization initiator b | 1.00 part by mass |
| Chiral agent A shown below | 3.00 parts by mass |
| Surfactant F2 shown below | 0.027 parts by mass |
| Surfactant F3 shown below | 0.067 parts by mass |

(Coating Liquid R-2 for Reflective Layer)

A coating liquid R-2 for a reflective layer was prepared in the same manner as in the coating liquid R-1 for a reflective layer, except that the amount of the chiral agent A added was changed as shown in the following table.

Table 4. Amount of chiral agent in coating liquid containing rod-like liquid crystal

TABLE 4

| Coating liquid name | Amount of chiral agent (part by mass) |
|---|---|
| Liquid R-1 | 3.00 |
| Liquid R-2 | 3.62 |

Mixture of Rod-Like Liquid Crystals

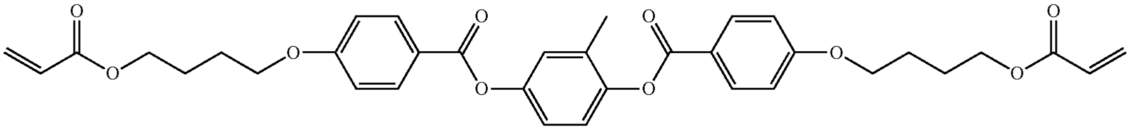

84%

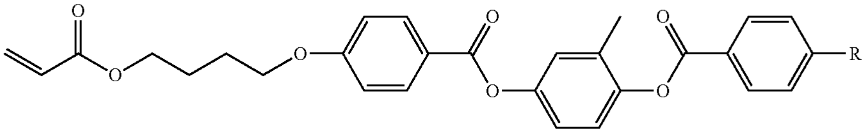

14%

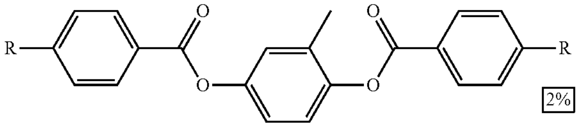

2%

R

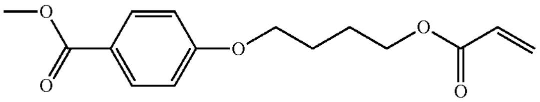

In the above-described mixture, each numerical value denotes the content in units of % by mass. In addition, R is a group bonded through an oxygen atom. Furthermore, an average molar absorption coefficient of the above-described rod-like liquid crystal at a wavelength of 300 to 400 nm was 140/mol·cm.

Chiral Agent A

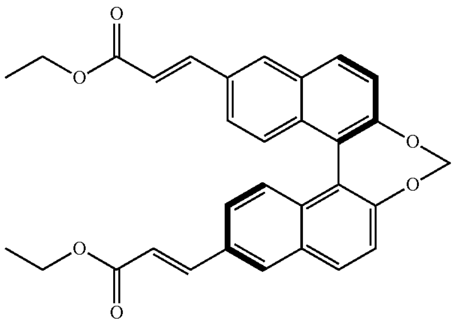

Surfactant F2

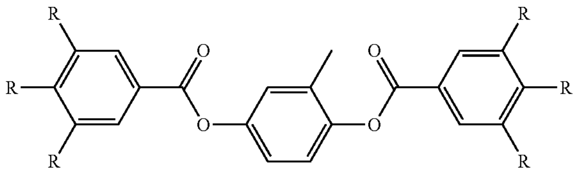

Surfactant F3

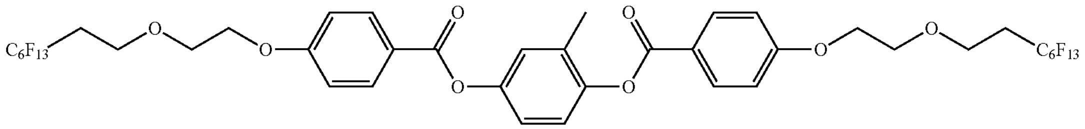

Photopolymerization initiator B

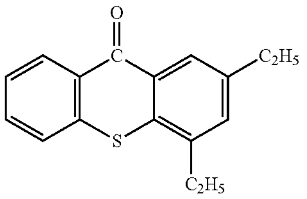

R =

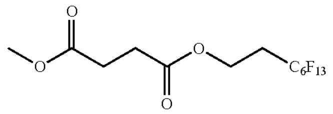

The chiral agent A is a chiral agent in which the helical twisting power (HTP) is reduced by light.

(Coating Liquid D-1 for Reflective Layer)

A composition shown below was stirred and dissolved in a container kept at 50° C. to prepare each of coating liquids D-1 and D-2 for a reflective layer. Here, D represents a coating liquid containing a disk-like liquid crystal.

| Coating liquid D-1 for reflective layer | |
|---|---|
| Disc-like liquid crystal (A) shown below | 80 parts by mass |
| Disc-like liquid crystal (B) shown below | 20 parts by mass |
| Polymerizable monomer EM1 | 10 parts by mass |
| Surfactant F4 | 0.3 parts by mass |
| Photopolymerization initiator (IRGACURE 907 manufactured by BASF SE) | 3 parts by mass |
| Chiral agent A | 4.00 parts by mass |
| Methyl ethyl ketone | 290 parts by mass |
| Cyclohexanone | 50 parts by mass |

(Coating Liquid D-2 for Reflective Layer)

A coating liquid D-2 for a reflective layer was prepared in the same manner as in the coating liquid D-1 for a reflective layer, except that the amount of the chiral agent A added was changed as shown in Table 5.

Table 5. Amount of Chiral Agent in Coating Liquid Containing Disk-Like Liquid Crystal

TABLE 5

| Coating liquid name | Amount of chiral agent (part by mass) |
|---|---|
| Liquid D-1 | 4.00 |
| Liquid D-2 | 5.30 |

Disk-like liquid crystal (A)

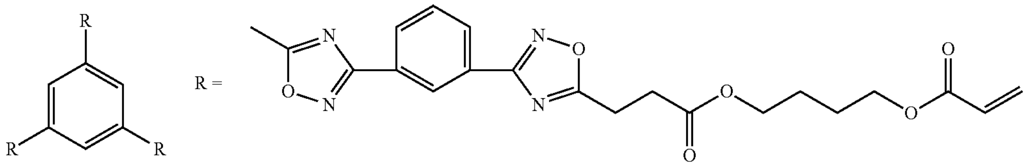

Disk-like liquid crystal (B)

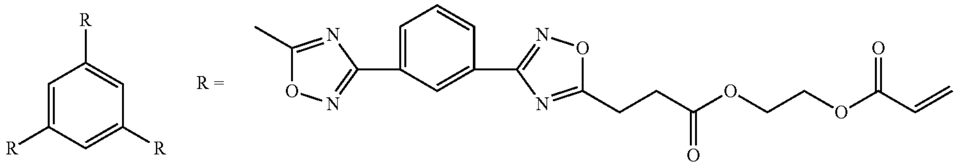

Polymerizable monomer EM1

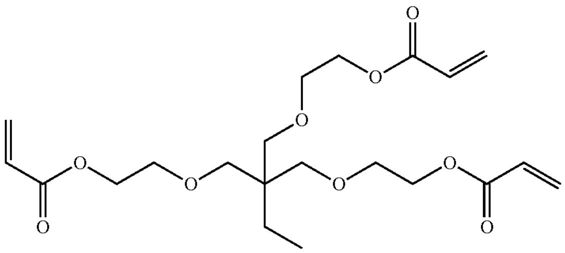

Surfactant F4

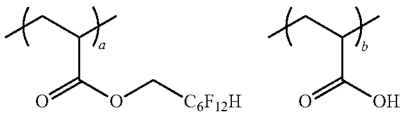

a/b = 98/2

[Production of Reflective Circular Polarizer 1]

A polyethylene terephthalate (PET) film (A4100 manufactured by Toyobo Co., Ltd.) having a thickness of 50 μm was prepared as a temporary support. The PET film had an easy adhesion layer on one surface.

A surface of the PET film, which was not provided with the easy adhesion layer, was subjected to a rubbing treatment, coated with the coating liquid R-1 for a reflective layer prepared above using a wire bar coater, and dried at 110° C. for 120 seconds. Thereafter, the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating liquid to form a red light reflecting layer consisting of a cholesteric liquid crystal layer. The irradiation with light was performed from the side of the cholesteric liquid crystal layer in all cases. Here, the coating thickness was adjusted so that the film thickness of the cured red light reflecting layer was 4.5 μm.

Next, the surface of the red light reflecting layer was subjected to a corona treatment at a discharge amount of 150 $W \cdot min/m^2$, and the surface subjected to the corona treatment was coated with the coating liquid D-1 for a reflective layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was kept at 45° C. and irradiated with ultraviolet rays (300 $mJ/cm^2$) using a metal halide lamp in a nitrogen atmosphere, thereby curing the coating film to form a yellow light reflecting layer on the red light reflecting layer. The irradiation with light was performed from the side of the cholesteric liquid crystal layer in all cases. Here, the coating thickness was adjusted so that the film thickness of the cured yellow light reflecting layer was 3.3 μm.

Next, the yellow light reflecting layer was coated with the coating liquid R-2 for a reflective layer using a wire bar coater and dried at 110° C. for 120 seconds. Thereafter, the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating liquid to form a green light reflecting layer on the yellow light reflecting layer. The irradiation with light was performed from the side of the cholesteric liquid crystal layer in all cases. Here, the coating thickness was adjusted so that the film thickness of the cured green light reflecting layer was 2.7 μm.

Next, the surface of the green light reflecting layer was subjected to a corona treatment at a discharge amount of 150 $W \cdot min/m^2$, and the surface subjected to the corona treatment was coated with the coating liquid D-2 for a reflective layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was kept at 45° C. and irradiated with ultraviolet rays (300 $mJ/cm^2$) using a metal halide lamp in a nitrogen atmosphere, thereby curing the coating film to form a blue light reflecting layer on the green light reflecting layer. The irradiation with light was performed from the side of the cholesteric liquid crystal layer in all cases. Here, the coating thickness was adjusted so that the film thickness of the cured blue light reflecting layer was 2.5 μm.

In this manner, a reflective circular polarizer 1 was produced.

[Production of Molded Body]

With reference to JP2012-116094A, the above-described optically anisotropic film was vacuum-molded along a concave surface of a plano-concave lens (made of optical glass) having a diameter of 50 mm and a curvature radius of 65 mm. At this time, the second optically anisotropic layer side was molded to be in contact with the plano-concave lens.

In this manner, a molded body 1 laminated on the plano-concave lens was produced.

Example B1

The molded body 1 produced as described above was used as a molded body of Example B1.

Comparative Example B1

A molded body 2 of Comparative Example B1 was produced in the same manner as in Example B1, except that the arrangement of the optical axes of the first optically anisotropic layer was changed to a uniform distribution.

<Evaluation of Optical Axis of Molded Body>

In the produced molded bodies 1 and 2, the orientation of the optical axis 1 of the first optically anisotropic layer and the orientation of the optical axis 2 of the second optically anisotropic layer were measured at 5 locations of the center part and 4 end parts at positions of 20 mm from the center, respectively before and after the molding, using AxoScan OPMF-1 (manufactured by Opto Science, Inc.), and a difference in angle therebetween was obtained. Next, the average value of the angles at the five positions described above and the variation (difference between the maximum angle and the minimum angle) were obtained.

The measurement after the molding was performed by superimposing a plano-convex lens (made of optical glass) having a diameter of 50 mm and a curvature radius of 65 mm such that a convex surface side was in contact with a concave surface of the molded body to cancel out the refractive effect of the concave surface of the molded body, thereby enabling the measurement of the optical axis. In a case of measuring an inclined part of the concave surface, the two lenses were tilted in a state in which the molded body and the plano-convex lens were stacked, and the measurement portion was adjusted to be horizontal.

The results are shown in Table 6.

[Production of Optical Lens]

With reference to JP2012-116094A, the above-described reflective circular polarizer 1 was vacuum-molded along a concave surface of a plano-concave lens (made of optical glass) having a diameter of 50 mm and a curvature radius of 65 mm, in which the blue light reflecting layer side was in contact with the plano-concave lens. Thereafter, the PET base material of the reflective circular polarizer 1 was peeled off from the lens to obtain a lens with a reflective circular polarizer.

Next, the molded body 1 of Example 1 was molded in a state of being superimposed on the reflective circular polarizer 1 by the same method as described above. In this manner, an optical lens 1 in which the reflective circular polarizer 1 and the molded body 1 were laminated was produced.

[Production of Virtual Reality Display Apparatus]

A virtual reality display apparatus "VIVE FLOW" manufactured by HTC Corporation was disassembled, and an optical lens was taken out. The "VIVE FLOW" is a virtual reality display apparatus in which a pancake lens is adopted, and a liquid crystal display device which emits circularly polarized light by a polarizing plate bonded to a surface is used as an image display device.

In addition, the taken optical lens was two types of lenses, one of which was a biconvex lens having a half-mirror coating on one surface and the other of which was a plano-convex lens having an optical laminate bonded to a plane.

The above-described plano-convex lens was removed, and the produced optical lens 1 was installed such that the plane side was on the side of the above-described biconvex lens. In this case, the optical lens 1 was installed while adjusting the distance from the biconvex lens, so that the virtual reality display image was displayed properly.

In this way, a virtual reality display apparatus 1 using the molded body 1 of Example B1 was produced.

In addition, a virtual reality display apparatus 2 was produced using the molded body 2 of Comparative Example B1 in the same manner, except that the molded body 1 was changed to the molded body 2.

<Evaluation of Light Leakage>

In the produced virtual reality display apparatuses 1 and 2, a black-and-white checker pattern was displayed on the image display device, and a degree of light leakage was evaluated by visual observation in the following three stages. In a case where there was the light leakage, double images were visually recognized, and a contrast of the corresponding portion was lowered.

A: double images were not visible at all.

B: double images were slightly visible but not noticeable.

C: clear double images were observed.

The results are shown in Table 6.

Table 6. Evaluation Results of Optical Axis of Molded Body and Light Leakage in Virtual Reality Display Apparatuses of Example and Comparative Example

TABLE 6

| | Difference in angle of optical axes before molding | | Difference in angle of optical axes after molding | | Light leakage |
|---|---|---|---|---|---|
| | Average | Variation | Average | Variation | |
| Example B1 | 45.0° | 5.8° | 45.0° | 0.6° | A |
| Comparative Example B1 | 45.0° | 0.3° | 44.6° | 6.3° | C |

As shown in Table 6, in the optically anisotropic film according to the second embodiment of the present invention, the distribution of the orientation of the optical axis of the first optically anisotropic layer was changed after being molded into a three-dimensional shape. In addition, in the molded body according to the second embodiment of the present invention, as a result of the change in distribution of the orientation of the optical axis of the first optically anisotropic layer due to the molding, the first optically anisotropic layer and the second optically anisotropic layer had optical axes at 45° in the entire region, and the variation was small. As a result, in the virtual reality display apparatus using the molded body according to the second embodiment of the present invention, the light leakage was effectively reduced as compared with Comparative Example, and the occurrence of double images and the decrease in contrast were suppressed.

The optically anisotropic film and molded body according to the second embodiment of the present invention have been described in detail above, but the second embodiment of the present invention is not limited to the above-described examples, and various improvements and changes may be made without departing from the spirit of the second embodiment of the present invention.

Example C

[Preparation of Coating Liquids R-1 to R-4 for Light Reflecting Layer]

A composition shown below was stirred and dissolved in a container kept at 70° C. to prepare each of coating liquids R-1 to R-4 for a light reflecting layer. Here, R represents a coating liquid containing a rod-like liquid crystal compound.

| Coating liquid R-1 for light reflecting layer | |
|---|---|
| Methyl ethyl ketone | 120.9 parts by mass |
| Cyclohexanone | 21.3 parts by mass |
| Mixture of rod-like liquid crystal compounds shown below | 100.0 parts by mass |

-continued

| Coating liquid R-1 for light reflecting layer | |
|---|---|
| Photopolymerization initiator b | 1.00 part by mass |
| Chiral agent A shown below | shown in Table 7 |
| Surfactant F1 shown below | 0.027 parts by mass |
| Surfactant F2 shown below | 0.067 parts by mass |

Table 7. Amount of Chiral Agent of Coating Liquid Containing Rod-Like Liquid Crystal Compound

TABLE 7

| Coating liquid name | Type of chiral agent | Amount of chiral agent (part by mass) |
|---|---|---|
| Liquid R-1 | Chiral agent A | 2.87 |
| Liquid R-2 | Chiral agent A | 3.15 |
| Liquid R-3 | Chiral agent A | 3.46 |
| Liquid R-4 | Chiral agent A | 4.20 |

Mixture of Rod-Like Liquid Crystal Compounds

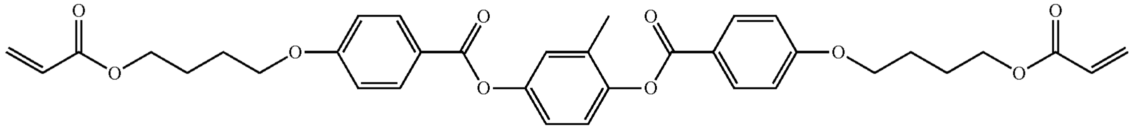

84%

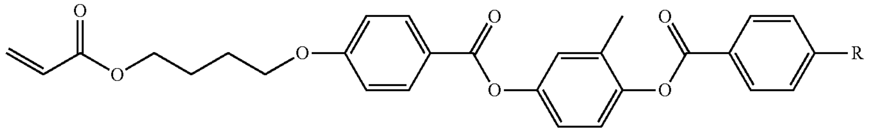

14%

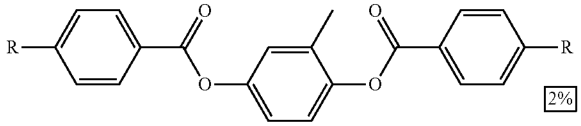

2%

R

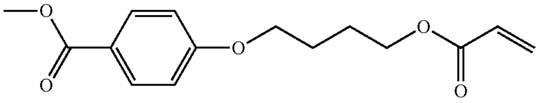

In the above-described mixture of rod-like liquid crystal compounds, each numerical value denotes the content in units of % by mass. In addition, R is a group bonded through an oxygen atom. Furthermore, an average molar absorption coefficient of the above-described rod-like liquid crystal compound at a wavelength of 300 to 400 nm was 140/mol·cm.

Chiral Agent A

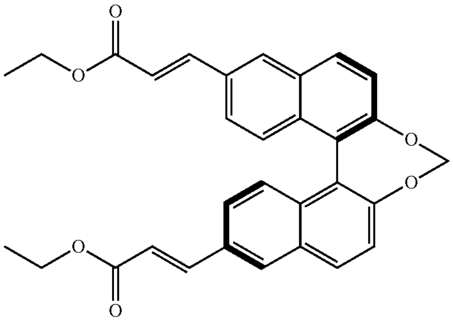

Surfactant F1

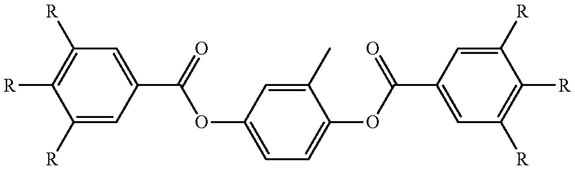

-continued

Surfactant F2

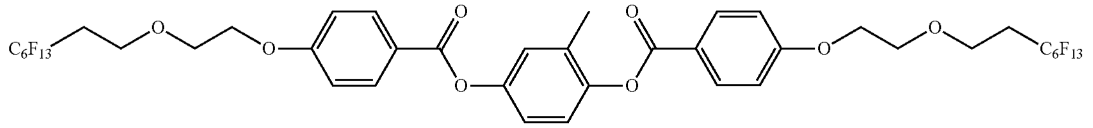

Photopolymerization initiator B

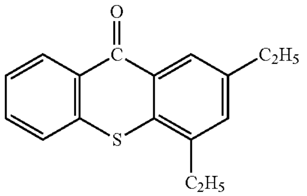

R =

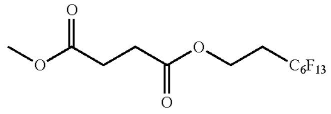

The chiral agent A is a chiral agent in which the helical twisting power (HTP) is reduced by light irradiation.

[Preparation of Coating Liquids D-1 to D-4 for Light Reflecting Layer]

A composition shown below was stirred and dissolved in a container kept at 50° C. to prepare each of coating liquids D-1 to D-4 for a light reflecting layer. Here, D represents a coating liquid containing a disk-like liquid crystal compound.

| Coating liquid D-1 for light reflecting layer | |
|---|---|
| Disk-like liquid crystal compound (A) shown below | 80 parts by mass |
| Disk-like liquid crystal compound (B) shown below | 20 parts by mass |
| Polymerizable monomer E1 | 10 parts by mass |
| Surfactant F4 | 0.3 parts by mass |
| Photopolymerization initiator (IRGACURE 907 manufactured by BASF SE) | 3 parts by mass |
| Chiral agent A | shown in Table 2 |
| Methyl ethyl ketone | 290 parts by mass |
| Cyclohexanone | 50 parts by mass |

Table 8. Amount of Chiral Agent of Coating Liquid Containing Disk-Like Liquid Crystal Compound

TABLE 8

| Coating liquid name | Type of chiral agent | Amount of chiral agent (part by mass) |
|---|---|---|
| Liquid D-1 | Chiral agent A | 3.49 |
| Liquid D-2 | Chiral agent A | 3.83 |
| Liquid D-3 | Chiral agent A | 4.20 |
| Liquid D-4 | Chiral agent A | 5.06 |

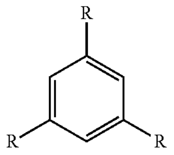

Disk-like liquid crystal compound (A)

-continued

R =

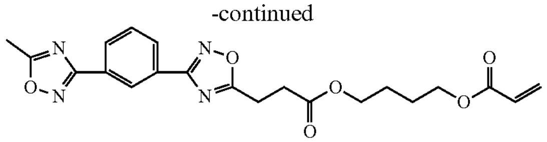

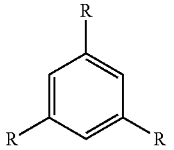

Disk-like liquid crystal compound (B)

R =

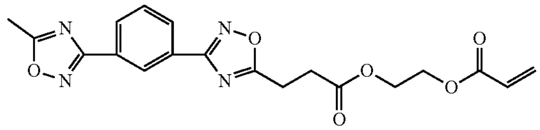

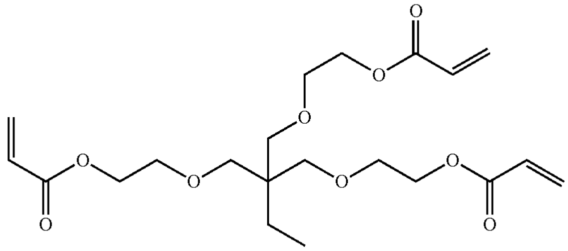

Polymerizable monomer E1

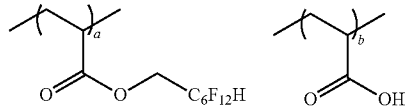

Surfactant F4 a/b = 98/2

[Production of Reflective Circular Polarizer 1]

A polyethylene terephthalate (PET) film (A4100 manufactured by Toyobo Co., Ltd.) having a thickness of 50 μm was prepared as a temporary support. The PET film had an easy adhesion layer on one surface.

A surface of the PET film, which was not provided with the easy adhesion layer, was subjected to a rubbing treatment, coated with the coating liquid R-1 for a light reflecting layer prepared above using a wire bar coater. Subsequently, the coating film was dried at 110° C. for 120 seconds, and heat-aged at 100° C. for 1 minute after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization.

Figure 12:
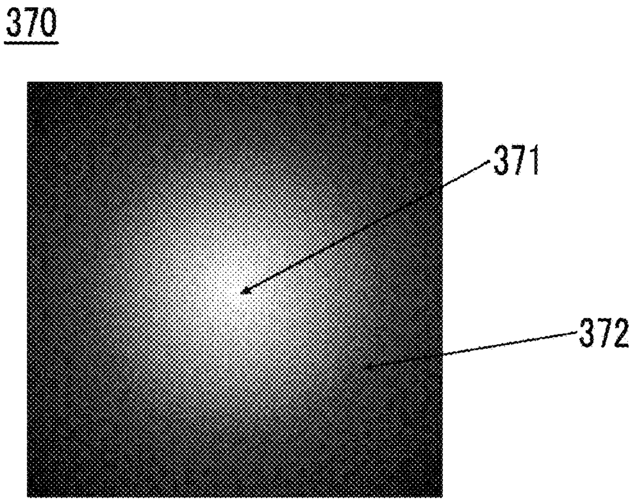
FIG. 12 is a schematic view showing an example of an exposure mask.

FIG. 12 shows a schematic view of the exposure mask used in this case. As shown in FIG. 12, an exposure mask 370 used for the photoisomerization was an exposure mask having a rotationally symmetric transmittance distribution, in which a transmittance was high in a center part 371 and was decreased toward an end part 372.

Thereafter, the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating film to form a red light reflecting layer formed by immobilizing a cholesteric liquid crystalline phase. The irradiation with light was performed from the coating film side (cholesteric liquid crystal layer side) in all cases. Here, the thickness of the coating film was adjusted so that the film thickness of the cured red light reflecting layer was 4.5 μm. A patterned cholesteric liquid crystal layer in which the helical pitch of the cholesteric liquid crystalline phase had an in-plane distribution was produced by the photoisomerization using the exposure mask, provided that a central wavelength of a reflection spectrum of the center part was 701 nm and a central wavelength of a reflection spectrum of the end part was 683 nm.

Next, the surface of the red light reflecting layer was subjected to a corona treatment at a discharge amount of 150 $W\cdot min/m^2$, and the surface subjected to the corona treatment was coated with the coating liquid D-2 for a light reflecting layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization.

The exposure mask used in this case was the same as the exposure mask used for the first red light reflecting layer. Thereafter, the coating film was heat-aged again at 115° C. for 3 minutes to be a uniform alignment state, and then the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating film to form, on the red light reflecting layer, a yellow light reflecting layer formed by immobilizing a cholesteric liquid crystalline phase. The irradiation with light was performed from the coating film side (cholesteric liquid crystal layer side) in all cases. Here, the thickness of the coating film was adjusted so that the film thickness of the cured yellow light reflecting layer was 3.3 μm.

Next, the yellow light reflecting layer was coated with the coating liquid R-3 for a light reflecting layer using a wire bar coater. Subsequently, the coating film was dried at 110° C. for 120 seconds, and heat-aged at 100° C. for 1 minute after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization.

The exposure mask used in this case was the same as the exposure mask used for the first red light reflecting layer. Thereafter, the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating film to form, on the yellow light reflecting layer, a green light reflecting layer formed by immobilizing a cholesteric liquid crystalline phase. The irradiation with light was performed from the coating film side (cholesteric liquid crystal layer side) in all cases. Here, the thickness of the coating film was adjusted so that the film thickness of the cured green light reflecting layer was 2.7 μm.

Next, the surface of the green light reflecting layer was subjected to a corona treatment at a discharge amount of 150 $W\cdot min/m^2$, and the surface subjected to the corona treatment was coated with the coating liquid D-4 for a light reflecting layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization.

The exposure mask used in this case was the same as the exposure mask used for the first red light reflecting layer. Thereafter, the coating film was heat-aged again at 115° C. for 3 minutes to be a uniform alignment state, and then the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating film to form, on the green light reflecting layer, a blue light reflecting layer formed by immobilizing a cholesteric liquid crystalline phase. The irradiation with light was performed from the coating film side (cholesteric liquid crystal layer side) in all cases. Here, the thickness of the coating film was adjusted so that the film thickness of the cured blue light reflecting layer was 2.5 μm.

As a result, a reflective circular polarizer 1 including, in the following order, a temporary support, a red light reflecting layer (first light reflecting layer) formed by immobilizing a cholesteric liquid crystalline phase containing a rod-like liquid crystal compound, a yellow light reflecting layer (second light reflecting layer) formed by immobilizing a cholesteric liquid crystalline phase containing a disk-like liquid crystal compound, a green light reflecting layer (third light reflecting layer) formed by immobilizing a cholesteric liquid crystalline phase containing a rod-like liquid crystal compound, and a blue light reflecting layer (fourth light reflecting layer) formed by immobilizing a cholesteric liquid crystalline phase containing a disk-like liquid crystal compound was produced. All the light reflecting layers in the reflective circular polarizer 1 were a patterned cholesteric liquid crystal layer in which the central wavelength of the reflection spectrum of the center part was different from the central wavelength of the reflection spectrum of the end part and the helical pitch of the cholesteric liquid crystalline phase had an in-plane distribution.

The coating liquid for a light reflecting layer and the film thickness used in producing the reflective circular polarizer 1 are shown in Table 9.

TABLE 9

| | Type of coating liquid | Amount of chiral agent (part by mass) | Reflection central wavelength (nm) | Film thickness (μm) |
|---|---|---|---|---|
| Fourth layer | Liquid D-4 | 4.20 | 480 | 2.5 |
| Third layer | Liquid R-3 | 3.46 | 573 | 2.7 |
| Second layer | Liquid D-2 | 3.15 | 625 | 3.3 |
| First layer | Liquid R1 | 2.87 | 683 | 4.5 |

[Production of Reflective Circular Polarizer 2]

A reflective circular polarizer 2 was produced by the same production method as that for the reflective circular polarizer 1, except that the number of light reflecting layers was increased to 8, and the coating liquid for a light reflecting layer and the film thickness were changed as described in Table 10.

TABLE 10

| | Type of coating liquid | Amount of chiral agent (part by mass) | Reflection central wavelength (nm) | Film thickness (μm) |
|---|---|---|---|---|
| Eighth layer | Liquid D-4 | 5.06 | 480 | 1.3 |
| Seventh layer | Liquid R-4 | 4.20 | 480 | 1.6 |
| Sixth layer | Liquid D-3 | 4.20 | 573 | 1.5 |
| Fifth layer | Liquid R-3 | 3.46 | 573 | 0.9 |
| Fourth layer | Liquid D-2 | 3.83 | 625 | 1.9 |
| Third layer | Liquid R-2 | 3.15 | 625 | 1.0 |
| Second layer | Liquid D-1 | 3.49 | 683 | 2.3 |
| First layer | Liquid R-1 | 2.87 | 683 | 1.5 |

[Production of Reflective Circular Polarizer 3]

A reflective circular polarizer 3 was produced according to the production process of the reflective circular polarizer 1 described above, except that, in the process of producing the reflective circular polarizer 1, each of the light reflecting layers was formed without performing the exposure for isomerization using the exposure mask with respect to the coating film of each coating liquid for a light reflecting layer.

[Production of Reflective Circular Polarizer 4]

A reflective circular polarizer 4 was produced according to the production process of the reflective circular polarizer 2 described above, except that, in the process of producing the reflective circular polarizer 2, each of the light reflecting layers was formed without performing the exposure for isomerization using the exposure mask with respect to the coating film of each coating liquid for a light reflecting layer.

[Production of Laminated Optical Body]

[Production of Positive C-Plate 1]

A positive C-plate 1 was produced by adjusting the film thickness with reference to the method described in paragraphs 0132 to 0134 of JP2016-053709A. Re of the positive C-plate 1 was 0.2 nm and Rth thereof was-310 nm.

[Production of Retardation Layer 1]

A retardation layer 1 having reverse dispersibility was produced with reference to the method described in paragraphs 0151 to 0163 of JP2020-084070A. Re of the retardation layer 1 was 146 nm and Rth thereof was 73 nm.

[Production of Positive C-Plate 2]

A positive C-plate 2 was produced in the same manner as in the positive C-plate 1, except that the film thickness was adjusted. Re of the positive C-plate 2 was 0.1 nm and Rth thereof was-70 nm.

[Production of Absorption Type Linear Polarizer]

<Production of Cellulose Acylate Film 1>

(Production of Core Layer Cellulose Acylate Dope)

The following composition was put into a mixing tank and stirred to dissolve each component, thereby preparing a cellulose acetate solution used as a core layer cellulose acylate dope.

| Core layer cellulose acylate dope | |
|---|---|
| Cellulose acetate having acetyl substitution degree of 2.88 | 100 parts by mass |
| Polyester compound B described in Examples of JP2015-227955A | 12 parts by mass |
| Compound F shown below | 2 parts by mass |
| Methylene chloride (first solvent) | 430 parts by mass |
| Methanol (second solvent) | 64 parts by mass |

Compound F

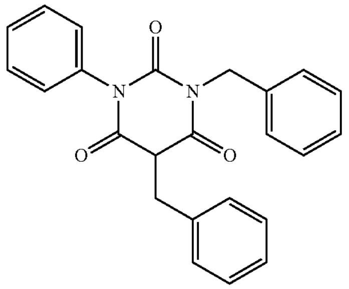

(Production of Outer Layer Cellulose Acylate Dope)

10 parts by mass of the following matte agent solution was added to 90 parts by mass of the core layer cellulose acylate dope to prepare a cellulose acetate solution to be used as an outer layer cellulose acylate dope.

| Matting agent solution | |
|---|---|
| Silica particles with average particle size of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope described above | 1 part by mass |

(Production of Cellulose Acylate Film 1)

The above-described core layer cellulose acylate dope and the above-described outer layer cellulose acylate dope were filtered through a filter paper having an average hole diameter of 34 μm and a sintered metal filter having an average hole diameter of 10 μm. Thereafter, the core layer cellulose acylate dope and the outer layer cellulose acylate dopes on both sides thereof were cast simultaneously on a drum at 20° C. from a casting port in three layers (band casting machine).

Next, the film was peeled off in a state in which the solvent content was approximately 20% by mass, both ends of the film in the width direction were fixed by tenter clips, and the film was dried while being stretched at a stretching ratio of 1.1 times in the lateral direction.

Thereafter, the film was further dried by being transported between the rolls of the heat treatment device to prepare an optical film having a thickness of 40 μm, and the optical film was used as a cellulose acylate film 1. The in-plane retardation of the obtained cellulose acylate film 1 was 0 nm.

<Formation of Photoalignment Layer PA1>

The cellulose acylate film 1 was continuously coated with a coating liquid S-PA-1 for forming a photoalignment layer described below with a wire bar. The support on which the coating film was formed was dried with hot air at 140° C. for 120 seconds, and the coating film was irradiated with polarized ultraviolet rays (10 mJ/$cm^2$, using an ultra-high pressure mercury lamp) to form a photoalignment layer PA1. A film thickness of the photoalignment layer PA1 was 0.3 μm.

| Coating liquid S-PA-1 for forming photoalignment layer | |
|---|---|
| Polymer M-PA-1 shown below | 100.00 parts by mass |
| Acid generator PAG-1 shown below | 5.00 parts by mass |
| Acid generator CPI-110TF shown below | 0.005 parts by mass |
| Xylene | 1220.00 parts by mass |
| Methyl isobutyl ketone | 122.00 parts by mass |

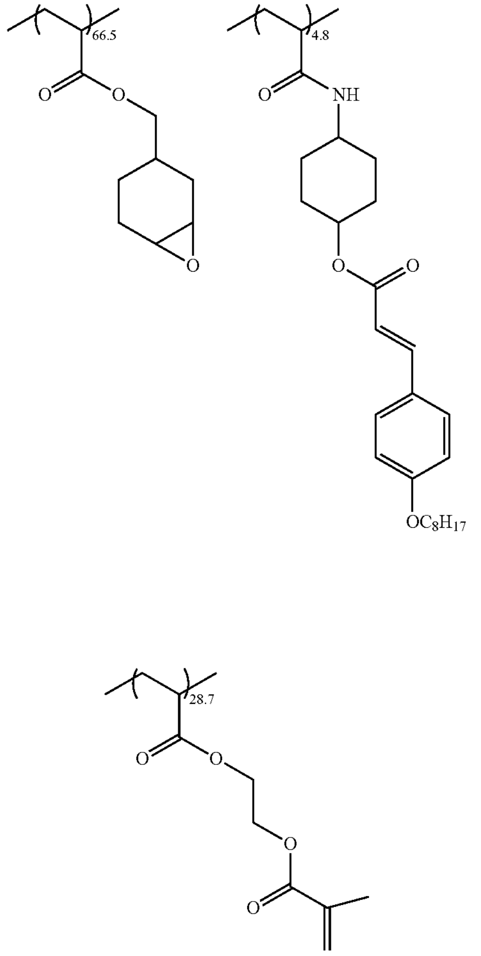

Polymer M-PA-1

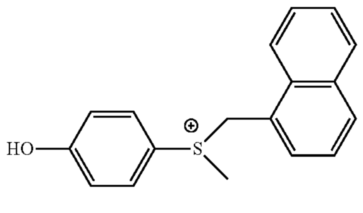

-continued

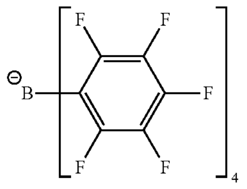

Acid generator PAG-1

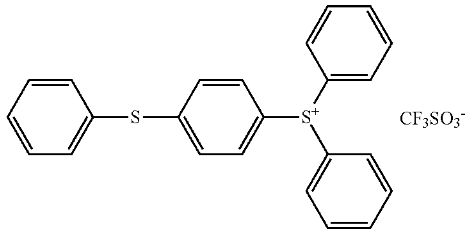

Acid generator CPI-110F

<Formation of Light Absorption Anisotropic Layer P1>

The obtained photoalignment layer PA1 was continuously coated with the following coating liquid S—P-1 for forming a light absorption anisotropic layer with a wire bar. Next, the formed coating layer P1 was heated at 140° C. for 30 seconds and cooled to room temperature (23° C.). Next, the coating layer P1 was heated at 90° C. for 60 seconds and cooled to room temperature again. Thereafter, the coating layer P1 was irradiated with an LED lamp (central wavelength of 365 nm) for 2 seconds under an irradiation condition of an illuminance of 200 mW/$cm^2$, thereby forming a light absorption anisotropic layer P1 on the photoalignment layer PA1. A film thickness thereof was 1.6 μm.

In this manner, a laminate including the cellulose acylate film 1 (temporary support), the photoalignment layer PA1, and the light absorption anisotropic film P1 in this order was obtained.

| Composition of coating liquid S-P-1 for forming light absorption anisotropic layer | |
|---|---|
| Dichroic substance D-1 shown below | 0.25 parts by mass |
| Dichroic substance D-2 shown below | 0.36 parts by mass |
| Dichroic substance D-3 shown below | 0.59 parts by mass |
| Polymer liquid crystal compound M-P-1 shown below | 2.21 parts by mass |
| Low-molecular-weight liquid crystal compound M-1 | 1.36 parts by mass |
| Polymerization initiator IRGACURE OXE-02 (manufactured by BASF SE) | 0.200 parts by mass |
| Surfactant F-1 shown below | 0.026 parts by mass |
| Cyclopentanone | 46.00 parts by mass |
| Tetrahydrofuran | 46.00 parts by mass |
| Benzyl alcohol | 3.00 parts by mass |

Dichroic substance D-1
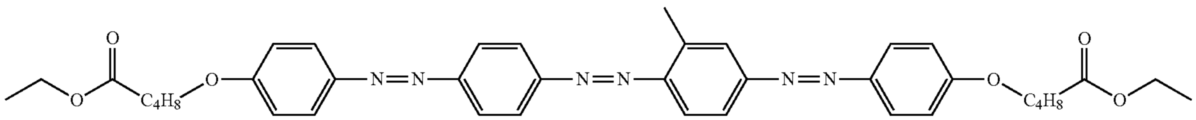
Dichroic substance D-2
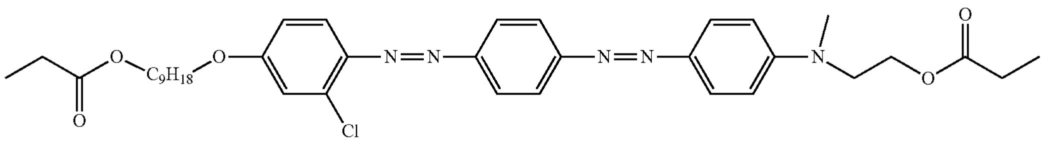
Dichroic substance D-3
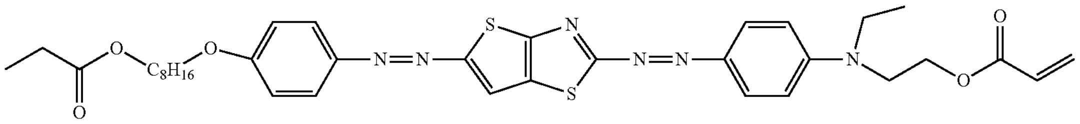
Polymer liquid crystal compound M-P-1
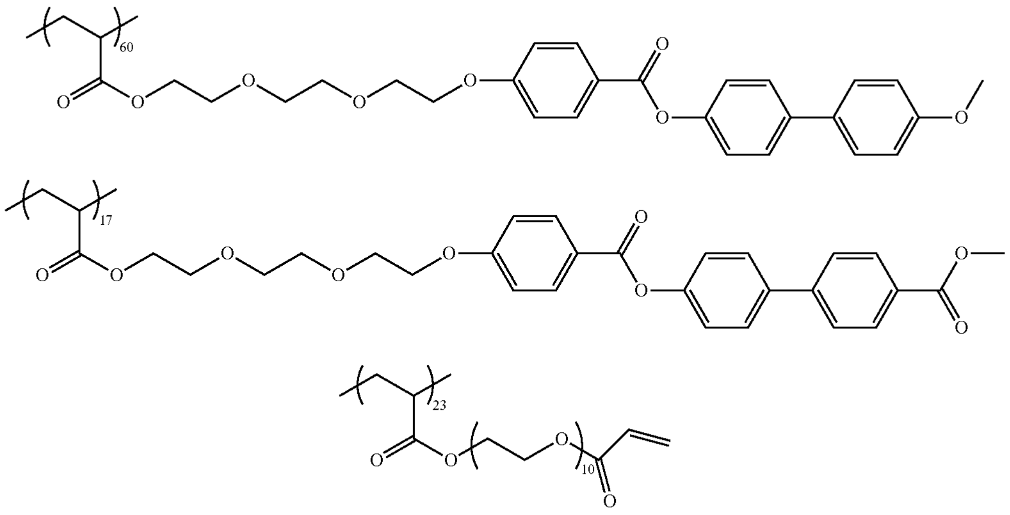
Low-molecular-weight liquid crystal compound M-1
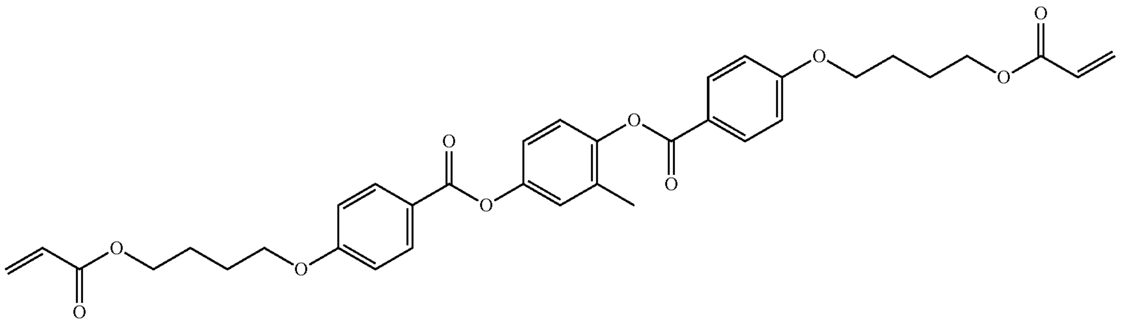
Surfactant F-1
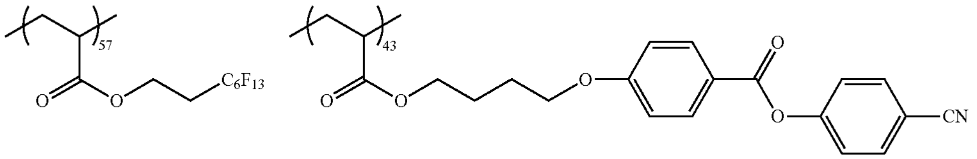

[Production of Laminated Optical Body 1]

The obtained reflective circular polarizer 1 was transferred to a surface of the obtained positive C-plate 1 on the support side. At this time, the layer (fourth light reflecting layer) of the reflective circular polarizer 1 on a side opposite to the temporary support was transferred to the positive C-plate 1 side. The temporary support of the reflective circular polarizer 1 was peeled off and removed after the transfer. The transfer of the reflective circular polarizer 1 was carried out by the following procedure.

(1) A UV adhesive Chemi-seal U2084B (manufactured by ChemiTech Inc., refractive index n after curing: 1.60) was applied onto a surface of the positive C-plate on the support side using a wire bar coater such that the thickness of the coating film was set to 2 μm; and the reflective circular polarizer 1 was bonded on the coating film using a laminator so that the surface of the reflective circular polarizer 1 on a side opposite to the temporary support (surface on the fourth light reflecting layer side) was in contact with the UV adhesive.

(2) After nitrogen purging until the oxygen concentration reached 100 ppm or less in a purge box including the laminate, the UV adhesive was cured by being irradiated with ultraviolet rays using a high pressure mercury lamp from the temporary support side of the reflective circular polarizer 1; the illuminance was 25 $mW/cm^2$ and the irradiation amount was 1,000 $mJ/cm^2$.

(3) Finally, the temporary support of the reflective circular polarizer 1 was peeled off.

Next, the positive C-plate 2 was bonded to the reflective circular polarizer 1 on the first light reflecting layer side. Next, the retardation layer 1 was bonded to the positive C-plate 2.

Finally, the light absorption anisotropic layer P1 was transferred to the retardation layer 1 by the same transfer procedure as described above. Here, the retardation layer 1 and the light absorption anisotropic layer P1 were laminated such that the slow axis of the retardation layer 1 and the absorption axis of the light absorption anisotropic layer P1 formed an angle of 45° and the polarization axis of light emitted from the retardation layer 1 and the transmission axis of the light absorption anisotropic layer P1 were parallel to each other. Finally, the support of the positive C-plate 1 was peeled off.

In this manner, a laminated optical body 1 of Example C1, which included the positive C-plate 1, the reflective circular polarizer 1, the positive C-plate 2, the retardation layer 1, and the light absorption anisotropic layer P1 (absorption type linear polarizer) in this order, was obtained.

[Production of Laminated Optical Bodies 2 to 4]

Laminated optical bodies 2 to 4, each including the positive C-plate 1, the reflective circular polarizer, the positive C-plate 2, the retardation layer 1, and the light absorption anisotropic layer P1 (absorption type linear polarizer) in this order, were produced by the same production process as the laminated optical body 1, except that the reflective circular polarizer 1 was replaced with the reflective circular polarizers 2 to 4.

[Production of Laminated Optical Bodies 5 and 6]

A laminated optical body 5 was produced by the same production process as in the laminated optical body 1, except that, in the production process of the laminated optical body 1, the reflective circular polarizer 1 was replaced with the reflective circular polarizer 2, and a commercially available cellulose acetate film (abbreviated as TAC; for example, "TD80U" manufactured by FUJIFILM Corporation) was bonded to the surface of the reflective circular polarizer 2 side. The produced laminated optical body 5 included the TAC film, the positive C-plate 1, the reflective circular polarizer 2, the positive C-plate 2, the retardation layer 1, and the light absorption anisotropic layer P1 (absorption type linear polarizer) in this order.

In addition, a laminated optical body 6 was produced by the same production process as in the laminated optical body 1, except that, in the production process of the laminated optical body 1, the reflective circular polarizer 1 was replaced with the reflective circular polarizer 2, and a commercially available polymethyl methyl methacrylate (PMMA) film was bonded to the surface of the reflective circular polarizer 2 side. The produced laminated optical body 6 included the PMMA film, the positive C-plate 1, the reflective circular polarizer 2, the positive C-plate 2, the retardation layer 1, and the light absorption anisotropic layer P1 (absorption type linear polarizer) in this order.

[Production of Composite Lens 1]

A convex meniscus lens LE1076-A (diameter: 2 inches, focal length: 100 mm) manufactured by Thorlabs, Inc. was prepared, and a convex surface side of the lens was subjected to aluminum vapor deposition so that the reflectivity was 40%, thereby obtaining a half mirror. Next, the laminated optical body 1 was laminated on a concave surface side of the lens. The molding and lamination of the laminated optical body 1 along the concave surface of the lens were performed by a vacuum molding method described in JP2012-116094A after attaching a pressure-sensitive adhesive sheet "NCF-D692 (5)" manufactured by LINTEC Corporation to the surface of the laminated optical body 1 on the positive C-plate 1 side, and then peeling off the separator film of the pressure-sensitive adhesive sheet. A molding temperature was set to 100° C. In this way, a composite lens 1 including the laminated optical body 1, the convex meniscus lens, and the half mirror in this order was produced.

As a result of measuring reflection spectra of the center part and end part of the composite lens 1 using a spectrophotometer (manufactured by JASCO Corporation, V-550) to which a large integrating sphere device (manufactured by JASCO Corporation, ILV-471) was attached, the deviation of the band of the reflection spectra of the center part and the end part was 0.8%.

[Production of Composite Lenses 2 to 6]

Composite lenses 2 to 6 were produced in the same production process as the composite lens 1, except that the laminated optical body 1 was replaced with the laminated optical bodies 2 to 6, respectively.

Table 11 shows the measurement results of the deviation of the reflection spectra of the center part and the end part and the measurement results of the difference in tint (color difference) of the main image in the visual field at the center part and the end part, for each of the produced composite lenses 1 to 6.

For the composite lenses 3 and 4 in which the reflective circular polarizers 3 and 4 that had not been subjected to the photoisomerization were used, the deviation between the band of the reflection spectrum of the center part and the band of the reflection spectrum of the end part was 2.8%. In addition, the composite lenses 3 and 4 had larger values of color difference than the composite lenses 1, 2, 5, and 6.

Table 11. Deviation of Reflection Spectra and Color Difference Between Center Part and End Part of Composite Lens

TABLE 11

| | Variation of spectra of center part and end part | Tint of main image | | |
|---|---|---|---|---|
| | | Center part of visual field (x, y) | End part of visual field (x, y) | Color difference (Δxy) |
| Composite lens 1 | 0.8% | 0.299, 0.320 | 0.297, 0.311 | 0.009 |
| Composite lens 2 | 0.8% | 0.299, 0.320 | 0.297, 0.311 | 0.009 |
| Composite lens 3 | 2.8% | 0.307, 0.347 | 0.297, 0.311 | 0.037 |
| Composite lens 4 | 2.8% | 0.307, 0.347 | 0.297, 0.311 | 0.037 |
| Composite lens 5 | 0.8% | 0.299, 0.320 | 0.297, 0.311 | 0.009 |
| Composite lens 6 | 0.8% | 0.299, 0.320 | 0.297, 0.311 | 0.009 |

Example C1

A virtual reality display apparatus "Huawei VR Glass" (manufactured by Huawei Technologies Co., Ltd.), which was a virtual reality display apparatus for which a reciprocating optical system was employed, was disassembled, and a composite lens on the most viewing side was taken out. The composite lens 1 to which the laminated optical body 1 was bonded was incorporated into the body in place of the taken composite lens, thereby producing a virtual reality display apparatus of Example 1. In the produced virtual reality display apparatus, a black-and-white checkered pattern was displayed on an image display panel, and ghost visibility of the virtual reality display apparatus was visually evaluated according to the following four-stage evaluation standard.

<Evaluation Standard for Ghost Visibility>

A: slight ghost was visible but was not noticeable.

B: weak ghost was visible.

C: slightly strong ghost was visible.

D: strong ghost was visible.

Furthermore, virtual reality display apparatuses of Examples C2 to C4 and Comparative Examples C1 and C2 were produced by the same procedure as in Example C1, and the ghost visibility thereof was evaluated. Table 12 shows the types of reflective circular polarizers used in each of Examples and Comparative Examples. In addition, the evaluation results of the ghost visibility in each of Examples and Comparative Examples are shown in Table 7 together with the evaluation results of the composite lens described above.

As a result, in the virtual reality display apparatuses of Examples C1 to C4, the change in color of the white portion of the black-and-white checker pattern was not noticeable over the entire visual field region. The ghost was not visible most in Example C4, and the ghost was not visible in Example C2. On the other hand, in the virtual reality display apparatus of Comparative Example C1, the change in color of the white portion of the black-and-white checker pattern was visually recognized in the center part and the end part of the visual field. In addition, at the end part of the visual field, a part of the light of the white display region was clearly visually recognized as a strong ghost in the black display region of the checker pattern.

Table 12. Type of Reflective Circular Polarizer and Type of Support Used in Examples and Comparative Examples

TABLE 12

| | Reflective circular polarizer | | | |
|---|---|---|---|---|
| | Level | Number of layers | Exposure for isomer-ization | Support (during molding) |
| Example C1 | Reflective circular polarizer 1 | 4 | Y | None |
| Example C2 | Reflective circular polarizer 2 | 8 | Y | None |
| Comparative Example C1 | Reflective circular polarizer 3 | 4 | N | None |
| Comparative Example C2 | Reflective circular polarizer 4 | 8 | N | None |
| Example C3 | Reflective circular polarizer 2 | 8 | Y | TAC |
| Example C4 | Reflective circular polarizer 2 | 8 | Y | PMMA |

Table 13. Evaluation Results of Examples and Comparative Examples

TABLE 13

| | Variation of spectra of center part and end part | Tint of main image | | | Ghost visibility | |
|---|---|---|---|---|---|---|
| | | Center part of visual field (x, y) | End part of visual field (x, y) | Color difference (Δxy) | Center part of visual field | End part of visual field |
| Example C1 | 0.8% | 0.299, 0.320 | 0.297, 0.311 | 0.009 | B | C |
| Example C2 | 0.8% | 0.299, 0.320 | 0.297, 0.311 | 0.009 | A | B |
| Comparative Example C1 | 2.8% | 0.307, 0.347 | 0.297, 0.311 | 0.037 | B | D |
| Comparative Example C2 | 2.8% | 0.307, 0.347 | 0.297, 0.311 | 0.037 | A | D |
| Example C3 | 0.8% | 0.299, 0.320 | 0.297, 0.311 | 0.009 | A | C |
| Example C4 | 0.8% | 0.299, 0.320 | 0.297, 0.311 | 0.009 | A | A |

Example D

[Production of Polystyrene Film]

0.3% by mass of a hindered phenol-based stabilizer "Irganox 1010" (manufactured by Chiba Specialty Chemicals Corporation) and 0.7% by mass of an ultraviolet absorber 2,2'-(p-phenylene) di-3,1-benzoxazin-4-one (manufactured by FUJIFILM Fine Chemicals Co., Ltd., product name UVSORB 101) were mixed with a commercially available atactic polystyrene resin HF77 (manufactured by PS Japan Corporation), and the mixture was melt-extruded at 300° C. using a 30 mmΦ single-axis extruder, and then closely attached to a cooling roll at 50° C. by an electrostatic pinning method to obtain a non-stretched film having a thickness of 40 μm. At this time, a screen filter, a gear pump, and a leaf disk filter were arranged between the extruder and a die in this order, in which these were connected by a melting pipe, and the mixture was extruded from a die having a width of 450 mm and a lip gap of 1 mm.

In this manner, a polystyrene film 1 was produced.

[Production of Absorption Type Polarizer]

[Production of Cellulose Acylate Film 1]

(Production of Core Layer Cellulose Acylate Dope)

The following composition was put into a mixing tank and stirred to dissolve each component, thereby preparing a cellulose acetate solution used as a core layer cellulose acylate dope.

| Core layer cellulose acylate dope | |
|---|---|
| Cellulose acetate having acetyl substitution degree of 2.88 | 100 parts by mass |
| Polyester compound B described in Examples of JP2015-227955A | 12 parts by mass |
| Compound F shown below | 2 parts by mass |
| Methylene chloride (first solvent) | 430 parts by mass |
| Methanol (second solvent) | 64 parts by mass |

Compound F

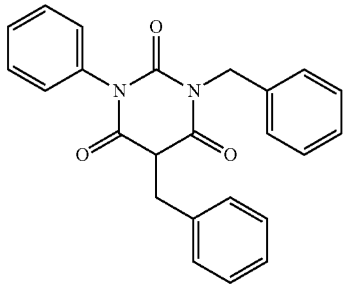

(Production of Outer Layer Cellulose Acylate Dope)

10 parts by mass of the following matte agent solution was added to 90 parts by mass of the core layer cellulose acylate dope to prepare a cellulose acetate solution to be used as an outer layer cellulose acylate dope.

| Matting agent solution | |
|---|---|
| Silica particles with average particle size of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope described above | 1 part by mass |

(Production of Cellulose Acylate Film 1)

The core layer cellulose acylate dope and the outer layer cellulose acylate dope were filtered through filter paper having an average hole diameter of 34 μm and a sintered metal filter having an average pore size of 10 μm, and three layers which were the core layer cellulose acylate dope and the outer layer cellulose acylate dopes provided on both sides of the core layer cellulose acylate dope were simultaneously cast from a casting port onto a drum at 20° C. (band casting machine).

Next, the film was peeled off in a state where the solvent content was approximately 20% by mass, both ends of the film in the width direction were fixed by tenter clips, and the film was dried while being stretched at a stretching ratio of 1.1 times in the lateral direction.

Thereafter, the film was further dried by being transported between the rolls of the heat treatment device to prepare an optical film having a thickness of 40 μm, and the optical film was used as a cellulose acylate film 1. The in-plane retardation of the obtained cellulose acylate film 1 was 0 nm.

<Formation of Photoalignment Layer PA1>

The cellulose acylate film 1 was continuously coated with a coating liquid S-PA-1 for forming an alignment layer described below with a wire bar. The support on which the coating film was formed was dried with hot air at 140° C. for 120 seconds, and the coating film was irradiated with polarized ultraviolet rays (10 $mJ/cm^2$, using an ultra-high pressure mercury lamp) to form a photoalignment layer PA1. A film thickness thereof was 0.3 μm.

| (Coating liquid S-PA-1 for forming alignment layer) | |
|---|---|
| Polymer M-PA-1 shown below | 100.00 parts by mass |
| Acid generator PAG-1 shown below | 5.00 parts by mass |
| Acid generator CPI-110TF shown below | 0.005 parts by mass |
| Xylene | 1220.00 parts by mass |
| Methyl isobutyl ketone | 122.00 parts by mass |

Polymer M-PA-1

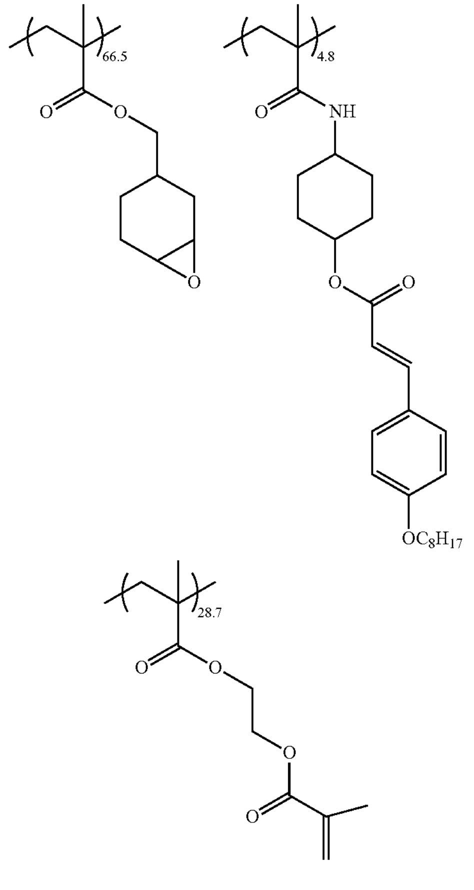

-continued

Acid generator PAG-1

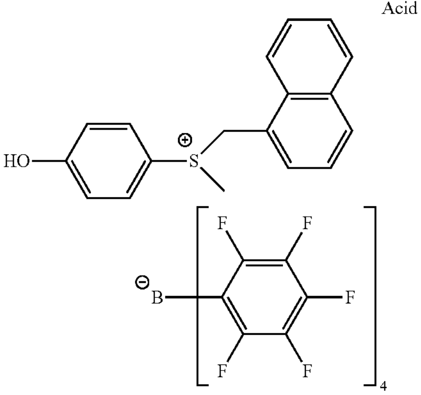

Acid generator CPI-100TF

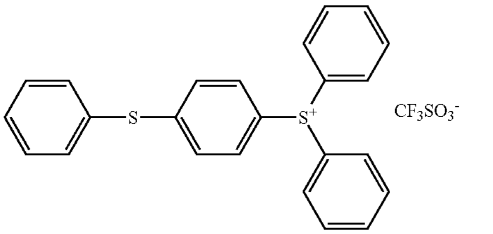

<Formation of Light Absorption Anisotropic Layer P1>

The obtained photoalignment layer PA1 was continuously coated with the following coating liquid S—P-1 for forming a light absorption anisotropic layer with a wire bar. Next, the coating layer P1 was heated at 140° C. for 30 seconds and cooled to room temperature (23° C.). Next, the coating layer P1 was heated at 90° C. for 60 seconds and cooled to room temperature again. Thereafter, the coating layer P1 was irradiated with an LED lamp (central wavelength of 365 nm) for 2 seconds under an irradiation condition of an illuminance of 200 mW/cm$^2$, thereby forming a light absorption anisotropic layer P1 on the photoalignment layer PA1. A film thickness thereof was 1.6 μm.

In this manner, an absorption type polarizer 1 was produced.

| Composition of coating liquid S-P-1 for forming light absorption anisotropic layer | |
|---|---|
| Dichroic substance D-1 shown below | 0.25 parts by mass |
| Dichroic substance D-2 shown below | 0.36 parts by mass |
| Dichroic substance D-3 shown below | 0.59 parts by mass |
| Polymer liquid crystal compound M-P-1 shown below | 2.21 parts by mass |
| Low-molecular-weight liquid crystal compound M-1 | 1.36 parts by mass |
| Polymerization initiator IRGACURE OXE-02 (manufactured by BASF SE) | 0.200 parts by mass |
| Surfactant F-1 shown below | 0.026 parts by mass |
| Cyclopentanone | 46.00 parts by mass |
| Tetrahydrofuran | 46.00 parts by mass |
| Benzyl alcohol | 3.00 parts by mass |

Dichroic substance D-1

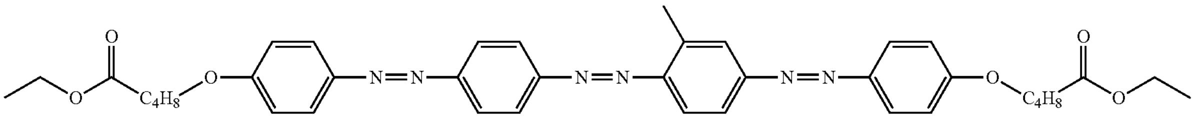

Dichroic substance D-2

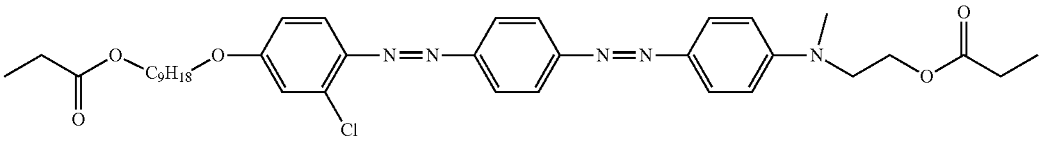

Dichroic substance D-3

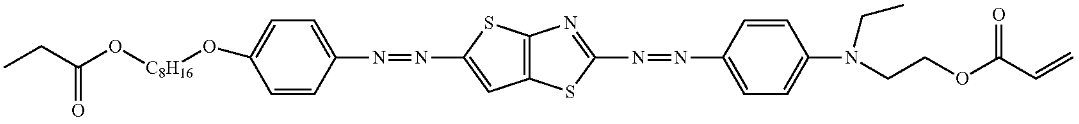

-continued
Polymer liquid crystal compound M-P-1
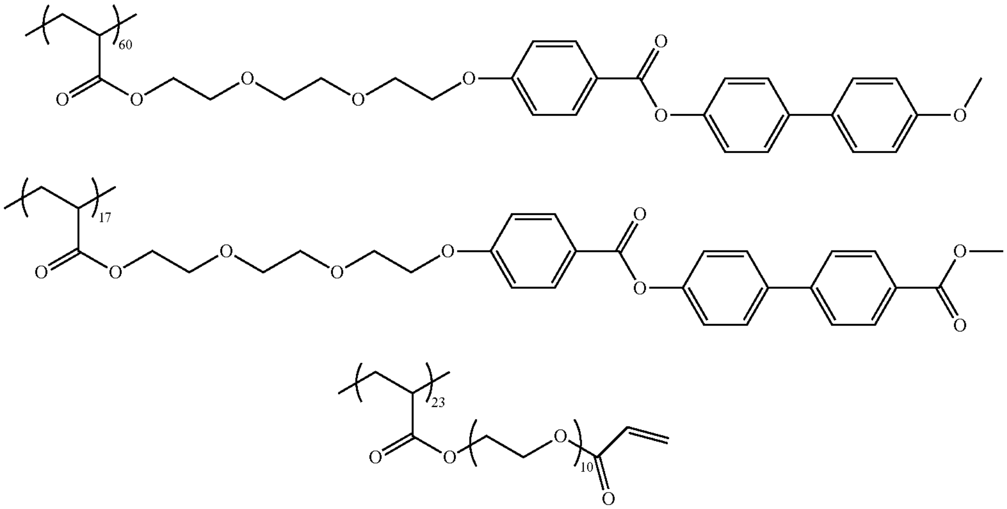
Low-molecular-weight liquid crystal compound M-1
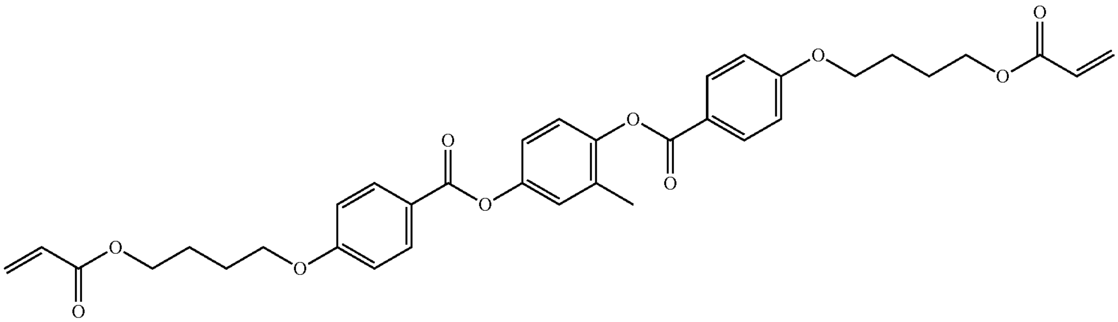
Surfactant F-1
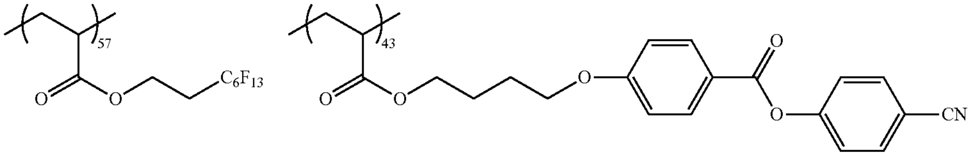

[Production of Reflective Type Circular Polarizer]

[Preparation of Coating Liquids R-1 and R-3 for Reflective Layer]

A composition shown below was stirred and dissolved in a container kept at 70° C. to prepare each of coating liquids R-1 and R-3 for a reflective layer. Here, R represents a coating liquid containing a rod-like liquid crystal.

| Coating liquid R-1 for reflective layer | |
|---|---|
| Methyl ethyl ketone | 120.9 parts by mass |
| Cyclohexanone | 21.3 parts by mass |
| Mixture of rod-like liquid crystals shown below | 100.0 parts by mass |
| Photopolymerization initiator b | 1.00 part by mass |
| Chiral agent A shown below | shown in Table 14 |
| Surfactant F1 shown below | 0.027 parts by mass |
| Surfactant F2 shown below | 0.067 parts by mass |

Table 14. Amount of Chiral Agent in Coating Liquid Containing Rod-Like Liquid Crystal

TABLE 14

| Coating liquid name | Type of chiral agent | Amount of chiral agent (part by mass) |
|---|---|---|
| Liquid R-1 | Chiral agent A | 2.87 |
| Liquid R-3 | Chiral agent A | 3.46 |

Mixture of Rod-Like Liquid Crystals

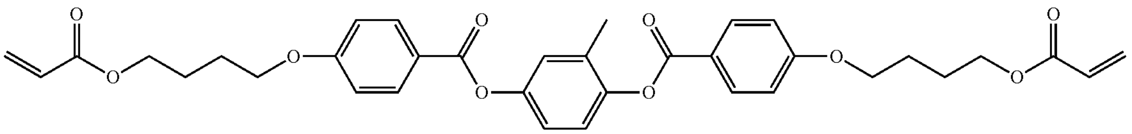

84%

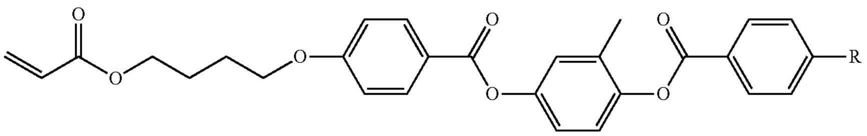

14%

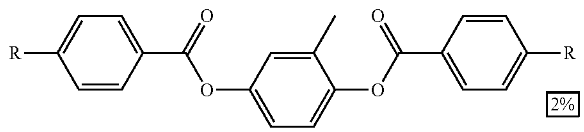

2%

R

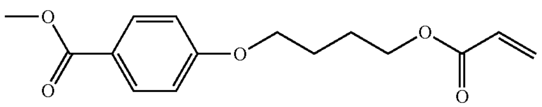

In the above-described mixture, each numerical value denotes the content in units of % by mass. In addition, R is a group bonded through an oxygen atom. Furthermore, an average molar absorption coefficient of the above-described rod-like liquid crystal at a wavelength of 300 to 400 nm was 140/mol·cm.

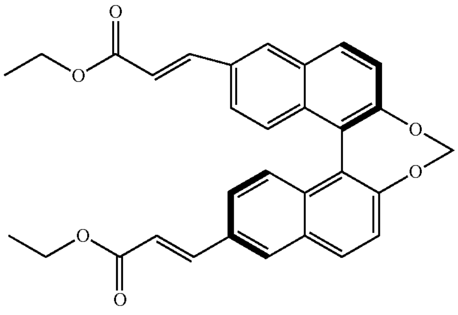

Chiral agent A

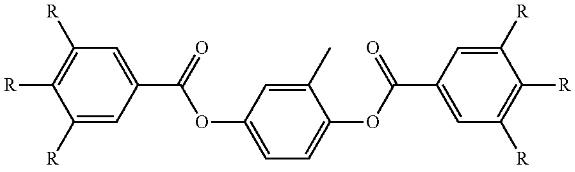

Surfactant F1

R = 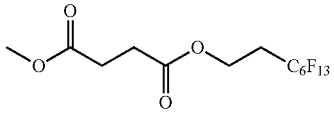

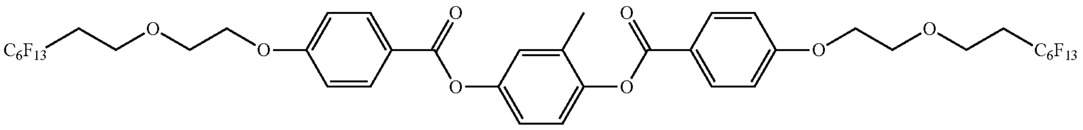

Surfactant F2

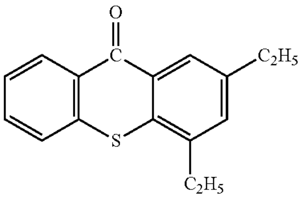

Photopolymerization initiator B

The chiral agent A is a chiral agent in which the helical twisting power (HTP) is reduced by light.

<Coating Liquids D-2 and D-4 for Reflective Layer>

A composition shown below was stirred and dissolved in a container held at 50° C. to prepare coating liquids D-2 and D-4 for a reflective layer. Here, D represents a coating liquid containing a disk-like liquid crystal.

| Coating liquid D-2 for reflective layer | |
|---|---|
| Disc-like liquid crystal (A) shown below | 80 parts by mass |
| Disc-like liquid crystal (B) shown below | 20 parts by mass |
| Polymerizable monomer E1 | 10 parts by mass |
| Surfactant F4 | 0.3 parts by mass |
| Photopolymerization initiator (IRGACURE 907 manufactured by BASF SE) | 3 parts by mass |
| Chiral agent A | shown in Table 15 |
| Methyl ethyl ketone | 290 parts by mass |
| Cyclohexanone | 50 parts by mass |

Table 15. Amount of Chiral Agent in Coating Liquid Containing Disk-Like Liquid Crystal

TABLE 15

| Coating liquid name | Type of chiral agent | Amount of chiral agent (part by mass) |
|---|---|---|
| Liquid D-2 | Chiral agent A | 3.83 |
| Liquid D-4 | Chiral agent A | 5.06 |

Disk-like liquid crystal (A)

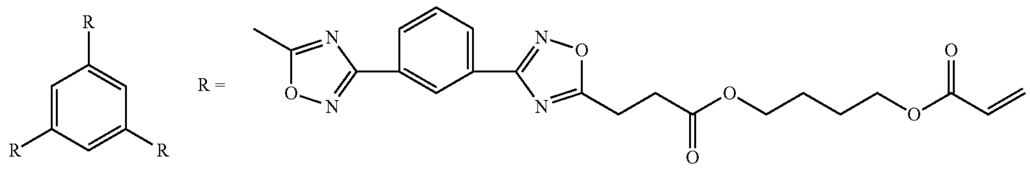

Disk-like liquid crystal (B)

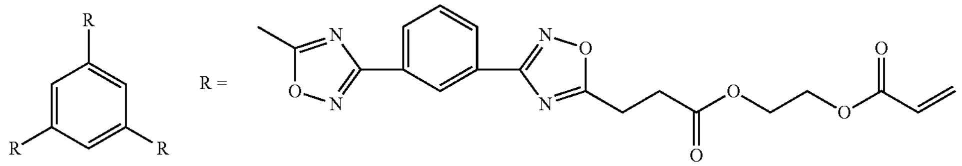

Polymerizable monomer EM1

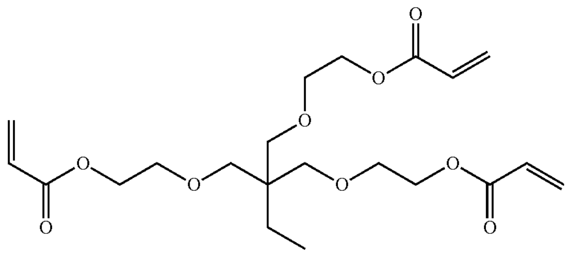

Surfactant F4

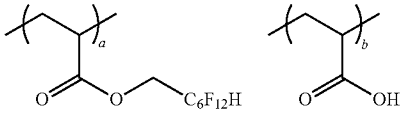

a/b = 98/2

[Production of Reflective Type Circular Polarizer 1]

A polyethylene terephthalate (PET) film (A4100 manufactured by Toyobo Co., Ltd.) having a thickness of 50 μm was prepared as a temporary support. The PET film had an easy adhesion layer on one surface.

A surface of the PET film, which was not provided with the easy adhesion layer, was subjected to a rubbing treatment, coated with the coating liquid R-1 for a reflective layer prepared above using a wire bar coater, dried at 110° C. for 120 seconds, and heat-aged at 100° C. for 1 minute after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization. FIG. 12 shows a schematic view of the exposure mask used in this case. As shown in FIG. 12, a rotationally symmetric exposure mask was used in which the transmittance was high at the center part 371 and the transmittance was decreased toward the end part 372.

Thereafter, the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating liquid to form a red light reflecting layer consisting of a cholesteric liquid crystal layer. The irradiation with light was performed from the side of the cholesteric liquid crystal layer in all cases. Here, the coating thickness was adjusted so that the film thickness of the cured red light reflecting layer was 4.5 μm. A patterned cholesteric liquid crystal layer in which the helical pitch of the cholesteric liquid crystalline phase had an in-plane distribution was produced by the photoisomerization using the exposure mask, provided that a central wavelength of a reflection spectrum of the center part was 701 nm and a central wavelength of a reflection spectrum of the end part was 683 nm.

Next, the surface of the red light reflecting layer was subjected to a corona treatment at a discharge amount of 150 $W·min/m^2$, and the surface subjected to the corona treatment was coated with the coating liquid D-2 for a reflective layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization. The exposure mask used in this case was the same as the exposure mask used for the first red light reflecting layer. Thereafter, the coating film was heat-aged again at 115° C. for 3 minutes to be a uniform alignment state, and then the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating film to form a yellow light reflecting layer on the red light reflecting layer. The irradiation with light was performed from the side of the cholesteric liquid crystal layer in all cases. Here, the coating thickness was adjusted so that the film thickness of the cured yellow light reflecting layer was 3.3 μm.

Next, the yellow light reflecting layer was coated with the coating liquid R-3 for a reflective layer prepared above using a wire bar coater, dried at 110° C. for 120 seconds, and heat-aged at 100° C. for 1 minute after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization. The exposure mask used in this case was the same as the exposure mask used for the first red light reflecting layer. Thereafter, the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating liquid to form a green light reflecting layer on the yellow light reflecting layer. The irradiation with light was performed from the side of the cholesteric liquid crystal layer in all cases. Here, the coating thickness was adjusted so that the film thickness of the cured green light reflecting layer was 2.7 μm.

Next, the surface of the red light reflecting layer was subjected to a corona treatment at a discharge amount of 150 $W·min/m^2$, and the surface subjected to the corona treatment was coated with the coating liquid D-4 for a reflective layer using a wire bar coater. Subsequently, the coating film was dried at 70° C. for 2 minutes and heat-aged at 115° C. for 3 minutes after the solvent was vaporized, thereby obtaining a uniform alignment state. Thereafter, the coating film was irradiated with light from a high pressure mercury lamp through an exposure mask at 40° C. in air with an irradiation amount of 5 $mJ/cm^2$, thereby performing photoisomerization. The exposure mask used in this case was the same as the exposure mask used for the first red light reflecting layer. Thereafter, the coating film was heat-aged again at 115° C. for 3 minutes to be a uniform alignment state, and then the surface was irradiated with light using a metal halide lamp at 100° C., an illuminance of 80 $mW/cm^2$, and an irradiation amount of 500 $mJ/cm^2$ in a low oxygen atmosphere (100 ppm or less), thereby curing the coating film to form a blue light reflecting layer on the green light reflecting layer. The irradiation with light was performed from the side of the cholesteric liquid crystal layer in all cases. Here, the coating thickness was adjusted so that the film thickness of the cured blue light reflecting layer was 2.5 μm. As a result, a reflective type circular polarizer 1 was produced. Table 16 shows the coating liquid for a reflective layer and the film thickness used for the production of the reflective type circular polarizer 1.

TABLE 16

| | Type of coating liquid | Amount of chiral agent (part by mass) | Reflection central wavelength (nm) | Film thickness (μm) |
|---|---|---|---|---|
| Fourth layer | Liquid D-4 | 4.20 | 480 | 2.5 |
| Third layer | Liquid R-3 | 3.46 | 573 | 2.7 |
| Second layer | Liquid D-2 | 3.15 | 625 | 3.3 |
| First layer | Liquid R-1 | 2.87 | 683 | 4.5 |

[Production of Retardation Layer 1]

A retardation layer 1 having reverse dispersibility was produced with reference to the method described in paragraphs 0151 to 0163 of JP2020-084070A. Re of the retardation layer 1 was 146 nm and Rth thereof was 73 nm. In addition, the orientation of the optical axis of the retardation layer 1 was uniform.

[Production of Optical Laminate 1]

The retardation layer 1 was bonded to the polystyrene film 1 using a pressure-sensitive adhesive sheet "NCF-D692 (5)" manufactured by LINTEC Corporation, and then the support used in producing the retardation layer 1 was peeled off.

Next, a liquid crystal display of a tablet-type computer "iPad (registered trademark)" manufactured by Apple Inc.

was removed, and a reflective type linear polarizer "APF" which had been bonded to a back surface of the liquid crystal panel was peeled off and bonded to the surface of the above-described retardation layer 1 using a pressure-sensitive adhesive sheet "NCF-D692 (5)" manufactured by LINTEC Corporation. At this time, the slow axis of the retardation layer 1 and the reflection axis of the APF were bonded to each other such that an angle therebetween were 45°.

Next, the absorption type polarizer 1 was bonded to the surface of the above-described APF using a pressure-sensitive adhesive sheet "NCF-D692 (5)" manufactured by LINTEC Corporation, and then the support used in the production of the absorption type polarizer 1 was peeled off. In this case, the absorption axis of the absorption type polarizer 1 and the reflection axis of the APF were bonded to each other so as to be parallel to each other.

In this manner, an optical laminate 1 was produced.

[Production of Optical Laminate 2]

The reflective type circular polarizer 1 was bonded to the polystyrene film 1 using a pressure-sensitive adhesive sheet "NCF-D692 (5)" manufactured by LINTEC Corporation, and then the support used in producing the reflective type circular polarizer 1 was peeled off.

Next, the retardation layer 1 was bonded to the surface of the above-described reflective type circular polarizer 1 using a pressure-sensitive adhesive sheet "NCF-D692 (5)" manufactured by LINTEC Corporation.

Next, the absorption type polarizer 1 was bonded to the surface of the above-described retardation layer 1 using a pressure-sensitive adhesive sheet "NCF-D692 (5)" manufactured by LINTEC Corporation, and then the support used in the production of the absorption type polarizer 1 was peeled off. At this time, the absorption axis of the absorption type polarizer 1 and the slow axis of the retardation layer 1 were bonded to each other such that an angle therebetween were 45°.

In this manner, an optical laminate 2 was produced.

[Production of Optical Lens 1]

As a lens base material, a glass meniscus lens 1 having a diameter of 50 mm and a thickness of 19 mm at a center part was prepared. The meniscus lens 1 was a lens having a concave surface with a curvature radius of 65 mm and a convex surface with a curvature radius of 42 mm.

The convex surface side of the meniscus lens 1 was subjected to aluminum vapor deposition to have a reflectivity of 40%, thereby forming a half mirror.

Next, the optical laminate 1 was molded on the concave surface side of the meniscus lens 1 by a vacuum molding method. In this case, as a pressure sensitive adhesive for adhering the lens, a pressure-sensitive adhesive sheet "NCF-D692 (15)" manufactured by LINTEC Corporation was used. In this manner, an optical lens 1 was produced.

[Production of Optical Lens 2]

An optical lens 2 was produced in the same manner as in the optical lens 1, except that the optical laminate 1 was changed to the optical laminate 2.

Example D1

A virtual reality display apparatus "VIVE FLOW" manufactured by HTC Corporation was disassembled, and an optical lens was taken out. The "VIVE FLOW" is a virtual reality display apparatus in which a pancake lens is adopted, and a liquid crystal display device which emits circularly polarized light by a polarizing plate bonded to a surface is used as an image display device.

The above-described optical lens 1 was installed in place of the taken optical lens such that the convex surface side was on the image display device side. The optical lens 1 was adjusted to a position where the image could be appropriately visually recognized in a case where the image display device was turned on, and was fixed.

In this way, a virtual reality display apparatus of Example D1 was produced.

Example D2

A virtual reality display apparatus of Example D2 was produced in the same manner as in Example D1, except that the optical lens 1 was changed to the optical lens 2.

<Evaluation of Light Leakage>

In the produced virtual reality display apparatuses, a black-and-white checker pattern was displayed on the image display device, and a degree of light leakage was evaluated by visual observation in the following four stages. In a case where there was the light leakage, double images were visually recognized, and a contrast of the corresponding portion was lowered.

AA: double images were not visible at all, and the black portion was visible as a complete black color.

A: double images were not visible at all.

B: double images were slightly visible but not noticeable.

C: clear double images were observed.

The results are shown in Table 17.

In addition, Table 17 shows the measurement results of the difference in tint (color difference) of the main image in the visual field at the center part and the end part, for each of the produced optical lenses 1 and 2.

Table 17. Evaluation Results of Light Leakage and Tint in Virtual Reality Display Apparatuses of Examples and Comparative Examples

TABLE 17

| | Light leakage | | Difference in angle of optical axes after molding | | |
|---|---|---|---|---|---|
| | Center part of visual field | End part of visual field | Center part of visual field (x, y) | End part of visual field (x, y) | Color difference (Δxy) |
| Example D1 | A | A | | | |
| Example D2 | AA | AA | 0.300, 0.322 | 0.296, 0.312 | 0.011 |

EXPLANATION OF REFERENCES

100, 102, 104: virtual reality display apparatus
11, 13: λ/4 retardation layer
21, 22: absorption type linear polarizer
30: half mirror
34: lens base material
36: base material
40, 40A: reflective type polarizer
50: antireflection layer
70: image display panel
80: first optically anisotropic layer
90: third optically anisotropic layer
210*a*, 210*b*: first optically anisotropic layer
211*a*, 211*b*: second optically anisotropic layer
220*a*, 220*b*: orientation of optical axis of first optically anisotropic layer
221*a*, 221*b*: orientation of optical axis of second optically anisotropic layer

230: non-linearly aligned region of first optically anisotropic layer
240*a*: optically anisotropic film
240*b*: molded body
250: image display panel
261, 262: λ/4 retardation layer
271: absorption type linear polarizer
280: antireflection layer
290: half mirror
292: reflective circular polarizer
294: lens base material
200: virtual reality display apparatus
300, 302: virtual reality display apparatus
301, 303: ray
310, 360: laminated optical body
311: antireflection layer
312, 314: positive C-plate
313, 340: reflective circular polarizer
315: retardation layer
316: absorption type linear polarizer
320: lens
330: half mirror
331: first light reflecting layer
332: second light reflecting layer
333: third light reflecting layer
334: fourth light reflecting layer
350: image display panel
370: exposure mask
371: center part
372: end part

What is claimed is:

1. An optical lens comprising:
a lens base material having a curved surface part; and
an optical laminate, which is bonded to the curved surface part of the lens base material,
wherein the optical laminate comprises
a first optically anisotropic layer containing a negative birefringent resin; and
a specific layer selected from the group consisting of a third optically anisotropic layer which is formed by immobilizing a uniformly aligned liquid crystal compound and a cholesteric liquid crystal layer which is formed by immobilizing a helically aligned liquid crystal compound,
the first optically anisotropic layer and the specific layer have a curved surface portion.

2. A virtual reality display apparatus comprising:
an image display device emitting polarized light; and
the optical lens according to claim 1.

3. The optical lens according to claim 1,
wherein a tan δ peak temperature of the negative birefringent resin is 170° C. or lower.

4. A reflective circular polarizer comprising:
a light reflecting layer formed by immobilizing a cholesteric liquid crystalline phase,
wherein a helical pitch of the cholesteric liquid crystalline phase has an in-plane distribution.

5. The reflective circular polarizer according to claim 4,
wherein the light reflecting layer includes a light reflecting layer formed by immobilizing a cholesteric liquid crystalline phase containing a rod-like liquid crystal compound and a light reflecting layer formed by immobilizing a cholesteric liquid crystalline phase containing a disk-like liquid crystal compound.

6. The reflective circular polarizer according to claim 4,
wherein the light reflecting layer has a laminated structure in which a light reflecting layer formed by immobilizing a cholesteric liquid crystalline phase containing a rod-like liquid crystal compound and a light reflecting layer formed by immobilizing a cholesteric liquid crystalline phase containing a disk-like liquid crystal compound are alternately arranged.

7. A laminated optical body obtained by laminating the reflective circular polarizer according to claim 4, a retardation layer, and an absorption type linear polarizer in this order.

8. A composite lens comprising:
a non-planar laminated optical body obtained by molding the laminated optical body according to claim 7; and
a lens.

9. A virtual reality display apparatus comprising:
the composite lens according to claim 8.

10. A composite lens comprising:
a non-planar reflective circular polarizer; and
a lens,
wherein the non-planar reflective circular polarizer obtained by molding a reflective circular polarizer which includes a light reflecting layer formed by immobilizing a cholesteric liquid crystalline phase,
an in-plane distribution of a helical pitch of the cholesteric liquid crystalline phase is 1% or less.

11. A virtual reality display apparatus comprising:
the composite lens according to claim 10.

12. The composite lens according to claim 10,
wherein the reflective circular polarizer is a reflective circular polarizer,
wherein the reflective circular polarizer comprises a light reflecting layer formed by immobilizing a cholesteric liquid crystalline phase, and
wherein a helical pitch of the cholesteric liquid crystalline phase has an in-plane distribution.

13. An optically anisotropic film comprising:
a first optically anisotropic layer having an optical axis,
wherein the first optically anisotropic layer has a non-linearly aligned region in which at least an orientation of the optical axis continuously changes in a plane; and
wherein the orientation of the optical axis in the non-linearly aligned region is distributed in a point-symmetrical manner with at least one point as a center.

14. The optically anisotropic film according to claim 13,
wherein an optical thickness of the first optically anisotropic layer in the non-linearly aligned region continuously changes in the plane.

15. The optically anisotropic film according to claim 13,
wherein the first optically anisotropic layer is a retardation layer.

16. The optically anisotropic film according to claim 13,
wherein the first optically anisotropic layer is a polarizer layer.

17. The optically anisotropic film according to claim 15,
wherein the first optically anisotropic layer is formed by immobilizing at least a liquid crystal compound.

18. The optically anisotropic film according to claim 13, further comprising:
a second optically anisotropic layer having an optical axis,
wherein an orientation of the optical axis of the second optically anisotropic layer is uniform in a plane.

19. A molded body obtained by molding the optically anisotropic film according to claim 18 into a three-dimensional shape including a curved surface, wherein the optical axis of the first optically anisotropic layer and the optical axis of the second optically anisotropic layer form an angle of 45° in the non-linearly aligned region.

* * * * *